(12) United States Patent
    Kile

(10) Patent No.: US 9,854,733 B1
(45) Date of Patent: Jan. 2, 2018

(54) AGRICULTURAL SEEDER IMPLEMENTS

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 70 days.

(21) Appl. No.: 15/014,234

(22) Filed: Feb. 3, 2016

Related U.S. Application Data

(63) Continuation-in-part of application No. 14/612,829, filed on Feb. 3, 2015, now Pat. No. 9,374,943.

(51) Int. Cl.
    *A01C 5/06* (2006.01)
    *A01C 7/20* (2006.01)

(52) U.S. Cl.
    CPC .............. *A01C 7/203* (2013.01); *A01C 5/062* (2013.01); *A01C 5/066* (2013.01); *A01C 7/206* (2013.01)

(58) Field of Classification Search
    CPC .................................. A01C 5/066; A01C 5/06
    USPC .................................................. 111/190–193
    See application file for complete search history.

(56) References Cited

U.S. PATENT DOCUMENTS

| | | | | |
|---|---|---|---|---|
| 1,317,402 A | * | 9/1919 | Taylor | A01C 5/06 111/193 |
| 1,693,318 A | * | 11/1928 | Shell | A01C 5/066 111/190 |
| 2,341,352 A | * | 2/1944 | Bateman | A01C 9/06 111/170 |
| 2,924,189 A | * | 2/1960 | McLeod | A01C 5/062 111/150 |
| 2,963,998 A | * | 12/1960 | Bliss | A01C 7/20 111/189 |
| 3,157,139 A | * | 11/1964 | Spindler | A01B 13/08 111/123 |
| 3,175,622 A | * | 3/1965 | Stam | A01C 5/066 111/190 |
| 5,782,307 A | * | 7/1998 | Forsyth | A01C 23/025 172/156 |
| 7,410,005 B2 | * | 8/2008 | Lung | A01C 5/066 111/156 |
| 7,832,345 B2 | * | 11/2010 | Whalen | A01C 5/066 111/140 |
| 2016/0066500 A1 | * | 3/2016 | Bruns | A01C 5/066 111/163 |

* cited by examiner

*Primary Examiner* — John G Weiss
(74) *Attorney, Agent, or Firm* — Michael W. Goltry; Robert A. Parsons; Parsons & Goltry

(57) ABSTRACT

An agricultural seeder implement includes an opener, a seed boot mounted to the opener, and a closer mounted to the opener. The opener is for cutting a furrow, the seed boot is for depositing seeds in the furrow, and the closer is for distributing loosened soil over seeds deposited in the furrow by the seed boot.

18 Claims, 58 Drawing Sheets

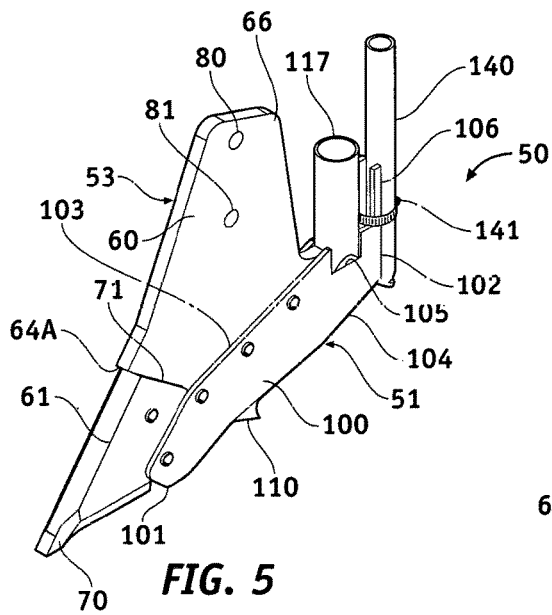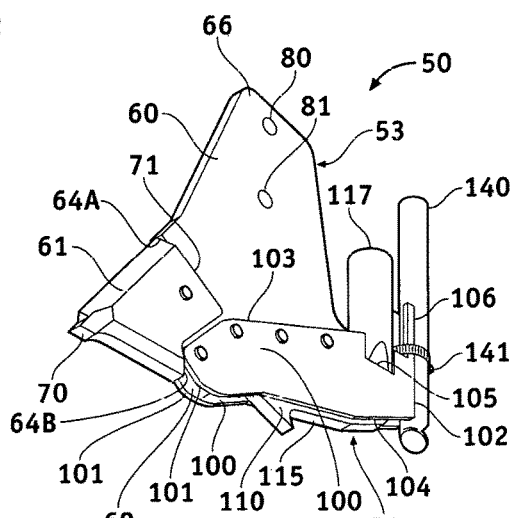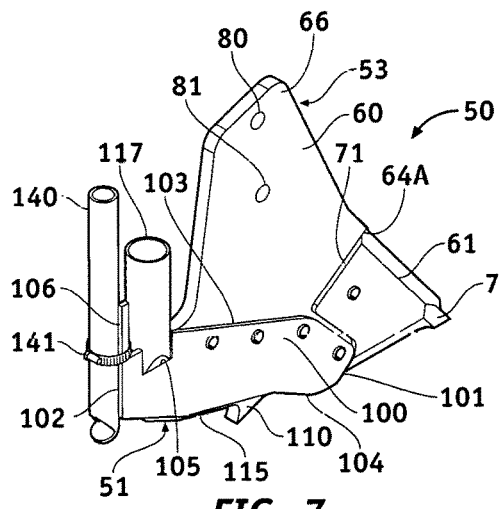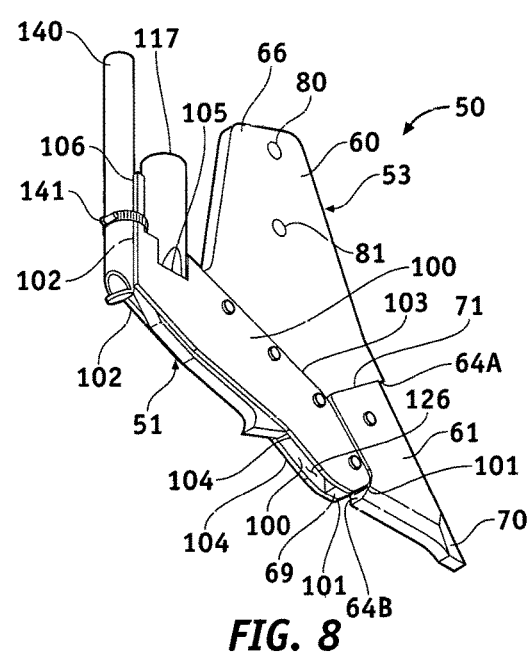

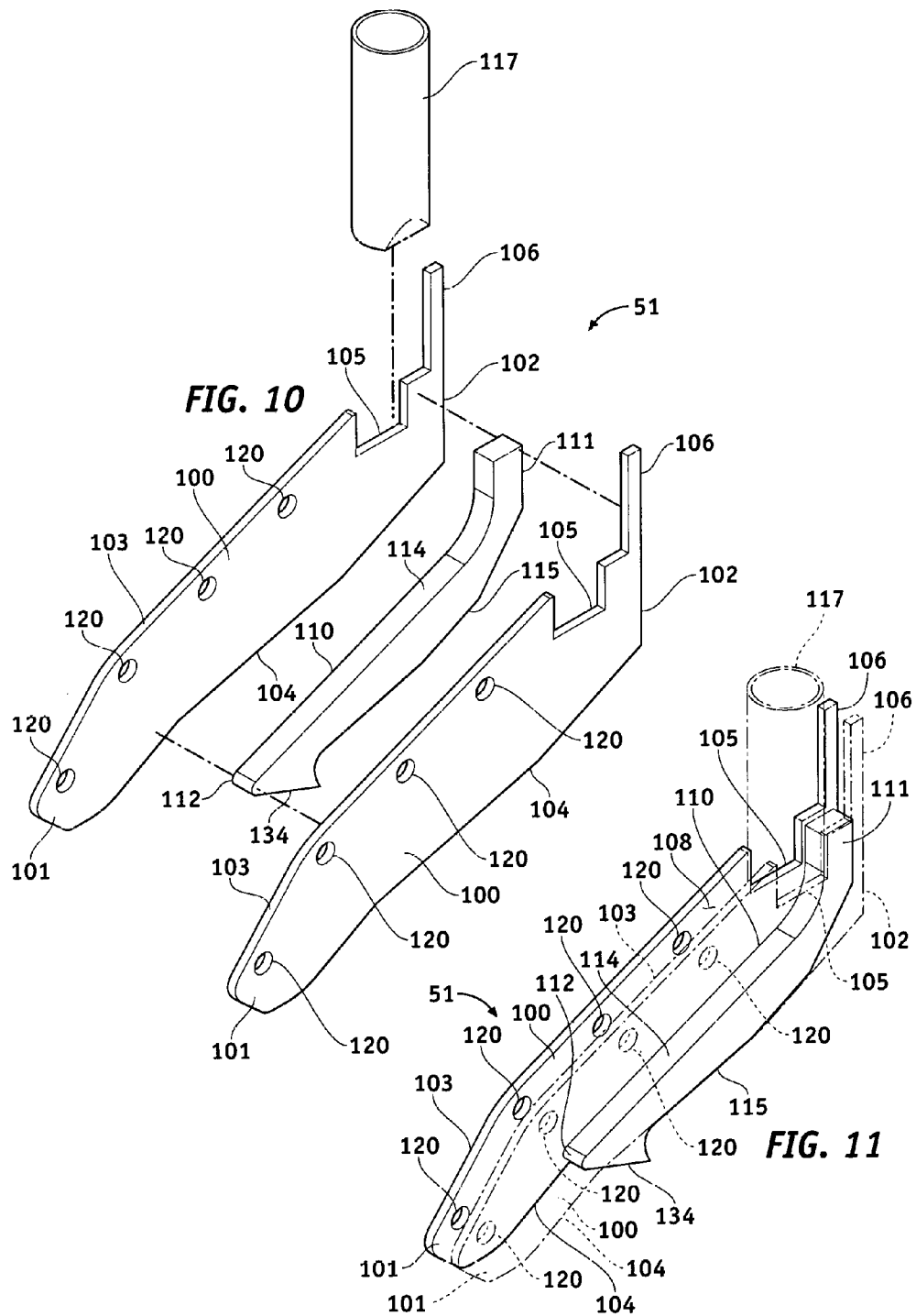

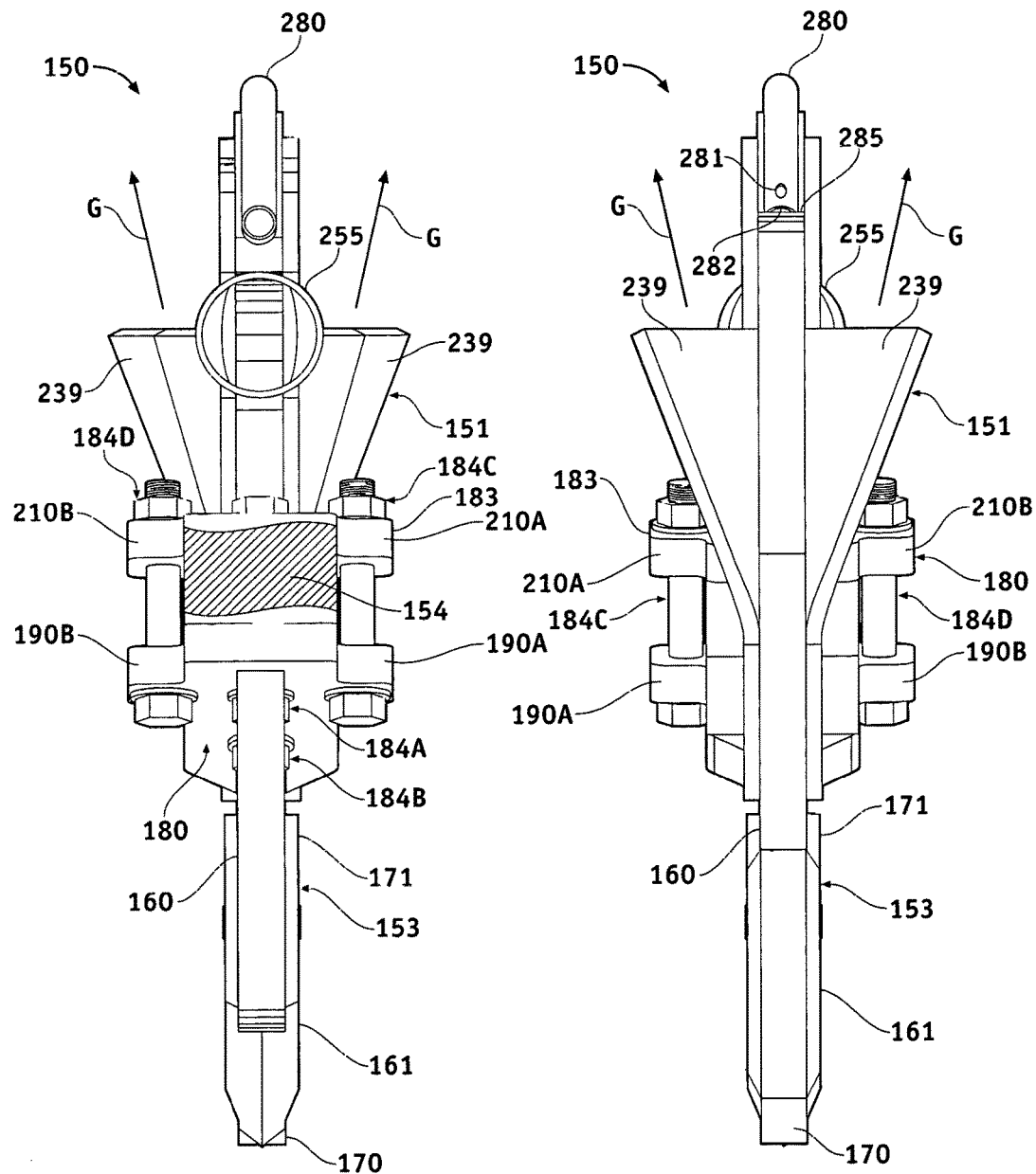

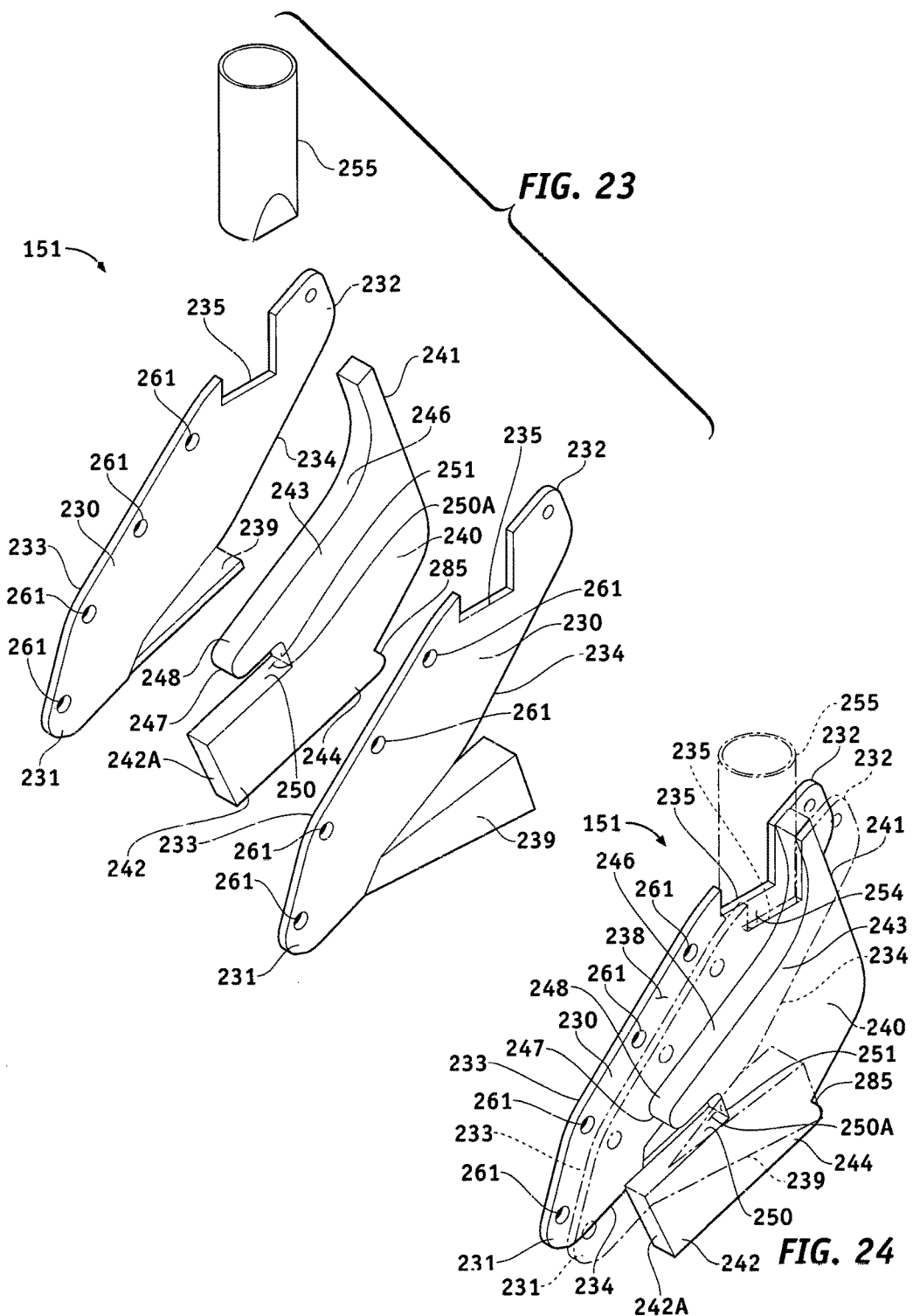

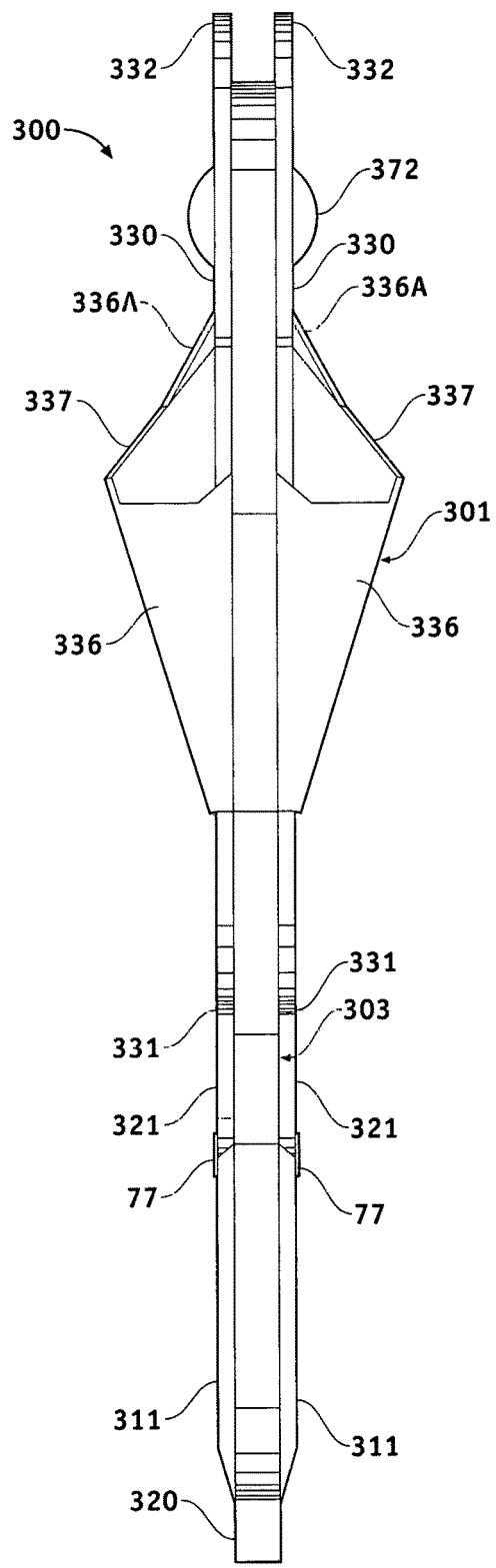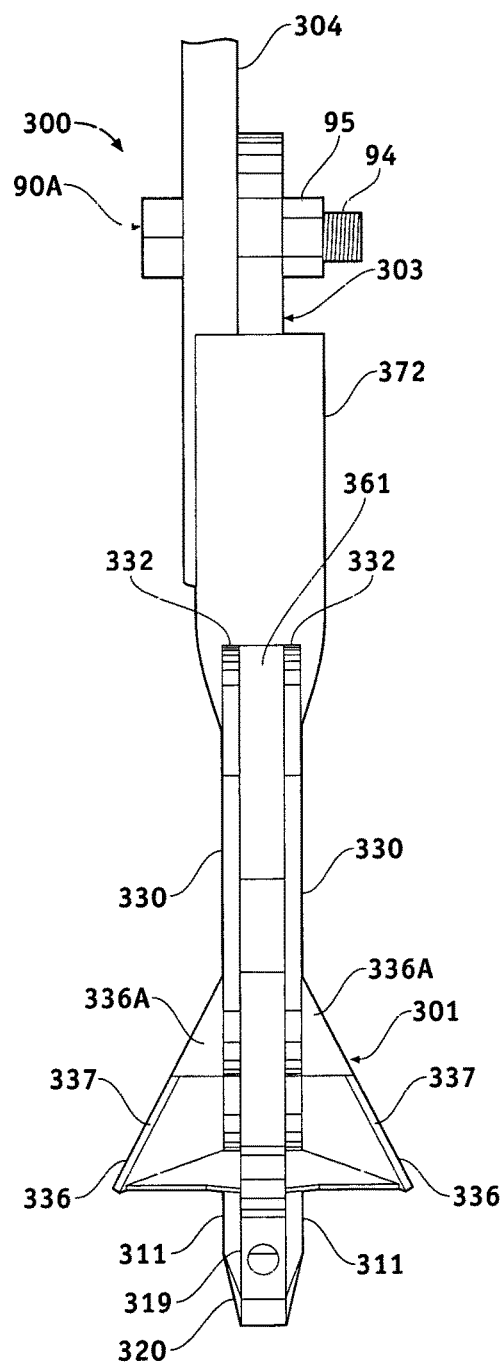
FIG. 32
FIG. 33

AGRICULTURAL SEEDER IMPLEMENTS

FIELD OF THE INVENTION

The present invention relates to agricultural implements and, more particularly, to agricultural seeder implements.

BACKGROUND OF THE INVENTION

In an agricultural air seeder, seeds are conveyed by an air stream from a central hopper to a number of seeding elements, carried by a frame, that inject the seed into furrows cut into the ground by ground cutting elements. Air seeders of this type use a plate or a cutting sweep carried at each of the seeding elements by the frame that cuts a furrow in the ground into which the seeds are deposited. The depth of seeding is of fundamental importance to seed germination and must be accurately controlled. The seed must be properly placed at a preselected spacing from the soil surface dependent upon soil surface and sub-surface moisture conditions in order to achieve optimum seed germination. During the seeding process, fertilizer banding is customary, which is the concurrent application of a fertilizer adjacent to the applied seeds so that the roots can access the fertilizer during germination. Accordingly, it is common to deliver fertilizer near the seeding element for conveying fertilizer to a position adjacent to the seeds during the seeding process. It is undesirable to place the fertilizer directly with the seeds due to the chemical burning effect which can occur. After depositing the seeds and fertilizer, expeditious coverage of the seeds and fertilizer in the furrow with soil is important to reduce seed and fertilizer loss. Although skilled artisans have developed varieties of systems designed to attempt to improve controlled seeding depth and concurrent fertilizer banding, advances in the field of air seeders have not been entirely satisfactory, and have yielded air seeders that are prohibitively expensive, difficult to construct, difficult to service, and mechanically complex, thereby necessitating continued improvement in the art.

SUMMARY OF THE INVENTION

According to the principle of the invention, an agricultural seeder implement includes a seed boot connected directly to an opener having a leading extremity and a trailing extremity. The seed boot and the opener form a channel and an outlet. The channel extends forwardly from an inlet of the seed boot proximate to the trailing extremity of the opener to the outlet behind the leading extremity of the opener. The opener is for being pulled for cutting a furrow in the ground by the leading extremity ahead of the outlet, and the channel is for guiding a stream of air-driven seed forwardly therethrough from the inlet and into the furrow through the outlet directed downwardly in the furrow. The seed boot is removably connected directly to the opener. The opener is a chisel, which is a form of a non-moving and non-rotating opener. The channel is down-turned proximate to the outlet for guiding the stream of air-driven seed downwardly into the furrow through the outlet. The seed boot has a deflector, which is behind the outlet and is for consolidating the stream of air-driven seed downwardly into the furrow in a region rearwardly of the outlet. A fertilizer tube is connected to the seed boot for applying fertilizer into the furrow rearwardly of the seed boot.

According to the principle of the invention, an agricultural seeder implement includes a seed boot having an inlet and an outlet to a shoot on either side of the seed boot. The seed boot is connected directly to an opener having a leading extremity and a trailing extremity. The seed boot and the opener form a channel. The channel extends forwardly from the inlet of the seed boot proximate to the trailing extremity of the opener to the outlet of the seed boot pointing rearwardly behind the leading extremity of the opener. The opener is for being pulled for cutting a furrow in the ground by the leading extremity ahead of the outlet, and the channel is for guiding a stream of air-driven seed forwardly therethrough from the inlet. The channel is in-turned proximate to the outlet for re-directing the stream of air-driven seed rearwardly to the outlet, and each said shoot is for receiving the air-driven stream of seed from the outlet and guiding the stream of air-driven seed rearwardly into the furrow on either side of the seed boot. The seed boot is removably connected directly to the opener. The opener is a chisel, which is a form of a non-moving and non-rotating opener. The outlet is enclosed within the seed boot. A fertilizer tube is connected to the seed boot for applying fertilizer into the furrow rearwardly of each said shoot.

According to the principle of the invention, an agricultural seeder implement includes a seed boot connected directly to an opener having a leading extremity and a trailing extremity. The seed boot has an inlet, an outlet to a shoot on either side of the seed boot, and a channel that extends forwardly through the seed boot from the inlet of the seed boot proximate to the trailing extremity of the opener to the outlet of the seed boot behind the leading extremity of the opener. The opener is for being pulled for cutting a furrow in the ground by the leading extremity ahead of the outlet, and the channel is for guiding a stream of air-driven seed forwardly therethrough the seed boot from the inlet. The channel is in-turned proximate to the outlet for re-directing the stream of air-driven seed rearwardly to the outlet, and each said shoot is for receiving the air-driven stream of seed from the outlet and guiding the stream of air-driven seed rearwardly into the furrow on either side of the seed boot. The seed boot is removably connected directly to the opener. The opener is a chisel, which is a form of a non-moving and non-rotating opener. The outlet is enclosed within the seed boot. A fertilizer tube is connected to the seed boot for applying fertilizer into the furrow forwardly of each said shoot.

According to the principle of the invention, an agricultural seeder implement includes a seed boot having an inlet and an outlet to a shoot on either side of the seed boot. Each said shoot has a deflector on either side of the seed boot. The seed boot is connected directly to an opener having a leading extremity and a trailing extremity. The seed boot and the opener form a channel. The channel extends forwardly from the inlet of the seed boot proximate to the trailing extremity of the opener to the outlet of the seed boot behind the leading extremity of the opener. The opener is for being pulled for cutting a furrow in the ground by the leading extremity ahead of the outlet, and the channel is for guiding a stream of air-driven seed forwardly therethrough from the inlet to the outlet. Each said shoot is for receiving the air-driven stream of seed from the outlet and guiding the stream of air-driven seed rearwardly to the deflector thereof, and the deflector of each said shoot is for deflecting the stream of air-driven seed downwardly into the furrow on either side of the seed boot. The seed boot is removably connected directly to the opener. The opener is a chisel, which is a form of a non-moving and non-rotating opener. The outlet is enclosed within the seed boot. A fertilizer tube is connected to the seed boot for applying fertilizer into the furrow forwardly of the outlet and each said shoot.

According to the principle of the invention, an agricultural seeder implement includes an opener for cutting a furrow, a seed boot, mounted to the opener, for depositing seeds in the furrow, and a closer, mounted to the opener, for distributing loosened soil over seeds deposited in the furrow by the seed boot. The closer includes a frame mounted to the opener, and a pair of closing disks, mounted to the frame, for distributing loosened soil over seeds deposited in the furrow by the seed boot. The frame is mounted pivotally to the opener for movement between a first position and a second position. The pair of closing disks is in a lowered position, when the frame is in the first position. The pair of closing disks is in a raised position, when the frame is in the second position. An element is carried by the frame, and a first complemental element and a second complemental element are carried by the opener. The frame is disabled from moving beyond the first position disabling the pair of closing disks from moving beyond the lowered position, when the element is engaged to the first complemental element when the frame is in the first position. The frame is disabled from moving beyond the second position disabling the pair of closing disks from moving beyond the raised position, when the element is engaged to the second complemental element when the frame is in the second position.

According to the principle of the invention, an agricultural seeder implement includes an opener for cutting a furrow, a seed boot, mounted to the opener, for depositing seeds in the furrow, a frame mounted to the opener, and a first disk and a second disk each mounted to the frame. The first disk and the second disk are each adjustable between a closing position and an opening position. The first disk and the second disk are for distributing loosened soil over seeds deposited in the furrow by the seed boot, when the first disk and the second disk are each in the closing position. The first disk and the second disk are for distributing loosened soil away from the furrow, when the first disk and the second disk are each in the opening position. The frame is mounted pivotally to the opener for movement between a first position and a second position. The first disk and the second disk are each in a lowered position, when the frame is in the first position. The first disk and the second disk are each in a raised position, when the frame is in the second position. An element is carried by the frame, and a first complemental element and a second complemental element are carried by the opener. The frame is disabled from moving beyond the first position disabling the pair of closing disks from moving beyond the lowered position, when the element is engaged to the first complemental element when the frame is in the first position. The frame is disabled from moving beyond the second position disabling the pair of closing disks from moving beyond the raised position, when the element is engaged to the second complemental element when the frame is in the second position.

According to the principle of the invention, an agricultural seeder implement includes an opener for cutting a furrow, a seed boot, mounted to the opener, for depositing seeds in the furrow, a first support and a second support mounted to the opener, the first support is adjacent to a first side of the opener, the second support is adjacent to a second side of the opener, a first closing disk mounted to the first support adjacent to the first side of the opener, a second closing disk mounted to the second support adjacent to the second side of the opener, and the first closing disk and the second closing disk are for distributing loosened soil over seeds deposited in the furrow by the seed boot. The first support and the second support are each mounted pivotally to the opener for movement between a first position and a second position. The first closing disk and the second closing disk are each in a lowered position, when the first support and the second support are each in the first position. The first closing disk and the second closing disk are each in a raised position, when the first support and the second support are each in the second position. An element is carried by the first support and the second support, and a first complemental element and a second complemental element are carried by the opener. The first support and the second support are disabled from moving beyond the first positions thereof disabling the first disk and the second disk from moving beyond the lowered positions thereof, when the element is engaged to the first complemental element when the first support and the second support are in the first positions thereof. The first support and the second support are disabled from moving beyond the second positions thereof disabling the first disk and the second disk from moving beyond the raised positions thereof, when the element is engaged to the second complemental element when the first support and the second support are in the second positions thereof. The element extends from the first support and through a slot in the opener to the second support. The slot is elongate and extends from a first end wall to a second end wall. The element travels through the slot between the first end wall and the second end wall when the first support and the second support pivot between the first and second positions thereof. The first end wall is the first complemental element, and the second end wall is the second complemental element. The element is a bolt assembly connecting the first support to the second support.

According to the principle of the invention, an agricultural seeder implement includes an opener for cutting a furrow, a seed boot, mounted to the opener, for depositing seeds in the furrow, a first support and a second support mounted to the opener, the first support is adjacent to a first side of the opener, the second support is adjacent to a second side of the opener, a first disk mounted to the first support, and a second disk mounted to the second support. The first disk and the second disk are each adjustable between a closing position and an opening position. The first disk and the second disk for distributing loosened soil over seeds deposited in the furrow by the seed boot, when the first disk and the second disk are each in the closing position. The first disk and the second disk for distributing loosened soil away from the furrow, when the first disk and the second disk are each in the opening position. The first support and the second support are each mounted pivotally to the opener for movement between a first position and a second position. The first disk and the second disk are each in a lowered position, when the first support and the second support are each in the first position. The first disk and the second disk are each in a raised position, when the first support and the second support are each in the second position. An element is carried by the first support and the second support, and a first complemental element and a second complemental element are carried by the opener. The first support and the second support are disabled from moving beyond the first positions thereof disabling the first disk and the second disk from moving beyond the lowered positions thereof, when the element is engaged to the first complemental element when the first support and the second support are in the first positions thereof. The first support and the second support are disabled from moving beyond the second positions thereof disabling the first disk and the second disk from moving beyond the raised positions thereof, when the element is engaged to the second complemental element when the first support and the second support are in the second positions thereof. The element extends from the first support and through a slot in the opener to the second support. The slot is elongate and extends from a first end wall to a second end wall. The element travels through the slot between the first end wall and the second end wall when the first support and the second support pivot between the first and second positions thereof. The first end wall is the first complemental element, and the second end wall is the second complemental element. The element is a bolt assembly connecting the first support to the second support.

Consistent with the foregoing summary of illustrative embodiments, and the ensuing detailed description, which are to be taken together, the invention also contemplates associated apparatus and method embodiments.

BRIEF DESCRIPTION OF THE DRAWINGS

Referring to the drawings:

FIGS. 5-8 are perspective views of the agricultural seeder implement of FIG. 1;

FIG. 10 is an exploded perspective view of the seed boot of the agricultural seeder implement of FIG. 1;

FIG. 11 is a perspective view of the seed boot of the agricultural seeder implement of FIG. 1, with portions thereof depicted in dashed outline to better illustrate the components thereof;

FIG. 21 is a top plan view of the embodiment of FIG. 16;

FIG. 22 is a bottom plan view of the embodiment of FIG. 16;

FIG. 23 is an exploded perspective view of the seed boot of the agricultural seeder implement of FIG. 16;

FIG. 24 is a perspective view of the seed boot of the agricultural seeder implement of FIG. 16, with portions thereof depicted in dashed outline for illustrative purposes;

FIG. 32 is a bottom plan view of the seed boot connected to a plate of the opener of the agricultural seeder implement of FIG. 27;

FIG. 33 is a rear elevation view of the embodiment of FIG. 32;

DETAILED DESCRIPTION

This specification describes in detail a variety of agricultural seeder implements useful for sowing crops. The various embodiments of the invention incorporate conventional nut-and-bolt assemblies, or simply bolt assemblies, each including a bolt consisting of a shank or shaft having an end formed with an enlarged bolt head and an opposed externally threaded end, and an internally threaded nut that threads onto and secures the externally threaded end. A washer for spreading the applied load may be applied under each bolt head and under each internally threaded nut. The bolts of the various nut-and-bolt assemblies are installed through appropriate holes or openings formed in the various parts of the implements, and are assembled with the corresponding threaded nuts to secure parts together. While the various nut-and-bolt assemblies are discussed in detail in this specification for descriptive purposes, the use of nut-and-bolt assemblies for fastening is well-known to the skilled artisan. When a nut-and-bolt assembly is applied to structural elements to be fastened, the bolt is received by corresponding openings in the structural elements, which are secured between the bolt head located on one side of one of the structural elements and the threaded nut located on an opposing side of the opposed structural element. A double threaded bolt having a nut threaded onto either end of the threaded bolt is also a type of bolt assembly that is intended to be included within the broad definition of nut-and-bolt assembly, or simply bolt assembly, as used herein.

I.

Figure 1:
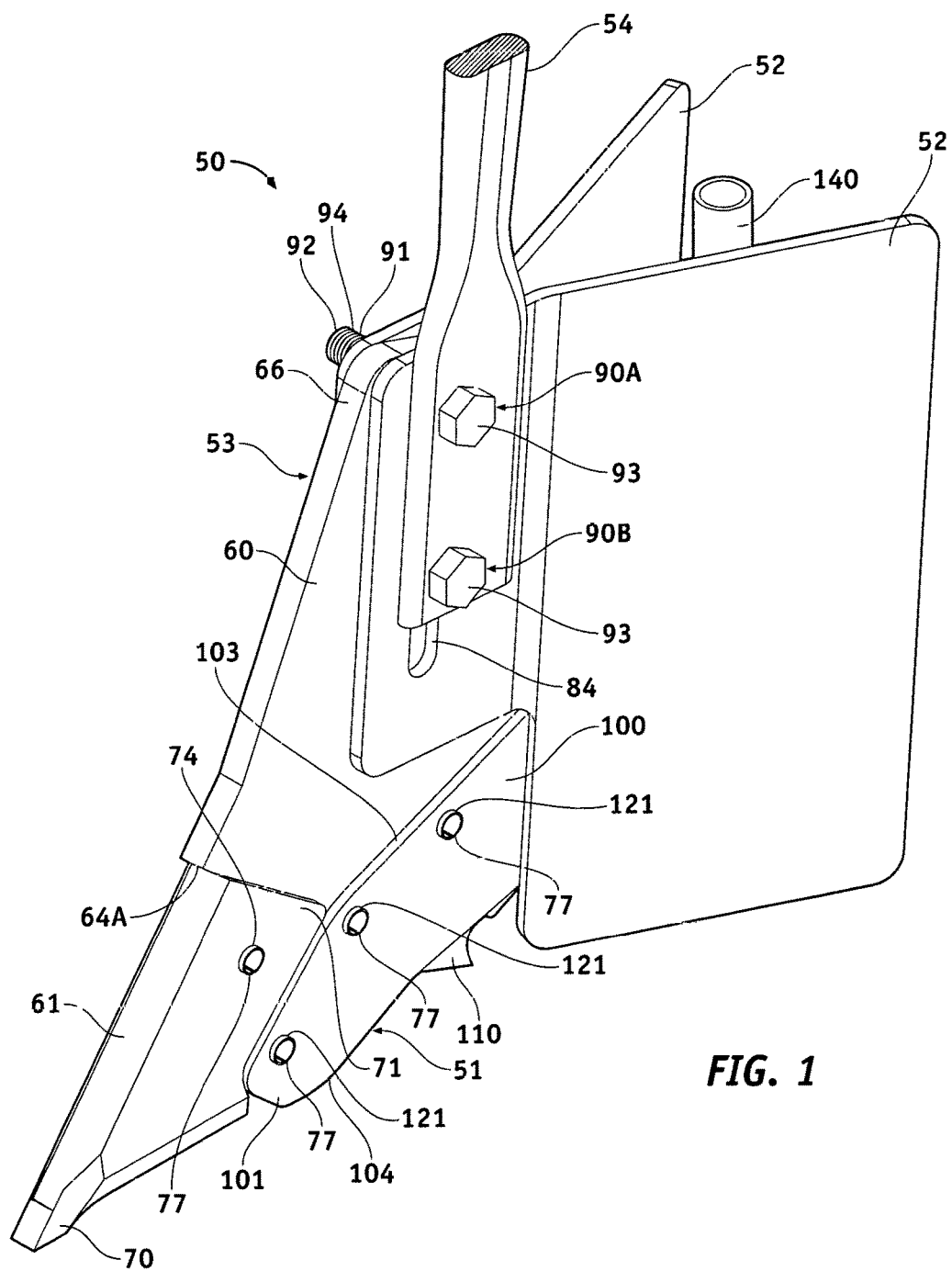
FIG. 1 is a front perspective view of an agricultural seeder implement constructed and arranged in accordance with the principle of the invention, the agricultural seeder implement includes a seed boot and deflectors connected to an opener, and is shown as it would appear connected to a shank in preparation for use of the agricultural seeder implement for sowing a crop.
Figure 2:
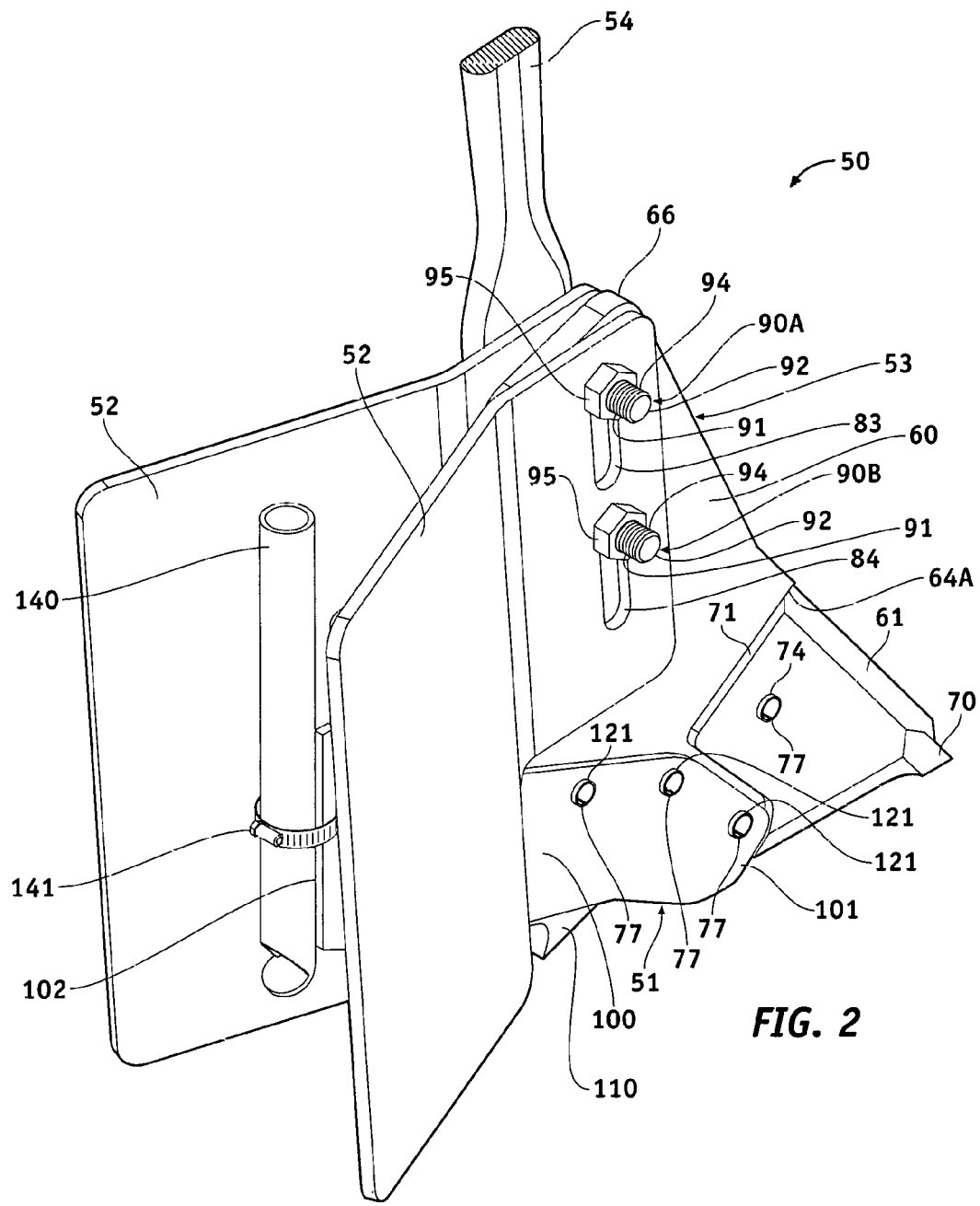
FIG. 2 is a rear perspective view of the agricultural seeder implement of FIG. 1.

Turning now to the drawings, in which like reference characters indicate corresponding elements throughout the several views, attention is first directed to FIGS. 1 and 2 in which there is seen an agricultural seeder implement 50, including seed boot 51 and deflectors 52 connected to opener 53, shown as it would appear assembled and suspended from a shank 54 of a plow frame (not shown) in preparation for use of implement 50 for sowing a crop. Opener 53 is a chisel, which is a form of a non-moving and non-rotating opener for being pulled by a tractor for cutting a furrow in the ground at a preselected depth from the surface of the ground, and seed boot 51 connected to opener 53 is for receiving a stream of air-driven seed and depositing said stream of air-driven seed into the furrow formed by opener 53.

Figure 3:
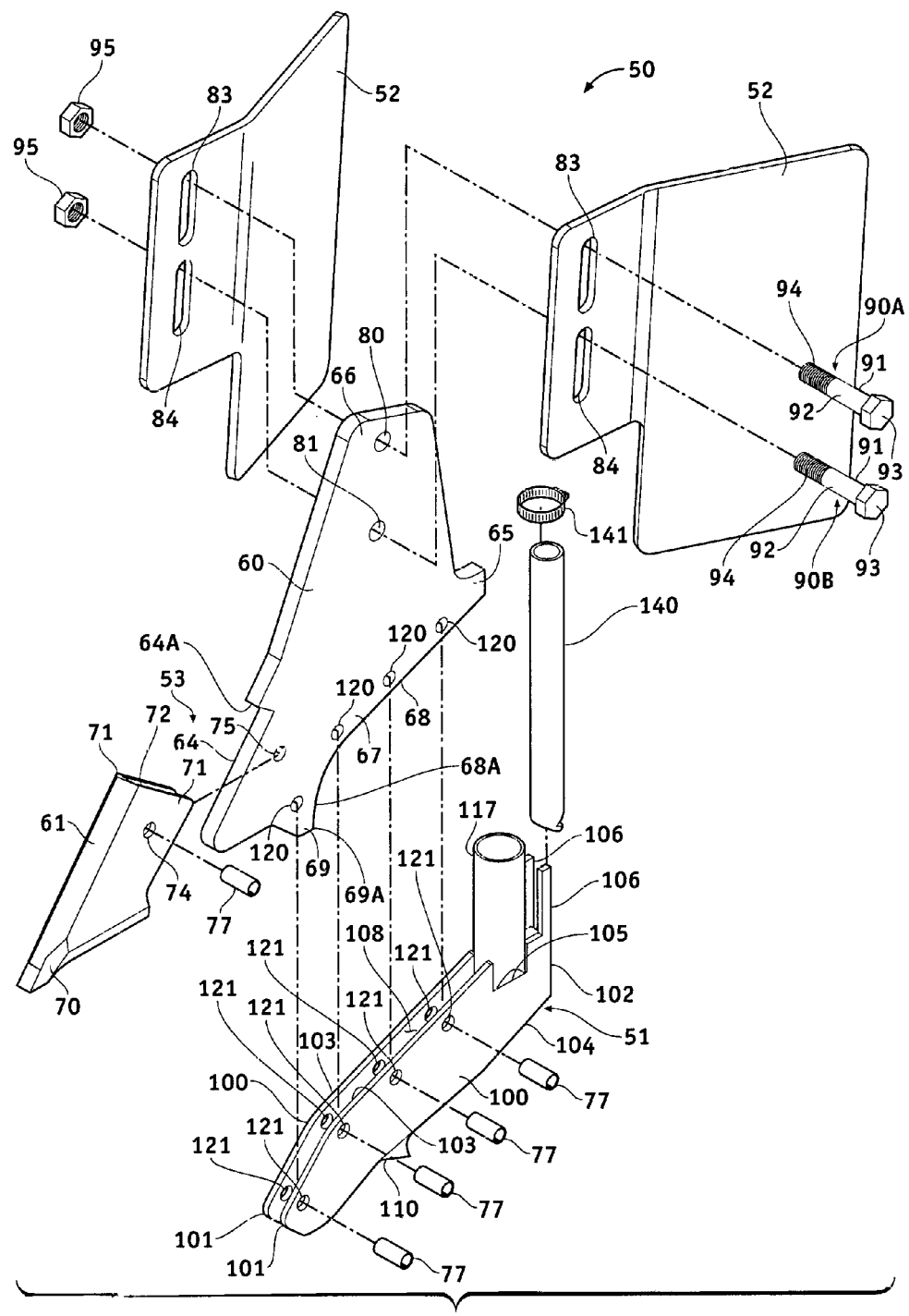
FIG. 3 is a front exploded perspective view of the agricultural seeder implement of FIG. 1.
Figure 4:
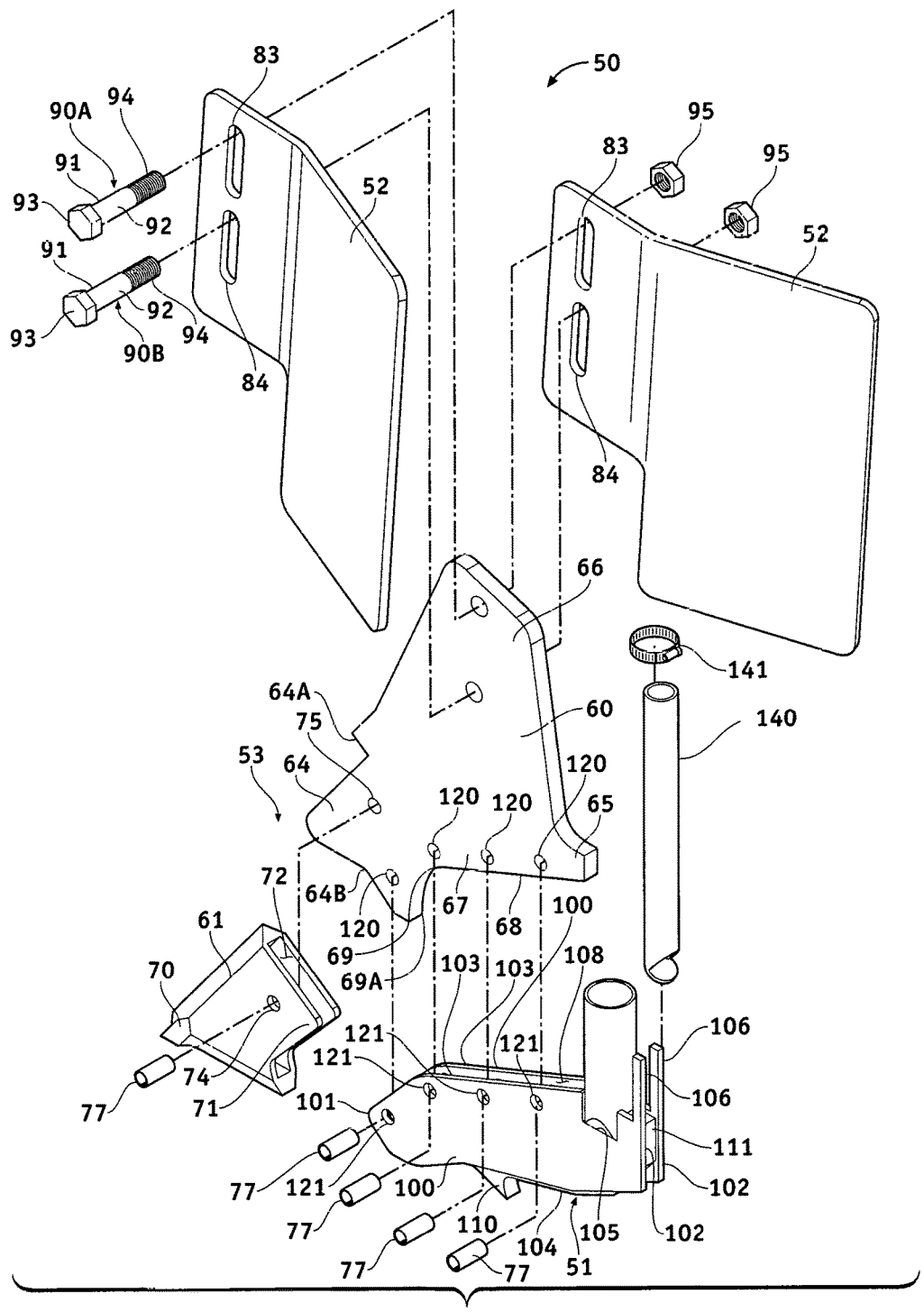
FIG. 4 is a rear perspective view of the embodiment of FIG. 3.

Opener 53 is an assembly of blade or plate 60 and cutting head 61. In FIGS. 3 and 4, plate 60 is flat and straight in a vertical direction, and is stout, strong, robust, and of substantial construction being formed of steel or other metal having inherently strong and resilient material characteristics. Plate 60 includes leading extremity 64, trailing extremity 65, and upper extremity 66 and lower extremity 67 that extend between leading extremity 64 and trailing extremity 65. Lower extremity extends along the lower portions of plate 60 from trailing extremity 65 to leading extremity 64. Lower extremity 67 has undersurface 68. Undersurface 68 extends from trailing extremity 65 and toward leading extremity 64 to edge 69A of downturned prominence 69 of lower extremity 67, downturned prominence 69, and edge 69A thereof, being located between leading extremity 64 and trailing extremity 65 and being nearer to leading extremity 64 than to trailing extremity 65.

Cutting head 61 is stout, strong, robust, and of substantial construction like that of plate 60, being formed of cast iron in this example or other selected metal material having inherently strong and resilient material characteristics, and is structured to be attached to, and carried by, leading extremity 64 of plate 60 shown in FIGS. 1 and 2 for cutting into the ground to form a furrow therein in the use of implement 50. In FIGS. 3 and 4, cutting head 61 has leading extremity 70, which is a wedge-like cutting edge to cut into the ground, and trailing extremity 71 that is adapted to be connected to leading extremity 64. Slot 72 in trailing extremity 71 accepts leading extremity 74 of plate 60 so as to align holes 74 formed in trailing extremity 71 of cutting head 61 on either side of hole 75 formed in leading extremity 64 of plate 60. Upper and lower portions of trailing extremity 71 of cutting head 61 are received in opposed cutout pockets 64A and 64B, denoted in FIGS. 3 and 4, formed in upper and lower sides of leading extremity 64, and this serves to seat cutting head 61 in place on leading extremity 64 of plate 60 in preparation for securing cutting head 61 to leading extremity 65. FIGS. 5-8 show an upper portion of trailing extremity 71 of cutting head 61 received up against cutout pocket 64A, and FIGS. 6 and 8 show a lower portion of trailing extremity 71 of cutting head 61 received up against cutout pocket 64B.

A spring pin 77, also called a tension pin or a roll pin, is a conventional mechanical fastener that secures the position of cutting head 61 to leading extremity 64 of plate 60. Conventionally, spring pin 77 has a body diameter which is larger than the hole diameter of holes 74 formed in trailing extremity 71 of cutting head 61 and the hole diameter of corresponding hole 75 formed in leading extremity 64 of plate 60. Spring pin 77 has the customary chamfer on either one or both ends to facilitate starting spring pin 77 into one of holes 74, and then spring pin 77 is forcibly driven, such as with a hammer or ram, into hole 75 of plate 60 and holes 74 of cutting head 61 on either side of hole 75, and the spring action of spring pin 77 allows it to compress as it assumes the hole diameters of the respective holes 74 and 75. The radial force exerted by spring pin 77 against the hole walls of the respective holes 74 and 75 concurrently retains it in the holes 74 and 75, whereby spring pin 77 acts as a self-retaining fastener releasably or otherwise removably connecting cutting head 61 to leading extremity 64 of plate 60. FIGS. 1, 2, 5-9, and 12-15 show cutting head 61 connected to plate 60. The described connection of cutting head 61 to plate 60 is a non-destructive releasable or removable coupling/connection, which allows cutting head 61 to be removed from leading extremity 64 of plate 60, such as for replacement or repair, simply by reversing the installation operation by forcibly removing spring pin 77 from the respective holes 74 and 75, such as with a hammer or ram, and separating cutting head 61 from leading extremity 64 of plate 60, all without the need to destroy cutting head 61 or plate 60 in the detaching process. The assembly of cutting head 61 and plate 60 form opener 53. When so assembled, leading extremity 70 of cutting head 61 defines the leading extremity of opener 53, and trailing extremity 65 of plate 60 defines the trailing extremity of opener 53.

Upper extremity 66 is structured to be concurrently connected to deflectors 52 and shank 54 as shown in FIGS. 1 and 2 with nut-and-bolt assemblies 90. Like plate 60, deflectors 52 are stout, strong, robust, and of substantial construction being formed of steel or other metal having inherently strong and resilient material characteristics. In FIGS. 3 and 4, upper extremity 66 is formed with a pair of vertically aligned upper and lower bolt holes 80 and 81, and each deflector 52 is formed with a corresponding pair of vertically aligned upper and lower elongate bolt holes 83 and 84. Deflectors 52 are positioned on either side of plate 60 so as to align upper bolt hole 80 of plate 60 with upper elongate bolt hole 83 of each said deflector 52 and to align lower bolt hole 81 of plate 60 with lower elongate bolt hole 84 of each said deflector 52 in preparation for removably connecting deflectors 52 to plate 60 and removably connecting implement 50 to shank 54 with upper and lower nut-and-bolt assemblies 90A and 90B, and deflectors 52 extend downwardly along either side of plate 60 rearwardly from trailing extremity 65 of plate 60 of opener 53 and angularly outwardly from either side of plate 60 of opener 53 in FIG. 9. Each nut-and-bolt assembly 90 includes bolt 91, consisting of a shank 92 having an end formed with an enlarged bolt head 93 and an opposed externally threaded end 94, and an internally threaded nut 95 that threads onto and secures the externally threaded end 94. Deflectors 52 and plate 60 are positioned alongside shank 54 so as to locate an innermost one of deflectors 52 directly against a flattened side of shank 54 so as to align an upper bolt hole of shank 54 with aligned upper elongate bolt holes 83 of each said deflector 52 and upper bolt hole 80 of plate 60, and so as to align a lower bolt hole of shank 54 with aligned lower elongate bolt holes 84 of each said deflector 52 and lower bolt hole 81 of plate 60. The externally threaded end 94 of bolt 91 of upper nut-and-bolt assembly 90A is concurrently inserted through the upper bolt hole of shank 54 and through upper elongate bolt hole 83 of the innermost deflector 52, upper bolt hole 80 of plate 60, and through upper elongate bolt hole 83 of the outermost deflector 52. The internally threaded nut 95 of upper nut-and-bolt assembly 90A is threaded onto externally threaded end 94 of bolt 91 of upper nut-and-bolt assembly 90A, and is tightened via rotation securing plate 60 and deflectors 52 to shank 54 between bolt head 93 located on the outer side of shank 54 and internally threaded nut 95 located on the outer side of the outermost one of deflectors 52. The externally threaded end 94 of bolt 91 of lower nut-and-bolt assembly 90B is concurrently inserted through the lower bolt hole of shank 54 and through lower elongate bolt hole 84 of the innermost deflector 52, lower bolt hole 81 of plate 60, and through lower elongate bolt hole 84 of the outermost deflector 52. The internally threaded nut 95 of lower nut-and-bolt assembly 90B is threaded onto externally threaded end 94 of bolt 91 of lower nut-and-bolt assembly 90B, and is tightened via rotation further securing plate 60 and deflectors 52 to shank 54 between bolt head 93 located on the outer side of shank 54 and internally threaded nut 95 located on the outer side of the outermost one of deflectors 52. This fastening together of deflectors 52, plate 60 of opener 53, and shank 54 via nut-and-bolt assemblies 90 releasably or otherwise removably secures implement 50 to shank 54, whereby implement 50 is suspended from shank 54 in FIGS. 1 and 2. To detach implement 50 from shank 50, the described operation of connecting implement 50 to shank 54 need only be reversed.

In FIGS. 3, 4, 10, and 11, seed boot 51 is elongate and is stout, strong, robust, and of substantial construction being formed of steel or other metal having inherently strong and resilient material characteristics. Seed boot 51 includes opposed, parallel and identical side sheets 100 rigidly affixed to either side of base 110. Each side sheet 100 has leading end 101, trailing end 102, upper and lower edges 103 and 104 that extend from leading end 101 to trailing end 102, cutout 105 in upper edge 103 proximate to trailing end 102, and stanchion 106 at trailing end 102 that extends upright from upper edge 103. Side sheets 100 are located on either side of base 110, and are rigidly affixed to base 110 via welding near the respective lower edges 104. Side sheets 100 are spaced apart so as to define space 108 therebetween in FIGS. 3, 4, and 11, and are axially aligned, are parallel relative to each other, and extend upright from either side of base 110 from lower edges 104 to upper edges 103, and stanchions 106 extend upright from upper edges 103 at rear extremities 102 of side sheets 100 and are parallel relative to each other.

Base 110 is elongate and has trailing end 111 axially aligned with trailing ends 102 of side sheets 100, and extends forwardly toward leading ends 101 of side sheets 100 concurrently with lower edges 104 to a leading end 112 that is short of, or otherwise inboard of, leading ends 101 of side sheets 100, such that the leading ends 101 of side sheets 100 form a forked end of seed boot 51. Base 110 has upper surface 114 and lower surface 115 that extend along the length of base 110 from trailing end 111 to leading end 112. Cutouts 105 are axially aligned and cooperate to form an inlet of seed boot 51 proximate to trailing ends 102 of side sheets 100 just inside of trailing end 111 of base 110, said inlet being denoted at 107 in FIG. 11. A vertical conduit 117 is rigidity affixed to cutouts 105 via welding forwardly of stanchions 106, and is for guiding a stream of air-driven seed into seed boot 51 through inlet 107. For reference purposes, leading ends 101 of side sheets 100 define the leading end of seed boot 51, and trailing ends 102 of side sheets 100 and trailing end 111 of base 110 define the trailing end of seed boot 51.

Figure 9:
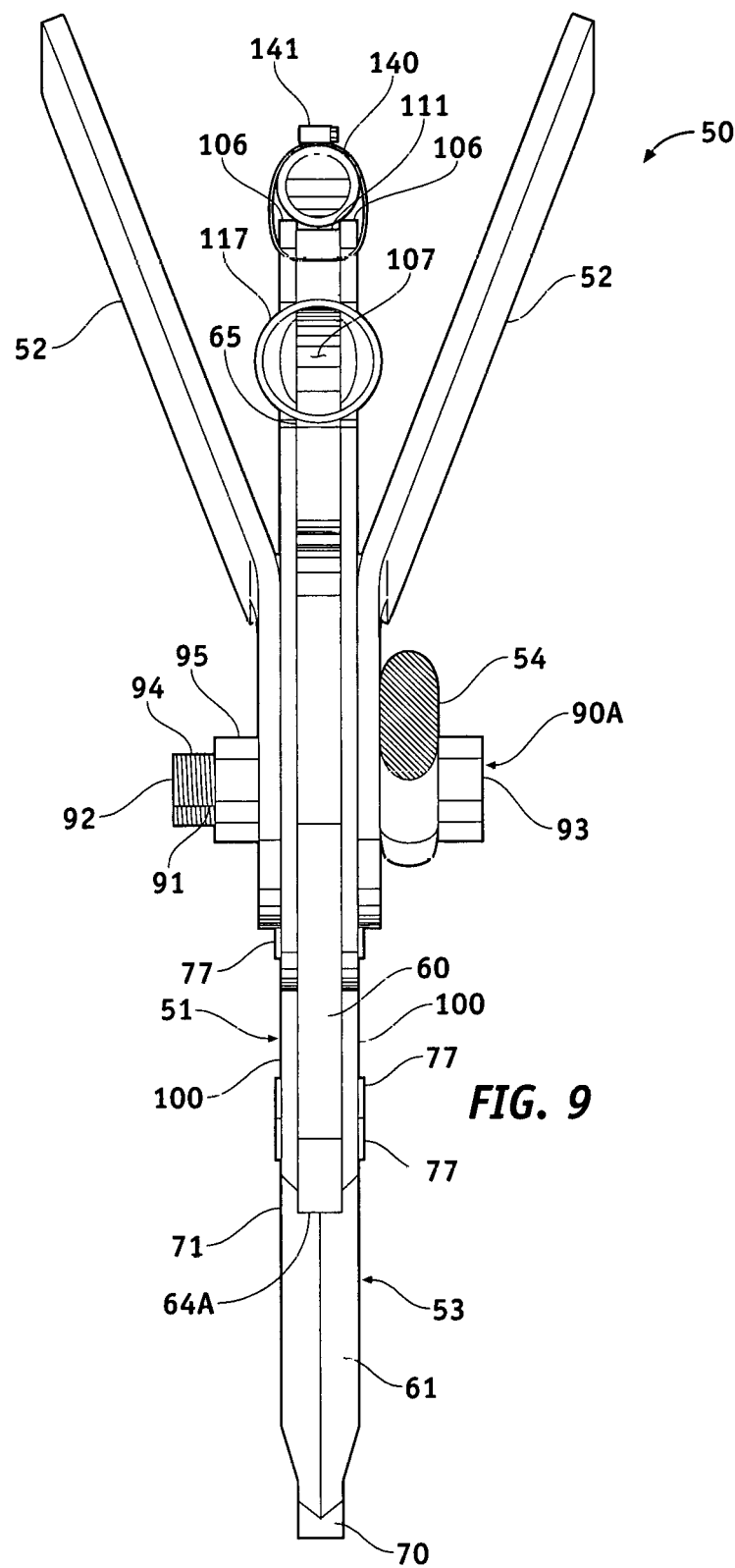
FIG. 9 is a top plan view of the embodiment of FIG. 1.

In implement 50, seed boot 51 is removably connected directly to opener 53 and, more particularly, directly to plate 60 of opener 53. Seed boot 51 is removably connected to lower extremity 67 of plate 60 so as to be suspended from lower extremity 67 of plate 60. Seed boot 51 extends along lower extremity 67 of plate 60 from leading ends 101 of side sheets 100 just behind cutting head 61 connected to leading extremity 64 to trailing ends 102 of side sheets 100 and trailing end 111 of base 100 behind trailing extremity 65 of plate 60 of opener 53 and squarely between deflectors 52 in the assembly of implement 50 as best shown in FIG. 9. Specifically, seed boot 51 is aligned with lower extremity 67 of plate 60 so as to align a length of lower extremity 67 of plate 60 from trailing extremity 65 to and including downturned prominence 69 with space 108 between side sheets 100 extending from conduit 117 applied to cutouts 105 to leading ends 101 of side sheets 100. The described length of lower extremity 67 of plate 60 from trailing extremity 65 to and including downturned prominence 69 is partially inserted into space 108 of seed boot 51 between upper edges 103 of side sheets 100 so as to locate a dimension of side sheets 100 extending downwardly from upper edges 103 of side sheets 100 on either side of plate 60 and align each hole 120 of a row such holes 120 formed in lower extremity 67 of plate 60 with a corresponding pair of axially-aligned holes 121 of a row of such axially-aligned pairs of holes 121 formed in side sheets 100 near upper edges 103. The row of holes 120 in lower extremity 67 of plate 60 extend between trailing extremity 65 and downturned prominence 69. The row of axially-aligned pairs of holes 121 in side sheets 100 are near upper edges 103 and extend between cutouts 105 defining inlet 107 and leading ends 101 of side sheets 100.

Spring pins 77 are installed in each set of three aligned holes, including one hole 120 of plate 60 that is between and aligned with a corresponding pair of axially-aligned holes 121 of seed boot 51. Spring pins 77 are forcibly driven in place into each said set of three aligned holes, such as with a hammer or ram, and the spring action of spring pins 77 allows them to compress as it assumes the hole diameter of each one of holes 120 and 121 hole of each said set of three aligned holes. The radial force exerted by spring pins 77 against the hole wall of each one of said holes 120 and 121 of each said set of three aligned holes concurrently retains it in the holes 120 and 121, whereby spring pins 77 acts as a self-retaining fasteners releasably or otherwise removably connecting seed boot 51 at side sheets 100 on either side of plate 60 to lower extremity 67 of plate 60. FIGS. 1, 2, 5-8, and 12-15 show seed boot 51 connected to plate 60. The described connection of seed boot 51 to plate 60 is a non-destructive releasable or removably coupling, which allows seed boot 51 to be removed from lower extremity 67 of plate 60 for replacement or repair by reversing the installation operation, such as by forcibly removing spring pins 77 from each said set of three aligned holes, such as with a hammer or ram, and separating seed boot 51 from lower extremity 67 of plate 60, without the need to destroy seed boot 51 or plate 60 in the detaching process.

Figure 12:
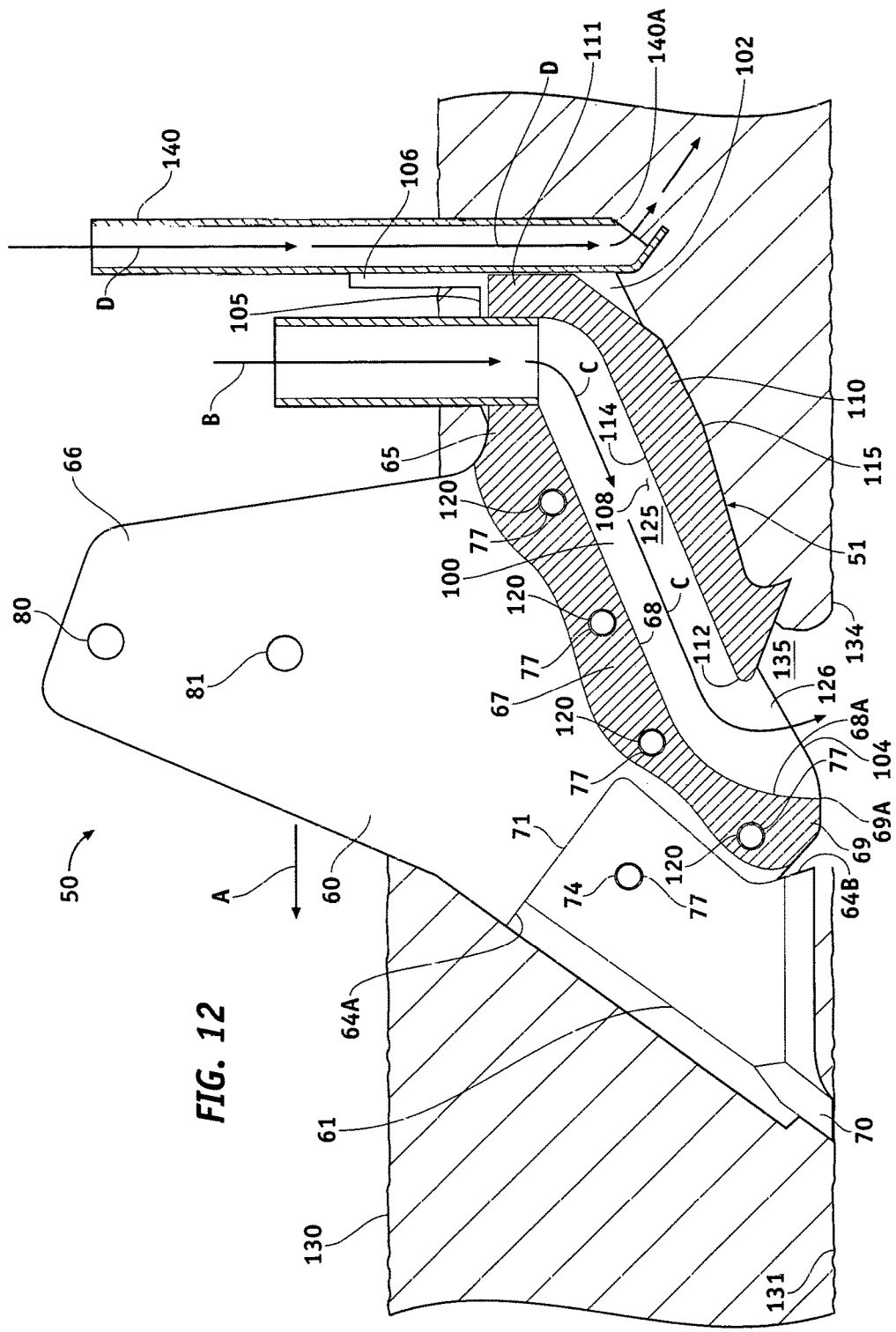
FIG. 12 is a left side elevation view of the embodiment of FIGS. 5-8 with portions of the seed boot of the agricultural seeder implement broken away for illustrative purposes.

With seed boot 51 so installed on plate 60 of opener 53, seed boot 51 is suspended from lower extremity 67 under undersurface 68 of plate 60 as shown in FIG. 12 and behind cutting head 61 connected to leading extremity 64 of plate 60 so as to follow cutting head 61 applied to leading extremity 64 of plate 60 of opener 53. In FIG. 12, seed boot 51 extends forwardly from inlet 107 of the trailing end of seed boot 51 located behind trailing extremity 65 of plate 60 to the leading end of seed boot defined by leading ends 101 of side sheets 100 at downturned prominence 69 in FIGS. 6 and 8 behind trailing extremity 71 of cutting head 61 in FIGS. 1, 2, 5-8, and 13-15. In FIG. 12, conduit 117 extends into inlet 107 and extends upright therefrom between trailing extremity 65 of plate 60 of opener 53 and trailing end 111 of base 110 squarely between deflectors 52 in the assembly of implement 50 as in FIG. 9. Base 110, in turn, extends forwardly under undersurface 68 from its trailing end 111 behind trailing extremity 65 of plate 60 to its leading end 112 behind or otherwise inboard of edge 69A of downturned prominence 69. Base 110 is spaced apart from and under undersurface 68. Undersurface 68 faces downwardly into space 108 toward upper surface 114 of base 110 and upper surface 114 of base 110 faces upwardly into space 108 toward undersurface 68, whereby undersurface 68 of plate 60 and upper surface 114 of base 110 of seed boot 51 cooperate to enclose space 108 so as to form channel 125, which extends forwardly through seed boot 51 from inlet 107 of seed boot 51 proximate to trailing extremity 65 of opener 53 to outlet 126 behind leading extremity 64 and cutting head 61 of opener 53. Outlet 126 is defined at the forked end of seed boot 51 by and between edge 69A of downturned prominence 69 of plate 60, leading end 112 of base 110 of seed boot 51, and the lower edge 104 of each said side sheet 100 extending between edge 69A and leading end 112 of base 110, and is pointed downwardly from seed boot 51 so as to be pointed downwardly into a furrow cut by opener 53 in the use of implement 50 for sowing a crop.

And so implement 50 includes seed boot 51 connected directly to opener 53 having a leading extremity, consisting of leading extremity 70 of cutting head 61, and a trailing extremity, consisting of trailing extremity 65 of plate 60. Seed boot 51 and opener 53 form channel 125 and outlet 126, and channel 125 extends forwardly from inlet 107 of seed boot 51 proximate to the trailing extremity of opener 53 defined as trailing extremity 65 of plate 60 to outlet 126 behind cutting head 61 and, moreover, behind leading extremity of opener 53 defined as leading extremity 70 of cutting head 61. In FIGS. 1 and 2 illustrating implement 50 assembled and suspended from shank 54, upper extremity 66 of opener 53 is concurrently connected to shank 54 and deflectors 52. Opener 53 and deflectors 52 concurrently depend downwardly from shank 54 to seed boot 51 located behind cutting head 61 of opener 53. In FIG. 9, deflectors 52 are positioned on either side of plate 60 of opener 53 and seed boot 51 and extend rearwardly from seed boot 51 and trailing extremity 65 of plate 60 of opener 53 and angularly outwardly from either side of trailing extremity 65 plate 60 of opener 53 between deflectors 52 and the trailing end of seed boot 51 between deflectors 52.

Figure 15:
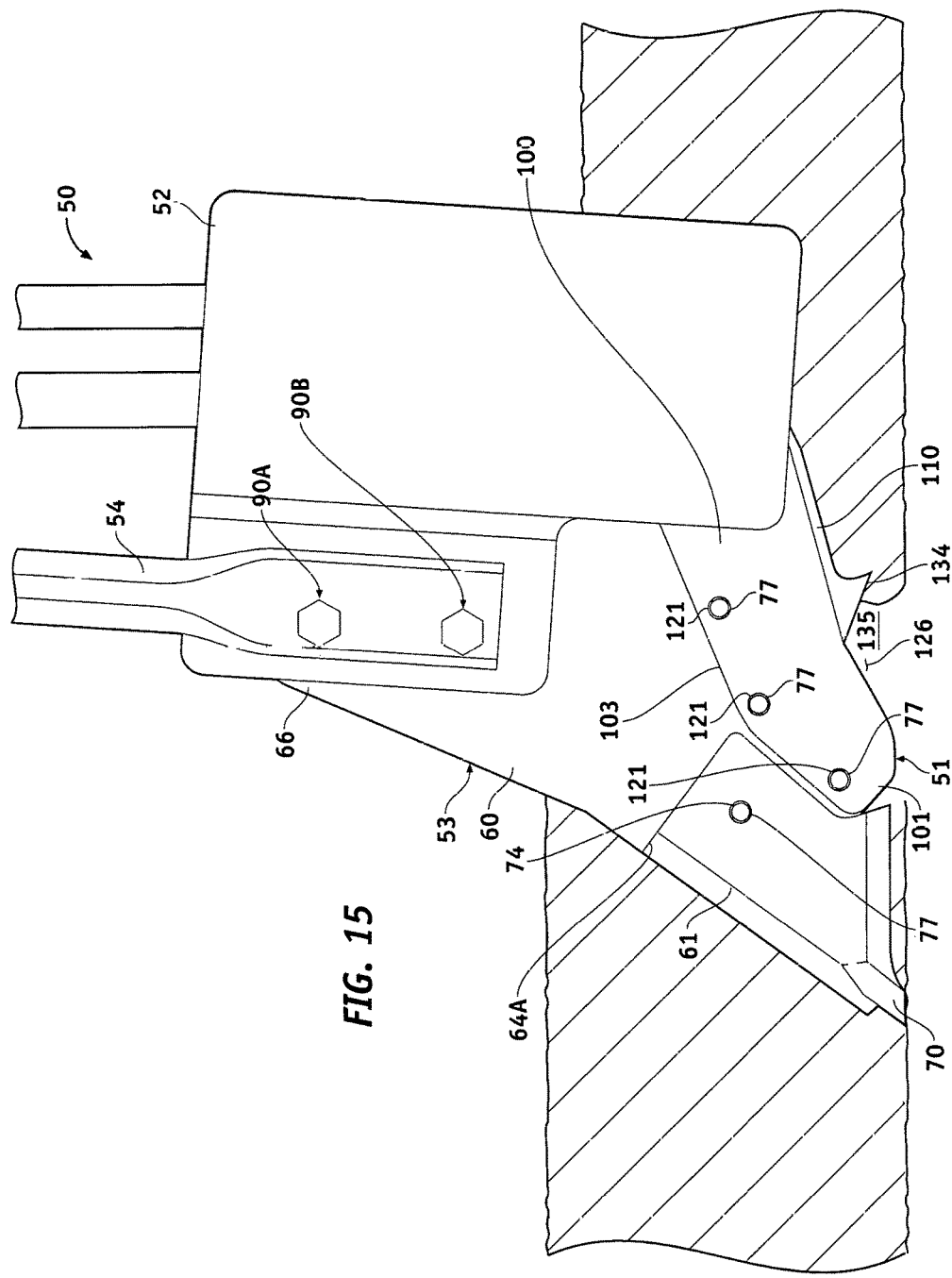
FIG. 15 is a view of the embodiment of FIG. 14 depicting the agricultural seeder implement as it would appear in use.

In use, implement 50 is suspended from shank 54, and shank 54, in turn, is conventionally connected to a plow frame that is pulled by a tractor for pulling opener 53 at a preselected depth through surface 130 of the ground in a direction of arrowed line A in FIGS. 12 and 15 from leading extremity 70 of cutting head 61 of opener 53 to the trailing extremity of opener 53 and the trailing end of seed boot 51 for cutting furrow 131 in the ground beneath surface 130 ahead of seed boot 51 by leading extremity 70 of cutting head 61 that, in turn, defines the leading extremity of opener 53. Referencing FIG. 12, seeds are conventionally conveyed by an air stream from a seed hopper to conduit 117 in the direction of arrowed line B, which conveys such stream of air-driven seeds into channel 125 through inlet 107. Channel 125 is for guiding the stream of air-driven seed forwardly through channel 125 in the direction of arrowed lines B in FIG. 12 from inlet 107 and into furrow 131 through outlet 126, which is directed downwardly in furrow 131. Channel 125 is downturned proximate to outlet 126 by a downturned portion 68A of undersurface 68 of plate 60 near and leading to outlet 126. This described downturn of channel 125 near, proximate to, or otherwise toward outlet 126 is for guiding the stream of air-driven seed downwardly into furrow 131 through outlet 126 that points downwardly toward the bottom of furrow 131.

In FIG. 12, seed boot 51 has a deflector 134. Deflector 134 is a deflecting surface of lower surface 115 of base 110 that is formed in leading end 112 behind outlet 126 and that is down-angled forwardly toward the stream of air-driven seed exiting outlet 126 for consolidating the stream of air-driven seed downwardly into furrow 131 in a region 135 rearwardly of outlet 126 under deflector 134 as implement 50 is drawn forwardly through the ground in the direction of arrowed line A. As implement 50 is pulled through the ground, the seed is continually deposited into furrow 131 through outlet 126. The consolidation of the stream of air-driven seed into region 135 by deflector 134 inhibits the seed from scattering to ensure deposition of the seed into furrow 131. Deflectors 52 keep furrow 131 open behind outlet 126 to facilitate the application of a preselected fertilizer into furrow 131 adjacent to the applied seeds. In this embodiment in FIGS. 2-9, an upright fertilizer tube 140 is connected to the back side stanchions 140 of seed boot 51 with band coupling 141 in this example. A preselected fertilizer material is continuously conveyed from a fertilizer hopper to fertilizer tube 140, and fertilizer tube 140 is for conveying the fertilizer material therethrough in the direction of arrowed lines D in FIG. 12 to outlet 140A of fertilizer tube 140 for application therethrough to furrow 131 adjacent to the deposited seeds.

Figure 13:
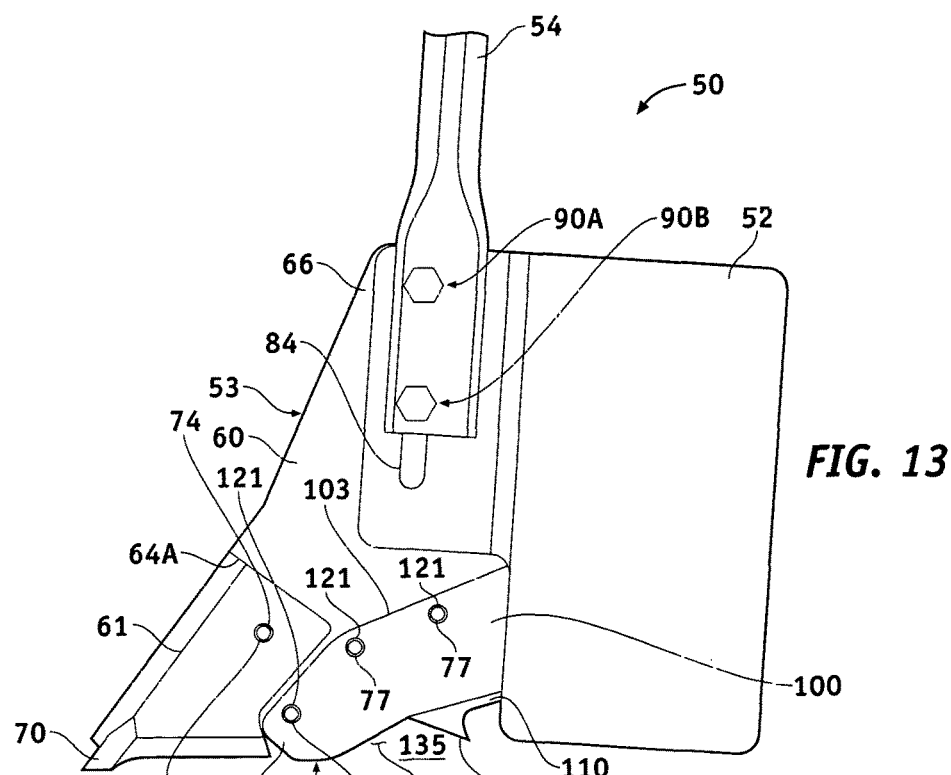
FIG. 13 is a left side elevation view of the embodiment of FIG. 1 showing a left side deflector thereof in a lowered position.
Figure 14:
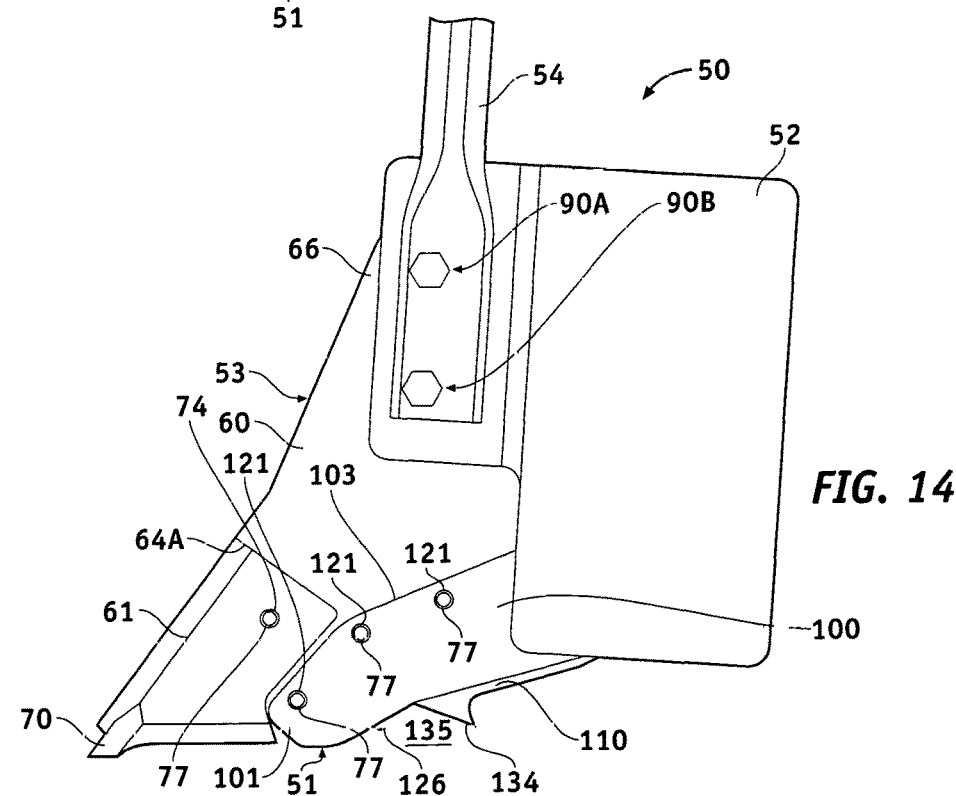
FIG. 14 is a view similar to that of FIG. 13 showing the left side deflector in a raised position.

Upper and lower elongate bolt holes 83 and 84 of deflectors 52 allow deflectors 52 to be adjusted between raised and lowered positions depending on the needs of the farmer before tightening them down via nut-and-bolt assemblies 90. As a matter of example, FIG. 13 is a left side elevation view of the embodiment of FIG. 1 showing the left side deflector thereof in a lowered position, in which the opposite right side deflector 52 is also in the lowered position but is concealed by the left side deflector 52. FIG. 14 is a left side elevation view similar to that of FIG. 13 showing the left side deflector thereof in a raised position, in which the opposite right side deflector 52 is also in the raised position but is concealed by the left side deflector 52. In the lowered position of deflectors 52, as in FIGS. 1, 2, and 13, deflectors 52 are lowered toward the bottom of the furrow formed by opener 53 for keeping the furrow open near to or otherwise close to the applied seeds to allow the fertilizer to be applied close to the seeds from outlet 140A of fertilizer tube 140. In the raised position of deflectors 52 in FIGS. 14 and 15, deflectors 52 are raised away from the bottom of the furrow formed by opener 53 for keeping the furrow open above the applied seeds to allow the furrow to close over the seeds applied to the bottom of the formed furrow under seed boot 51 to facilitate the application of fertilizer atop the soil that closes over the seeds applied to the bottom of the furrow formed by opener 53. In the lowered position of deflectors 52, fertilizer banding is thus effected from outlet 140A of fertilizer tube 140 close to the deposited seeds. In the raised position of deflectors 52, fertilizer banding is thus effected from outlet 140A of fertilizer tube 140 away from and above the deposited seeds relative to the lowered positions of deflectors 52 onto the soil the closes over the deposited seeds. Depending on the needs of the farmer of how close fertilizer banding is desired to be effected adjacent to the applied seeds, the farmer can adjust deflectors 52 to any position between the raised position of each said deflector 52 and the lowered position of each said deflector so as to effect fertilizer banding from outlet 140A of fertilizer conduit 140 to a preselected location adjacent to the applied seeds.

The above discussion is limited to the operation of one implement 50. Those having regard for the art will readily appreciate that a plow frame can incorporate ten, twenty, thirty, forty, fifty or more such concurrently operating implements 50 to provide the concurrent seeding and fertilizing of numerous furrows.

II.

Figure 16:
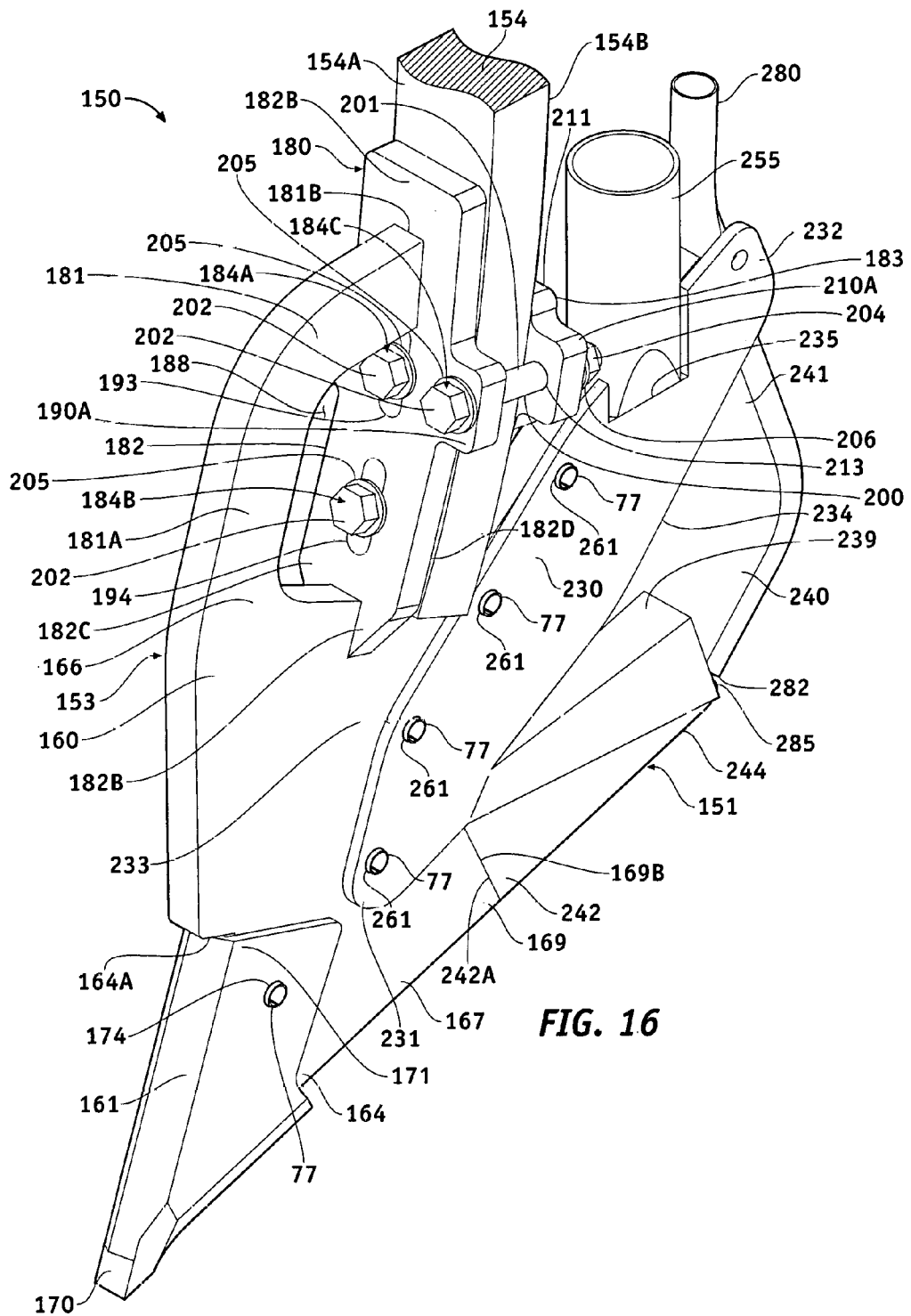
FIG. 16 is a front perspective view of another embodiment of an agricultural seeder implement constructed and arranged in accordance with the principle of the invention, the agricultural seeder implement includes a seed boot connected to an opener mounted to a shank with a buckle assembly in preparation for use of the agricultural seeder implement for sowing a crop.
Figure 17:
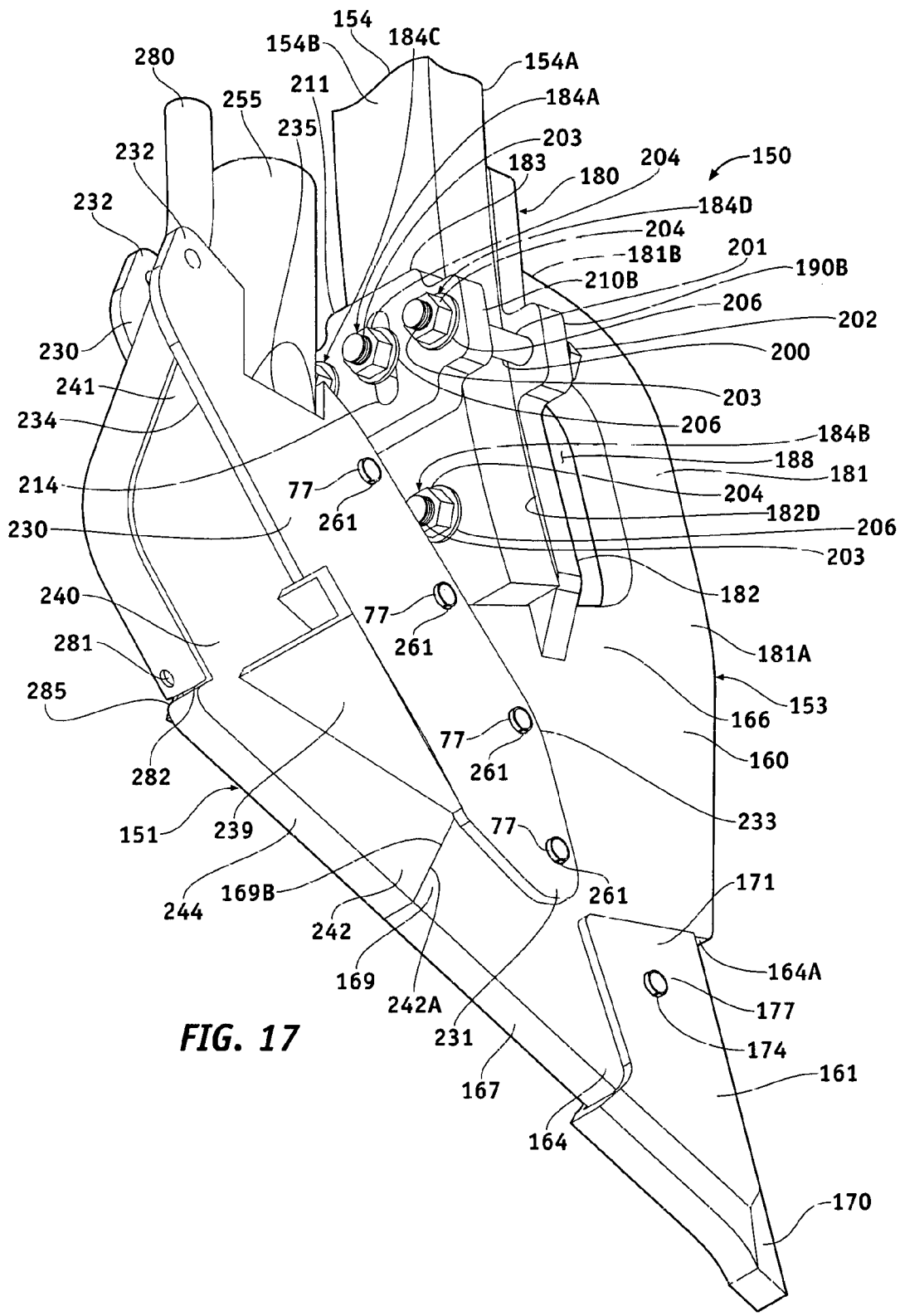
FIGS. 17 and 18 are rear perspective views of the agricultural seeder implement of FIG. 16.
Figure 18:
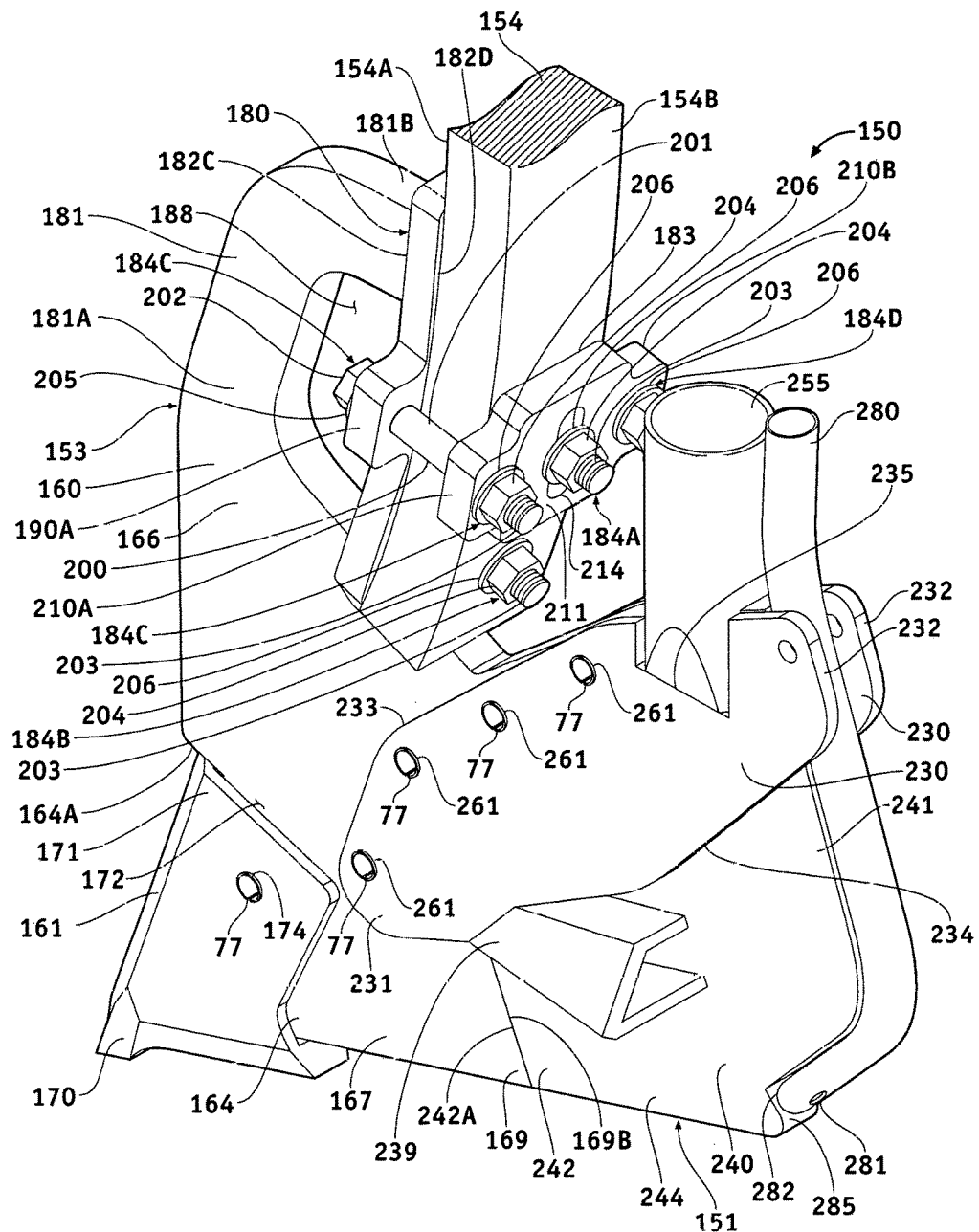

Attention is now directed to FIGS. 16, 17, and 18, in which there is seen another embodiment of an agricultural seeder implement 150 constructed and arranged in accordance with the principle of the invention. Implement 150 includes seed boot 151 connected to opener 153, and is shown as it would appear assembled and suspended from a shank 154 of a plow frame (not shown) in preparation for use of implement 150 for sowing a crop. Like opener 53 discussed above, opener 153 is a chisel, which is a form of a non-moving and non-rotating opener for being pulled by a tractor for cutting a furrow in the ground at a preselected depth from the surface of the ground, and seed boot 151 connected to opener 153 is for receiving a stream of air-driven seed and depositing said stream of air-driven seed into the furrow formed by opener 153.

Figure 19:
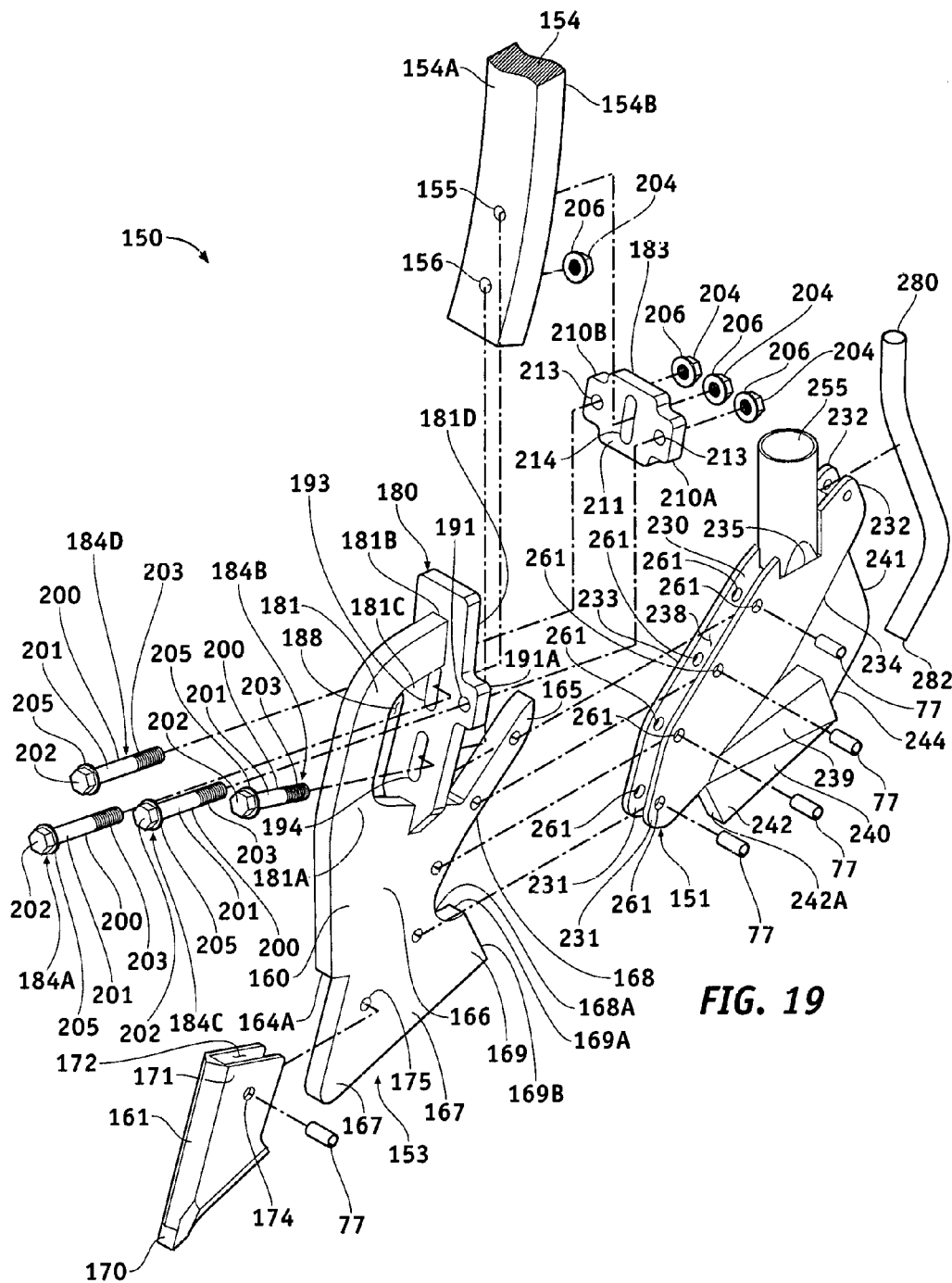
FIG. 19 is a front exploded perspective view of the agricultural seeder implement of FIG. 16.
Figure 20:
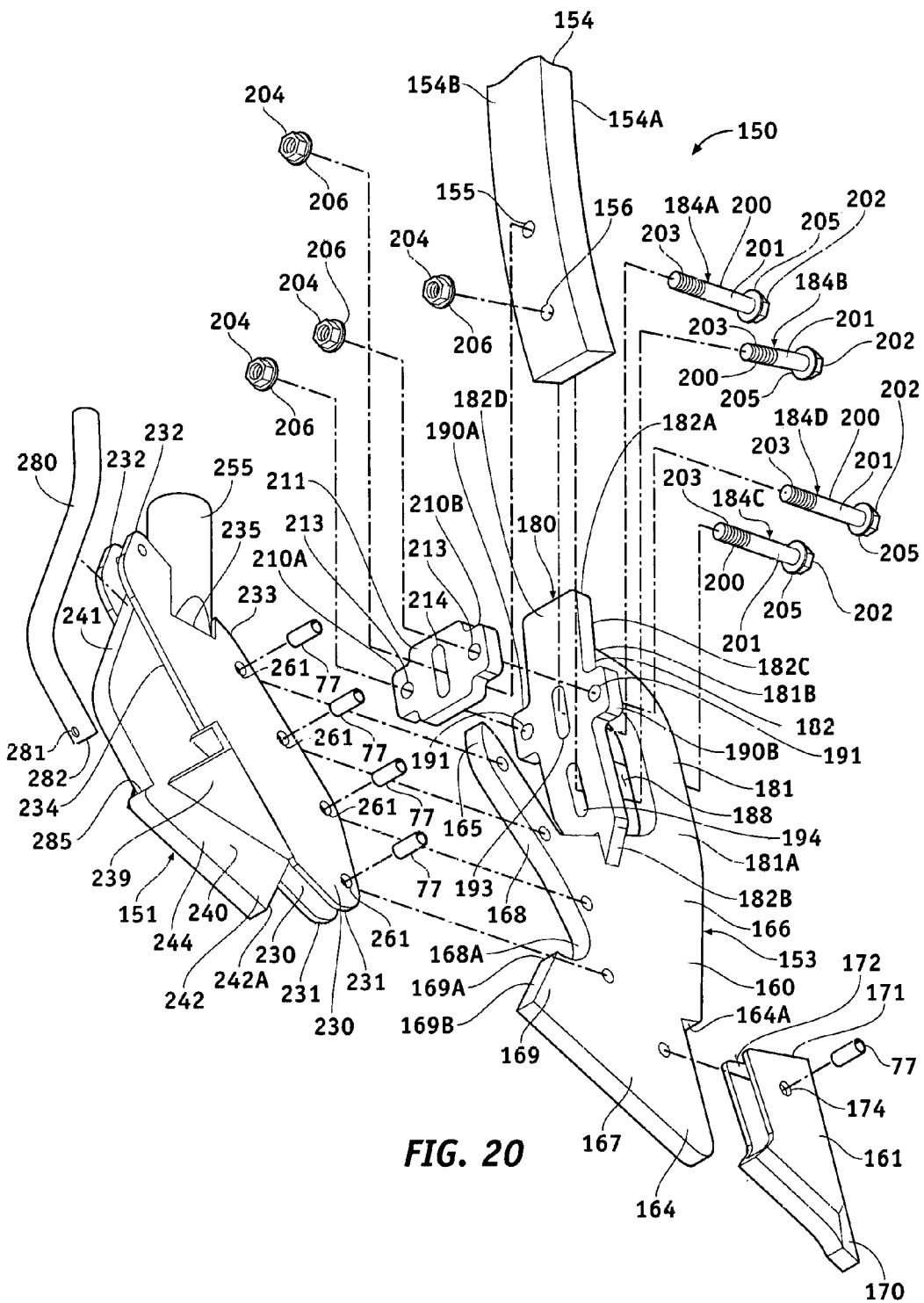
FIG. 20 is a rear elevation view of the embodiment of FIG. 16.

Opener 153 is an assembly of blade or plate 160 and cutting head 161. In FIGS. 19 and 20, plate 160 is flat and straight in a vertical direction, and is stout, strong, robust, and of substantial construction being formed of steel or other metal having inherently strong and resilient material characteristics. Plate 160 includes leading extremity 164, trailing extremity 165, and upper extremity 166 and lower extremity 167 that extend between leading extremity 164 and trailing extremity 165. Lower extremity 167 has undersurface 168 that extends from trailing extremity 165 toward leading extremity 164 to a U-shaped hairpin in-turned portion 168 that inturns rearwardly in a direction toward trailing extremity 165 to edge 169A of a prominence 169 of lower extremity 167. Prominence 169 is in-turned away from leading extremity 164 and toward trailing extremity 165 terminating at rearward-facing surface 169B that extends downwardly from edge 169A to lower extremity 167, in-turned prominence 169, including edge 169A and surface 169B thereof, being located between leading extremity 164 and trailing extremity 165.

Cutting head 161 is stout, strong, robust, and of substantial construction like that of plate 160, being formed of cast iron in this example or other selected metal material having inherently strong and resilient material characteristics, and is structured to be attached to, and carried by, leading extremity 164 of plate 160 shown in FIGS. 16, 17, and 18. In FIGS. 19 and 20, cutting head 61 has leading extremity 170, which is a wedge-like cutting edge to cut into the ground, and trailing extremity 171 that is adapted to be connected to leading extremity 164 of plate 160 of opener 153. Slot 172 in trailing extremity 171 accepts leading extremity 164 of plate 160 so as to align holes 164 formed in trailing extremity 171 of cutting head 161 on either side of hole 175 formed in leading extremity 164 of plate 60. An upper portion of trailing extremity 171 of cutting head 161 is received in cutout pocket 164A formed in the upper side of leading extremity 64, and this serves to seat cutting head 161 in place on leading extremity 164 of plate 160 in preparation for securing cutting head 161 to leading extremity 165 with spring pin 77. FIGS. 16 and 17 show an upper portion of trailing extremity 171 of cutting head 161 received up against cutout pocket 164A.

As in implement 50, spring pin 77, also called a tension pin or a roll pin, is a conventional mechanical fastener that secures the position of cutting head 161 to leading extremity 164 of plate 160. Conventionally, spring pin 77 has a body diameter which is larger than the hole diameter of holes 174 formed in trailing extremity 171 of cutting head 161 and the hole diameter of corresponding hole 175 formed in leading extremity 164 of plate 160. Spring pin 77 has the customary chamfer on either one or both ends to facilitate starting spring pin 77 into one of holes 174, and then spring pin 77 is forcibly driven, such as with a hammer or ram, into hole 175 of plate 160 and holes 174 of cutting head 161 on either side of hole 175, and the spring action of spring pin 77 allows it to compress as it assumes the hole diameters of the respective holes 174 and 175. The radial force exerted by spring pin 77 against the hole walls of the respective holes 174 and 175 concurrently retains it in the holes 174 and 175, whereby spring pin 77 acts as a self-retaining fastener releasably or otherwise removably connecting cutting head 161 to leading extremity 64 of plate 160. FIGS. 16-18, 21, 22, and 26 show cutting head 161 connected to plate 160. The described connection of cutting head 161 to plate 160 is a non-destructive releasable or removable coupling/connection, which allows cutting head 161 to be removed from leading extremity 164 of plate 160, such as for replacement or repair, simply by reversing the installation operation by forcibly removing spring pin 77 from the respective holes 174 and 175, such as with a hammer or ram, and separating cutting head 161 from leading extremity 164 of plate 160, all without the need to destroy cutting head 161 or plate 160 in the detaching process. The assembly of cutting head 161 and plate 160 form opener 153. When so assembled, leading extremity 170 of cutting head 161 defines the leading extremity of opener 153, and trailing extremity 165 of plate 160 defines the trailing extremity of opener 153.

In FIGS. 16-18, implement 150 includes a buckle assembly 180 that is used to connect implement 150 to shank 154 in FIGS. 16-18. Buckle assembly 180 connects upper extremity 166 of plate 160 of opener 153 to shank 154 so as to connect implement 150 to shank 154. In FIGS. 16-20, buckle assembly 180 includes arm 181, bracket 182, coupling 183, and four nut-and-bolt assemblies 184 for fastening together shank 154, bracket 152 and coupling 153.

Arm 181 and bracket 182 are parts of plate 160, are fashioned of the same material as plate 160, are extensions of upper extremity 166 of plate 160, and extend upright from upper extremity 166. Bracket 182 is between arm 181 and trailing extremity 165, and has upper end 182A, lower end 182B, front face 182C, and rear face 182D. Arm 181 has a lower end 181A that is integrally formed with upper extremity 167 of plate 160. Arm 181 extends upwardly from lower end 181A at upper extremity 166 of plate 160 and curves rearwardly to upper end 181B, which is rigidly connected via welding to front face 182C of bracket 182 proximate to upper end 182A. Bracket 182 depends downwardly from upper end 182A to lower end 182B rigidly connected via welding to upper extremity 166 of plate 160 between lower end 181A of arm 181 and trailing extremity 165 of plate 160. Arm 181 and bracket 182 encircle opening 186 that extends from upper ends 181B and 182A and lower ends 181A and 182B. Opening 186 facilitates the installation of nut-and-bolt assemblies 184A and 184B as described below. The open structure formed by arm 181 and bracket 182 imparts structural rigidity and strength to buckle assembly 180.

Referring in relevant part to FIGS. 19 and 20, bracket 182 has tabs 190A and 190B that extend outwardly from either side of bracket 182 between upper end 181B of arm 181 connected to upper end 182A of bracket 182, and lower end 182B of bracket 182. A bolt hole 191 extends through each one of tabs 190A and 190B from front face 182C of bracket 182 to rear face 182D of bracket 182. A pair of upper and lower elongate bolt holes 193 and 194 extend through bracket 182 from front face 182C to rear face 182D. Upper and lower elongate bolt holes 193 and 194 are formed in bracket 182 between upper end 181B of arm 181 connected to upper end 182A of bracket 182, and lower end 182B of bracket 182. Bolt holes 191 are horizontally aligned, upper elongate bolt hole 193 is located between bolt holes 191 and above lower elongate bolt hole 194, and upper and lower elongate bolt holes 193 and 194 are vertically aligned.

In FIGS. 19 and 20, each nut-and-bolt assembly 184 includes bolt 200, consisting of a shank 201 having an end formed with an enlarged bolt head 202 and an opposed externally threaded end 203, an internally threaded nut 204 that threads onto and secures the externally threaded end 203, and washers 205 and 206. Shank 154 has front face 154A, rear face 154B, and a pair of upper and lower bolt holes 155 and 156 that extend through shank 154 from front face 154A to rear face 154C. Coupling 183 has tabs 210A and 210B formed on either side of a middle 211. A bolt hole 213 extends through each of tabs 210A and 210B, and elongate bolt hole 214 extends through middle 211. Elongate bolt hole 214 extends in a vertical direction, and is located between bolt holes 213, which are horizontally aligned.

To fasten implement 150 to shank 154 with buckle assembly 180, rear face 182D of bracket 182 is positioned directly against front face 154A of bracket 182 so as to axially align upper and lower elongate bolt holes 193 and 194 of bracket 182 with the respective upper and lower bolt holes 155 and 156 of shank 154. Coupling 183 is, in turn, positioned directly against rear face 154B of shank 154 so as to axially align bolt holes 213 of tabs 210A and 210B that extend outwardly from either side of shank 154 with corresponding bolt holes 191 of tabs 190A and 190B of bracket 182 that extend outwardly from either side of shank 154, and further so as to axially align elongate bolt 214 in middle 211 of coupling 183 with upper elongate bolt hole 193 of bracket 182. Nut-and-bolt assemblies 184A-184B are then installed to fasten buckle assembly 180 to shank 154 for removably connecting implement 150 to shank 154. The installation of nut-and-bolt assemblies 184A-184B will now be discussed.

Bolt 200 of nut-and-bolt assembly 184A is maneuvered into opening 186 and externally threaded end 203 is inserted through upper elongate bolt hole 193 of bracket 182, upper bolt hole 155 of shank 154, and then through elongate bolt hole 214 formed in middle 211 of coupling 183, and internally threaded nut 204 of nut-and-bolt assembly 184A is threaded onto externally threaded end 204 of bolt 200 on the outer side of coupling 183 and is tightened down via rotation against washer 206 applied directly against the outer side of coupling 183 closing the distance between internally threaded nut 204 and bolt head 202 thereby concurrently tightening down bolt head 202 against washer 205 applied directly against front face 182C of bracket 182 and internally threaded nut 204 against washer 206 applied directly against the outer side of coupling 183 thereby urging bracket 182 and coupling 183 together clamping shank 154 between rear face 182D of bracket 182 applied against front face 154A of shank 154 and coupling 183 applied directly against rear face 154B of shank 154. In nut-and-bolt assembly 184A, washer 205 encircles shank 201 under bolt head 202 and washer 206 encircles shank 201 under internally threaded nut 204. Washers 205 and 206 spread the load when nut-and-bolt assembly 184A is tightened down clamping shank 154 between bracket 182 applied directly against front face 154A of shank 154 and coupling 183 applied directly against rear face 154B of shank 154.

Bolt 200 of nut-and-bolt assembly 184B is maneuvered into opening 186 and externally threaded end 203 is inserted through lower elongate bolt hole 194 of bracket 182 and through lower bolt hole 156 of shank 154, and internally threaded nut 204 of nut-and-bolt assembly 184B is threaded onto externally threaded end 204 of bolt 200 on the outer side of rear face 154B of shank 154 and is tightened down via rotation against washer 206 applied directly against rear face 154B of shank 154 closing the distance between internally threaded nut 204 and bolt head 202 thereby concurrently tightening down bolt head 202 against washer 205 applied directly against front face 182C of bracket 182 and internally threaded nut 204 against washer 206 applied directly against rear face 154 of shank 154 thereby urging shank 154 and bracket 182 together securing front face 154A of shank directly against rear face 182D of shank 154. In nut-and-bolt assembly 184B, washer 205 encircles shank 201 under bolt head 202 and washer 206 encircles shank 201 under internally threaded nut 204. Washers 205 and 206 spread the load when nut-and-bolt assembly 184B is tightened down clamping together shank 154 and bracket 182. Upper and lower elongate bolt holes 193 and 193 of bracket 182 and elongate bolt hole 214 of coupling 183 allow bracket 182 and coupling 183 to be adjusted upwardly and downwardly depending on the needs of the farmer before tightening them down to shank 154 via nut-and-bolt assemblies 184A and 184B. To complete the installation, tabs 190A and 210A extending outwardly from one side of shank 154 are secured via nut-and-bolt assembly 184C, and tabs 190B and 210B extending outwardly from the opposite side of shank 154 are secured via nut-and-bolt assembly 184C.

The externally threaded end 203 of bolt 200 of nut-and-bolt assembly 184C is inserted through bolt hole 191 of tab 190A of bracket 182 and past the outer side of shank 154 from front face 154A of shank 154 to rear face 154B of shank 154 and through bolt hole 213 of tab 210A of coupling 183, and internally threaded nut 204 of nut-and-bolt assembly 184C is threaded onto externally threaded end 204 of bolt 200 on the outer side of tab 210A and is tightened down via rotation against washer 206 applied directly against the outer side of tab 210A of coupling 183 closing the distance between internally threaded nut 204 and bolt head 202 thereby concurrently tightening down bolt head 202 against washer 205 applied directly against front face 182C of tab 190A of bracket 182 and internally threaded nut 204 against washer 206 applied directly against the outer side of tab 210A of coupling 183 thereby urging tabs 190A and 210A together further clamping shank 154 between rear face 182D of bracket 182 applied against front face 154A of shank 154 and coupling 183 applied directly against rear face 154B of shank 154. In nut-and-bolt assembly 184C, washer 205 encircles shank 201 under bolt head 202 and washer 206 encircles shank 201 under internally threaded nut 204. Washers 205 and 206 spreads the load when nut-and-bolt assembly 184C is tightened clamping shank 154 between bracket 182 applied directly against front face 154A of shank 154 and coupling 183 applied directly against rear face 154B of shank 154.

Finally, the externally threaded end 203 of bolt 200 of nut-and-bolt assembly 184D is inserted through bolt hole 191 of tab 190B of bracket 182 and past the opposed outer side of shank 154 from front face 154A of shank 154 to rear face 154B of shank 154 and through bolt hole 213 of tab 210B of coupling 183, and internally threaded nut 204 of nut-and-bolt assembly 184D is threaded onto externally threaded end 204 of bolt 200 on the outer side of tab 210B and is tightened down via rotation against washer 206 applied directly against the outer side of tab 210B of coupling 183 closing the distance between internally threaded nut 204 and bolt head 202 thereby concurrently tightening down bolt head 202 against washer 205 applied directly against front face 182C of tab 190B of bracket 182 and internally threaded nut 204 against washer 206 applied directly against the outer side of tab 210B of coupling 183 thereby urging tabs 190B and 210B together still further clamping shank 154 between rear face 182D of bracket 182 applied against front face 154A of shank 154 and coupling 183 applied directly against rear face 154B of shank 154. In nut-and-bolt assembly 184D, washer 205 encircles shank 201 under bolt head 202 and washer 206 encircles shank 201 under internally threaded nut 204. Washers 205 and 206 spreads the load when nut-and-bolt assembly 184D is tightened clamping shank 154 between bracket 182 applied directly against front face 154A of shank 154 and coupling 183 applied directly against rear face 154B of shank 154.

The described fastening of buckle assembly 180 to shank 154 via nut-and-bolt assemblies 184A-184D firmly and removably/releasably connects implement 150 to shank 154 so as to suspend implement 150 from shank 154 in FIGS. 16-18. To detach implement 150 from shank 150, such as for repair, maintenance, or replacement, the described operation of connecting implement 150 to shank 154 need only be reversed.

In FIGS. 19, 20, 23, and 24, seed boot 151 is elongate and is stout, strong, robust, and of substantial construction being formed of steel or other metal having inherently strong and resilient material characteristics. Seed boot 151 includes opposed, parallel and identical side sheets 230 rigidly affixed to either side of base 240. Each side sheet 230 has leading end 231, trailing end 232, upper and lower edges 233 and 234 that extend from leading end 231 to trailing end 232, and cutout 235 in upper edge 233 proximate to trailing end 232. A rearwardly-pointing shoot 239 is rigidly affixed to each side sheet 230 via welding near lower edge 244 between leading end 231 and trailing end 232. Side sheets 230 are located on either side of base 240, and are rigidly affixed to base 240 via welding.

In FIG. 23, base 240 is flat and straight in a vertical direction and includes trailing end 241, leading end 242 having forward-facing surface 242A, upper end 243, and lower end 244. A notch 250 is formed in base 240. Notch 250 is between upper end 243 and lower end 244, and extends partially into base 240 rearwardly from leading end 241 in the direction of trailing end 241 from forward-facing surface 242 of leading end 242 to outlet 250A at endwall 251. Upper end 243 is characterized in that it has an upper surface 246 that extends initially downwardly in the direction of lower end 244 near trailing end 241 and then curves inwardly toward leading end 242 and then extends forwardly toward leading end 242 along substantially the entire length of base 240 between trailing end 241 and leading end 242 to free end 247 of extremity 248 of base 240 at the entrance to notch 250, which extends inwardly into base 240 from free end 247 of extremity 248 in the direction of trailing end 241 to endwall 251. Free end 247 of extremity 248 terminates inboard of forward-facing surface 242A of leading end 242.

Side sheets 230 are rigidly affixed to either side of base 240 via welding near upper end 243. Side sheets 230 are spaced apart so as to define space 238 therebetween in FIGS. 19 and 24, and are axially aligned, are parallel relative to each other, and extend upright from either side of base 240 from lower edges 234 and rearwardly pointing shoots 239, rigidly affixed to either side of base 240 near upper end 243 via welding, to upper edges 233, and base 240 depends downwardly from lower edges 234 and shoots 239 of side sheets 230 to lower end 244. Each shoot 239 depends downwardly from lower edge 244 of each said side sheet 230 on either side of base 240 and notch 250, and each shoot 239 is rigidly affixed to either side of base 240 via welding.

Shoots 239 of side sheets 230 are axially aligned on either side of notch 250 and outlet 250A and are each open to notch 250 and outlet 250A. Trailing end 241 of base 240 is axially aligned with trailing ends 232 of side sheets 230, and extends forwardly toward leading ends 231 of side sheets 230 to leading end 242 that is short of, or otherwise inboard of, leading ends 231 of side sheets 230, such that the leading ends 231 of side sheets 230 form a forked end of seed boot 151. Cutouts 235 are axially aligned and cooperate to form an inlet of seed boot 151 proximate to trailing ends 232 of side sheets 230 just inside of trailing end 241 of base 240, said inlet being denoted at 254 in FIG. 24. A vertical conduit 255 is rigidity affixed to cutouts 235 via welding, and is for guiding a stream of air-driven seed into seed boot 151 through inlet 244. For reference purposes, leading ends 231 of side sheets 230 define the leading end of seed boot 151, and trailing ends 232 of side sheets 230 and trailing end 141 of base 240 define the trailing end of seed boot 151.

In implement 150, seed boot 151 is removably connected directly to opener 153 and, more particularly, directly to plate 160 of opener 153. Seed boot 51 is removably connected to plate 160 so as to be suspended from plate 160. Seed boot 151 extends along lower extremity 167 of plate 160 from leading ends 231 of side sheets 230 just behind cutting head 161 connected to leading extremity 164 to trailing ends 232 of side sheets 230 and trailing end 241 of base 240 behind trailing extremity 165 of plate 160 of opener 153 in the assembly of implement 150. Specifically, seed boot 151 is aligned with lower extremity 167 of plate 160 under and behind plate 160 so as to align a length of lower extremity 167 of plate 160, from trailing extremity 165 to proximate to leading extremity 164 just behind cutting head 161, with space 238 between side sheets 230 extending from conduit 255 applied to cutouts 235 to leading ends 231 of side sheets 230. The described length of plate 160 from trailing extremity 165 to proximate to leading extremity 164 just behind cutting head 161 is inserted into space 238 of seed boot 151 between upper edges 233 of side sheets 230 so as to locate a dimension of side sheets 230 extending downwardly from upper edges 233 of side sheets 230 on either side of plate 160, so as to bring forward-facing surface 242A of leading end 242 of base 240 into direct contact against rearward-facing surface 169B of prominence 169 and align lower extremity 167 of plate 160 with lower end 244 of base 240 in a common horizontal plane, and align each hole 260 of a row such holes 260 formed in plate 160 with a corresponding pair of axially-aligned holes 261 of a row of such axially-aligned pairs of holes 261 formed in side sheets 230 near upper edges 233. The row of holes 260 in plate 160 extend between trailing extremity 165 and past prominence 169 to just behind cutting head 161 attached to leading extremity 164 of plate 160. The row of axially-aligned pairs of holes 261 in side sheets 230 near upper edges 233 extend between cutouts 235 defining inlet 254 and leading ends 231 of side sheets 230.

Spring pins 77 are installed in each set of three aligned holes, including one hole 260 of plate 160 that is between and aligned with a corresponding pair of axially-aligned holes 261 of seed boot 151. Spring pins 77 are forcibly driven in place into each said set of three aligned holes, such as with a hammer or ram, and the spring action of spring pins 77 allows them to compress as it assumes the hole diameter of each one of holes 260 and 261 hole of each said set of three aligned holes. The radial force exerted by spring pins 77 against the hole wall of each one of said holes 260 and 261 of each said set of three aligned holes concurrently retains it in the holes 260 and 261, whereby spring pins 77 acts as a self-retaining fasteners releasably or otherwise removably connecting seed boot 151 to plate 160. FIGS. 16-18 and 26 show seed boot 151 connected to plate 160. The described connection of seed boot 151 to plate 160 is a non-destructive releasable or removably coupling, which allows seed boot 151 to be removed from plate 160 for replacement or repair by reversing the installation operation, such as by forcibly removing spring pins 77 from each said set of three aligned holes, such as with a hammer or ram, and separating seed boot 151 from plate 160, without the need to destroy seed boot 151 or plate 160 in the detaching process.

Figure 25:
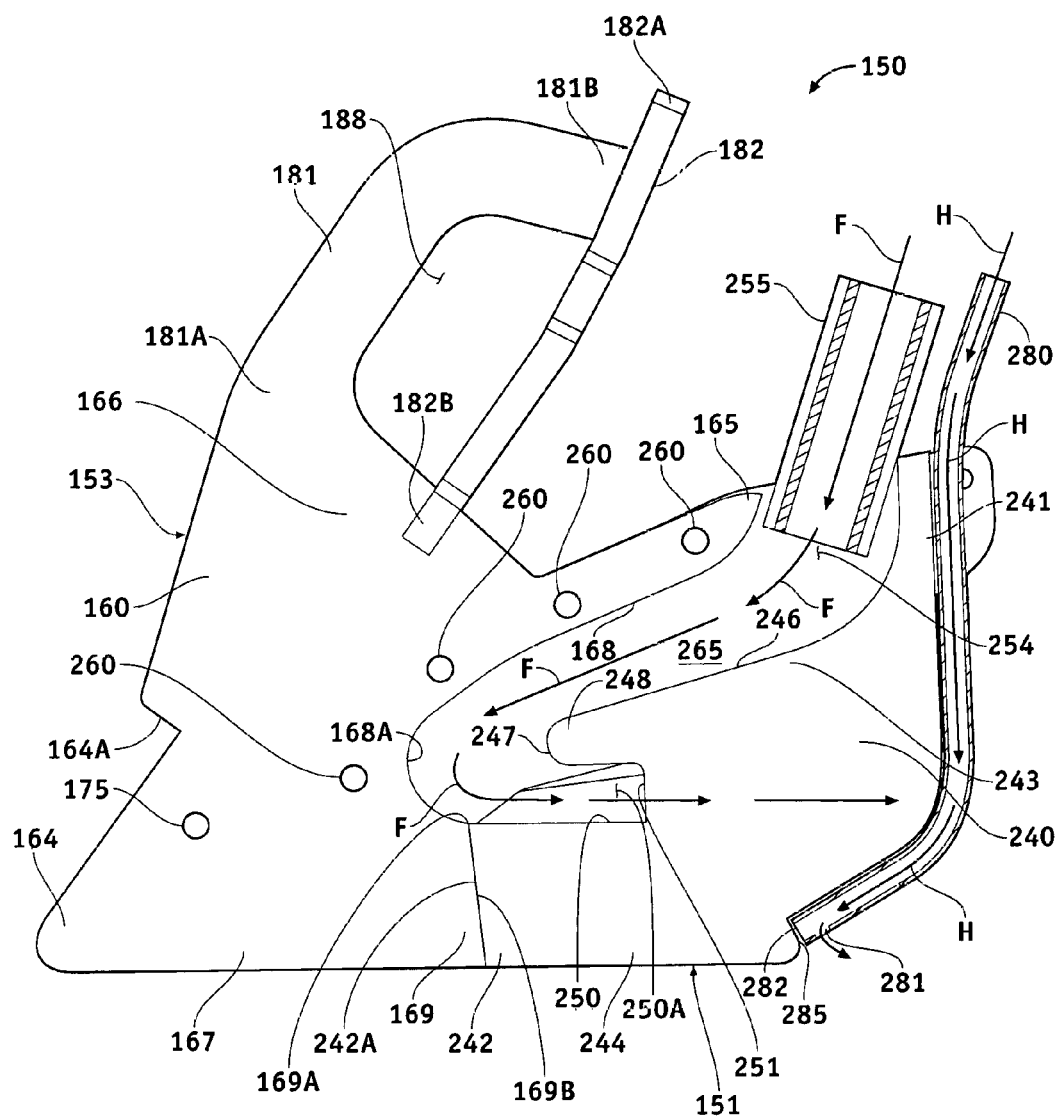
FIG. 25 is a left side schematic representation of the agricultural seeder implement of FIG. 16.

With seed boot 151 so installed on plate 160 of opener 153, seed boot 151 is suspended from plate 160 under undersurface 168 of plate 160 as shown in FIG. 25. In FIG. 25, seed boot 151 extends from inlet 254 located at the trailing end of seed boot 151 behind trailing extremity 165 of plate 160 to the leading end of seed boot 151 at leading ends 231 of side sheets 230 extending forwardly of forward-facing surface 169B of prominence 169 just behind cutting head 161 connected to leading extremity 164 of plate 160. The forked end of seed boot 151 defined by side sheets 230 from forward-facing surface 242A to leading ends 231 extends past in-turned portion 168A of undersurface 168 on either side of plate 160. In FIG. 25, conduit 255 extends into inlet 254 and extends upright therefrom between trailing extremity 165 of plate 160 of opener 153 and trailing end 241 of base 240. Base 240, in turn, extends forwardly under undersurface 168 of plate 160 from its trailing end 241 behind trailing extremity 165 of plate 160 to its forward-facing surface 242A of leading 242 in direct contact against rearward-facing surface 169B of prominence 169. Undersurface 168 faces downwardly into space 238 toward upper surface 246 of base 240 and upper surface 246 of base 240 faces upwardly into space 238 toward undersurface 168, whereby undersurface 168 of plate 160 and upper surface 246 of base 240 of seed boot 151 enclose space 238 so as to form channel 265, which extends forwardly from inlet 254 of seed boot 151 proximate to trailing extremity 165 of opener 153 and along and past in-turned portion 168A of undersurface 168 located forwardly of free end 247 of extremity 248 of base 240 to edge 169A of prominence 169 and to outlet 250A through notch 250, which is enclosed in seed boot 151 and is pointed rearwardly toward endwall 251. Notch 250 and outlet 250A form parts of channel 265. Channel 265 is in-turned proximate to outlet 250A by in-turned portion 168A of undersurface 168 located forwardly of free end 247 of extremity 248 of base 240. Side sheets 230 on either side of plate 160 enclose either side of channel 265 from inlet 254 to edge 169A, and shoots 239 on either side of base 240 enclose notch 250 and outlet 250A on either side of channel 265. Shoots 239 on either side of implement 150 extend rearwardly toward trailing end 241 of base 240 of seed boot 151 and angularly outwardly from either side of seed boot 151 and plate 160 of opener 153 as shown in FIGS. 21 and 22.

And so implement 150 includes seed boot 151 connected directly to opener 153 having a leading extremity, consisting of leading extremity 170 of cutting head 161, and a trailing extremity, consisting of trailing extremity 165 of plate 160. Seed boot 151 defines inlet 254 and outlet 250A to a shoot 239 on either side of seed boot 151. Seed boot 151 and opener 153 form channel 265, and channel 265 extends forwardly from inlet 254 of seed boot 51 proximate to the trailing extremity of opener 153 defined as trailing extremity 165 of plate 160 and to and through notch 250 to outlet 250A behind cutting head 161 and, moreover, behind leading extremity of opener 153 defined as leading extremity 170 of cutting head 61. In FIGS. 16-18 illustrating implement 150 assembled and suspended from shank 154, upper extremity 166 of opener 153 is connected to shank 154, and opener 153 depends downwardly from shank 154 to seed boot 151 located behind cutting head 161 of opener 153.

Figure 26:
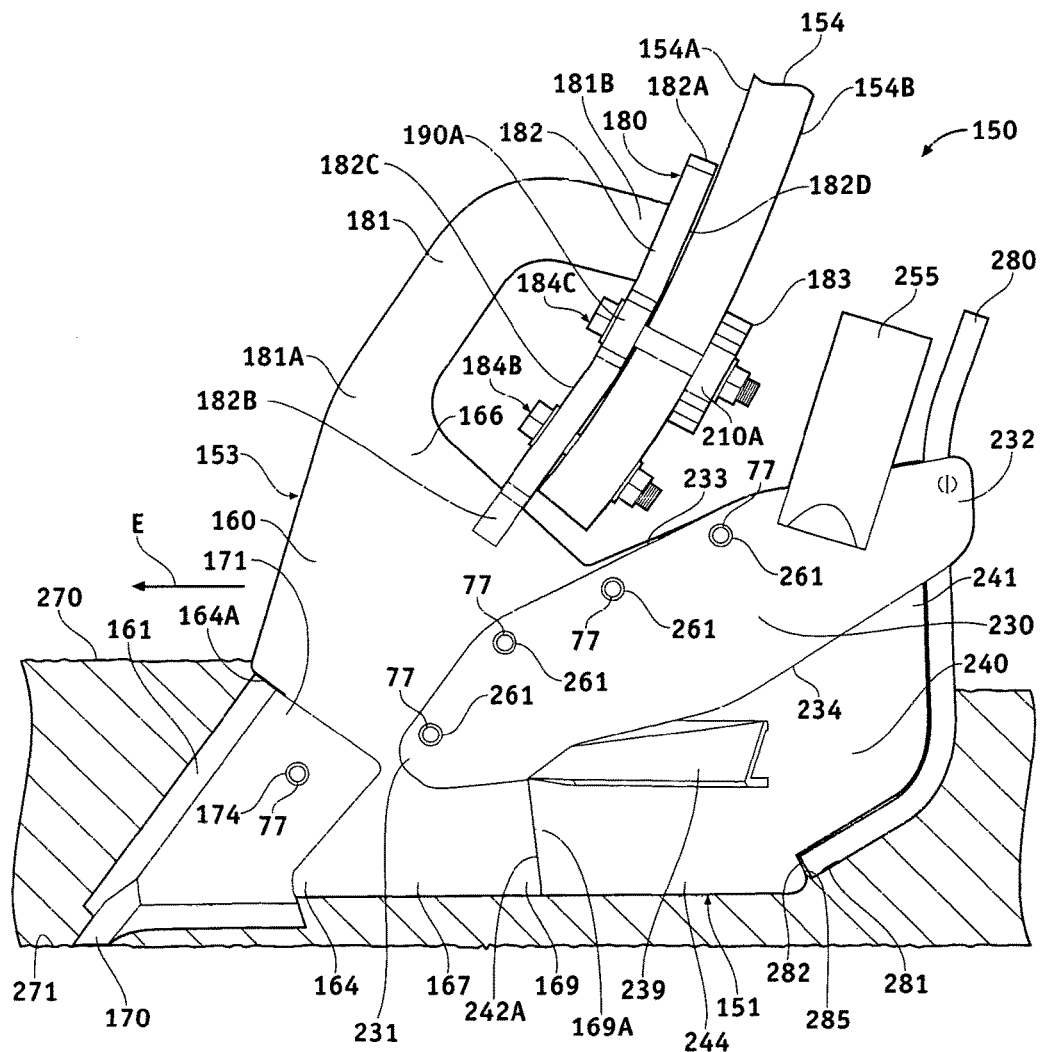
FIG. 26 is a left side elevation view of the embodiment of FIG. 16 shown as it would appear in use.

In use, implement 150 is suspended from shank 154, and shank 154, in turn, is conventionally connected to a plow frame that is pulled by a tractor for pulling opener 153 at a preselected depth through surface 270 of the ground in a direction of arrowed line E in FIG. 26 from the leading extremity of opener 153 to the trailing extremity of opener 153 for cutting furrow 271 in the ground beneath surface 270 by leading extremity 170 of cutting head 161 that, in turn, defines the leading extremity of opener 153. Referencing FIG. 25, seeds are conventionally conveyed by an air stream from a seed hopper to conduit 255 in the direction of arrowed line F, which conveys such stream of air-driven seeds into channel 265 through inlet 254. Channel 265 is for guiding the stream of air-driven seed forwardly through channel 265 from inlet 254 to outlet 250A in the direction of arrowed lines F. Channel 265 is in-turned proximate to outlet 250A by in-turned portion 168A of undersurface 168 located forwardly of free end 247 of extremity 248 of base 240 for re-directing the stream of air-driven seed rearwardly through notch 250 to endwall 251 and outlet 250A. The stream of air-driven seed strikes endwall 251 so as to deflect and divide the stream of air-driven seed outwardly through either side of outlet 250A to each said shoot 239 on either side of seed boot 151. Each said shoot 239 on either side of notch 250 and outlet 250A is for receiving its part of the air-driven stream of seed from outlet 250A and guiding said part of the stream of air-driven seed rearwardly and angularly outwardly therethrough into either side of furrow 271 on either side of seed boot 151 in the direction of arrowed lines G in FIGS. 21 and 22.

As implement 150 is pulled through the ground, the seed is continually deposited into either side of furrow 271 on either side of implement through shoots 239. In FIGS. 16-22, 25, and 26, a fertilizer tube 280 is connected via welding to the back side of trailing end 241 of base 240 of seed boot 151, and extends along the back side of trailing end 241 to lower end 244. Fertilizer tube 280 is contoured to the back side of trailing end 241 of base 240 and extends forwardly along lower end 244 to an outlet 281 through an outer end 282 of fertilizer tube 280 that is situated in rearward-facing notch 285 in lower end 244 of base 240 under and just rearwardly of shoots 239. Notch 285 protects outlet 281 from the ground passing underneath it to prevent outlet 281 from clogging and becoming damaged. A preselected fertilizer material is continuously conveyed from a fertilizer hopper to fertilizer tube 280, and fertilizer tube 280 is for conveying the fertilizer material therethrough in the direction of arrowed lines H in FIG. 25 to outlet 281 of fertilizer tube 280 for application downward therethrough into furrow 131 between the seeds applied to either side of the furrow and under the seeds rearwardly of outlet 250A and shoots 239.

The above discussion is limited to the operation of one implement 150. Those having regard for the art will readily appreciate that a plow frame can incorporate ten, twenty, thirty, forty, or perhaps fifty or more such concurrently operating implements 150 to provide the concurrent seeding and fertilizing of numerous furrows.

III.

Figure 27:
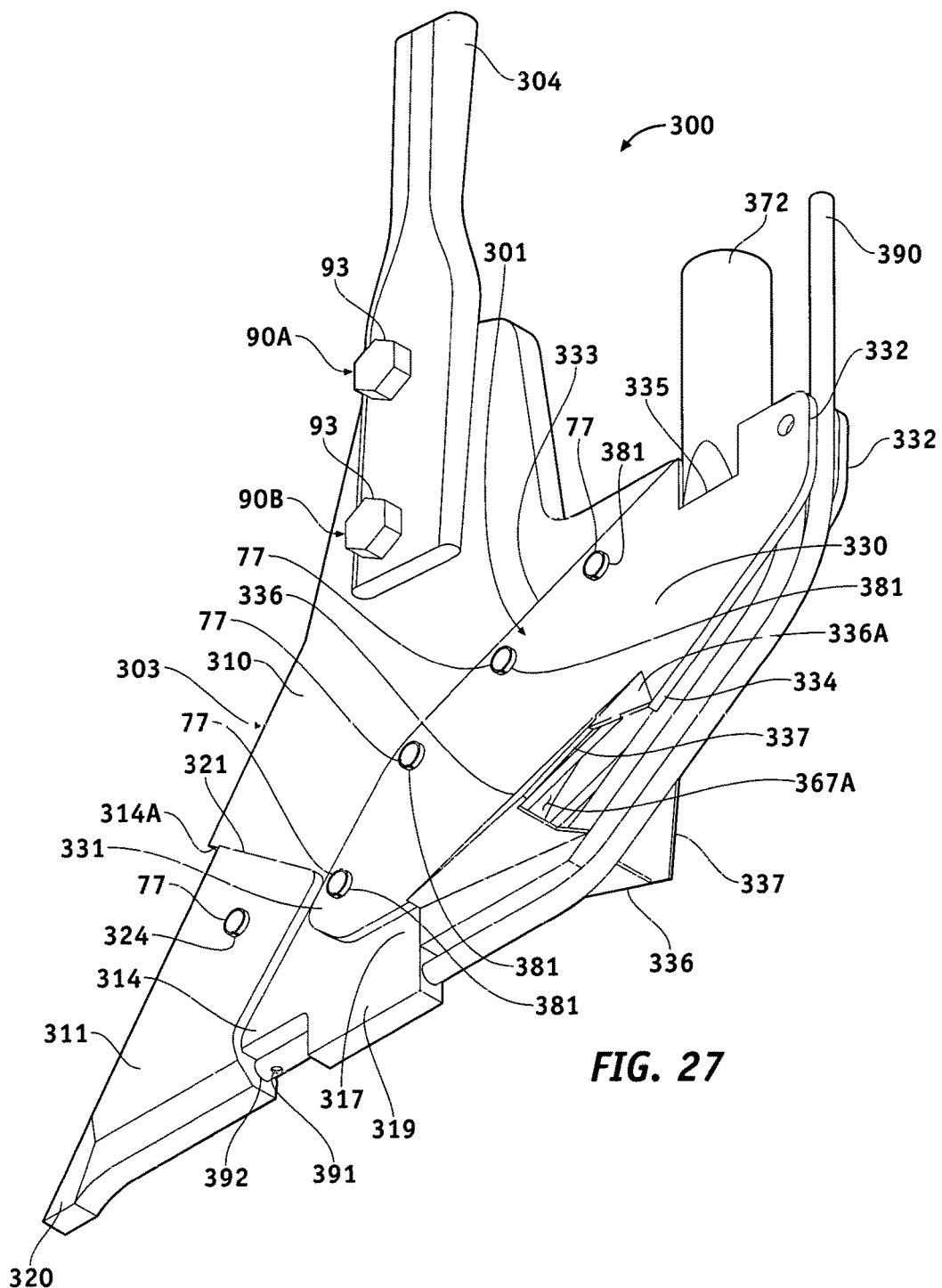
FIG. 27 is a rear perspective view of yet another embodiment of an agricultural seeder implement constructed and arranged in accordance with the principle of the invention, the agricultural seeder implement includes a seed boot connected to an opener mounted to a shank in preparation for use of the agricultural seeder implement for sowing a crop.

Attention is now directed to FIG. 27, in which there is seen yet another embodiment of an agricultural seeder implement 300 constructed and arranged in accordance with the principle of the invention. Implement 300 includes seed boot 301 connected to opener 303, and is shown as it would appear assembled and suspended from a shank 304 of a plow frame (not shown) in preparation for use of implement 300 for sowing a crop. Like openers 53 and opener 153, opener 303 is a chisel, which is a form of a non-moving and non-rotating opener for being pulled by a tractor for cutting a furrow in the ground at a preselected depth from the surface of the ground, and seed boot 301 connected to opener 303 is for receiving a stream of air-driven seed and depositing said stream of air-driven seed into the furrow formed by opener 303.

Figure 28:
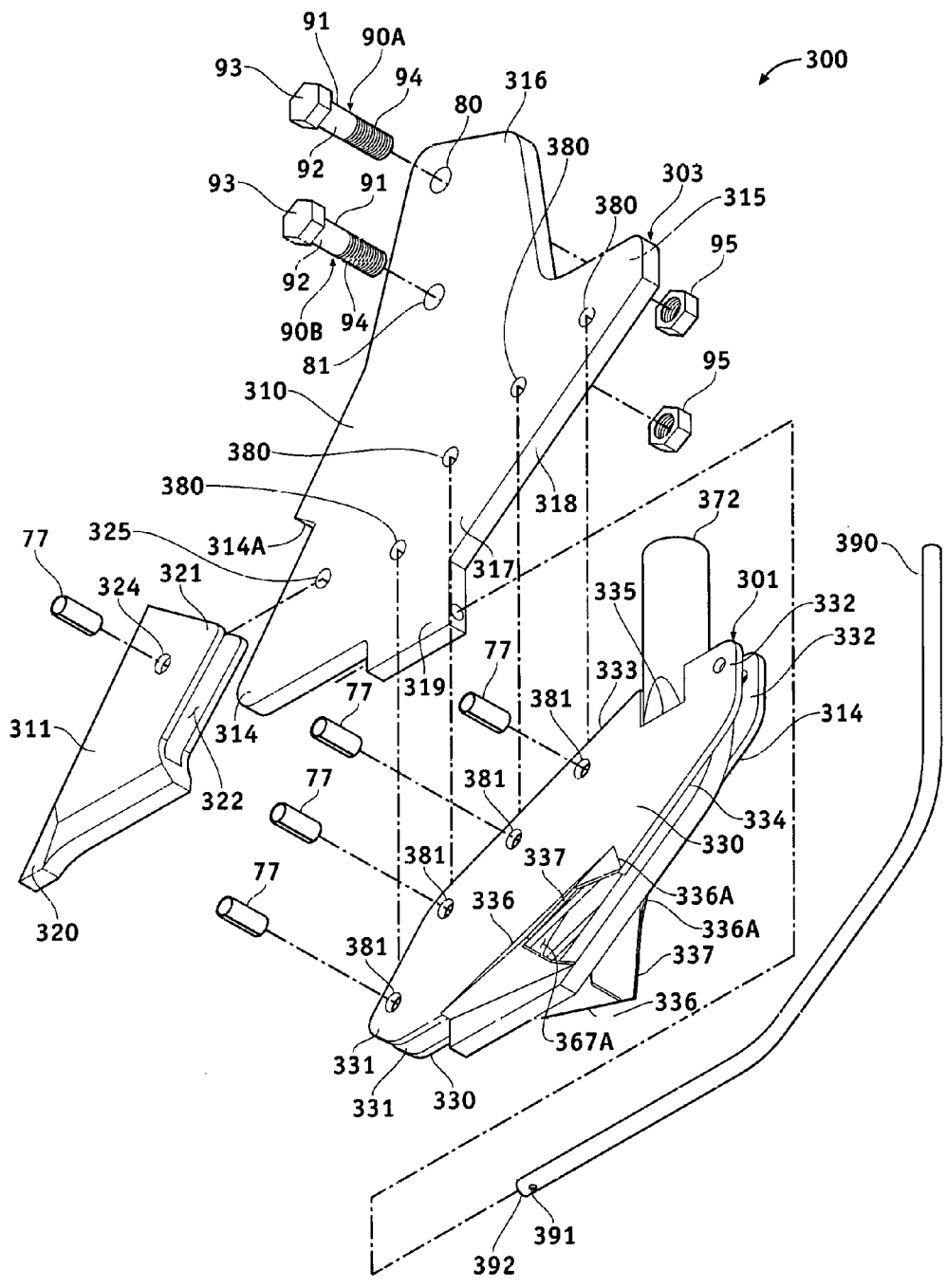
FIG. 28 is an exploded perspective view of the agricultural seeder implement of FIG. 27.

Opener 303 is an assembly of blade or plate 310 and cutting head 311. In FIG. 28, plate 310 is flat and straight in a vertical direction, and is stout, strong, robust, and of substantial construction being formed of steel or other metal having inherently strong and resilient material characteristics. Plate 310 includes leading extremity 314, trailing extremity 315, and upper extremity 316 and lower extremity 317 that extend between leading extremity 314 and trailing extremity 315. Lower extremity 317 has undersurface 318 that extends from trailing extremity 315 toward leading extremity 314 to drop-down 319 formed in lower extremity 317 between leading extremity 314 and trailing extremity 315.

Figure 29:
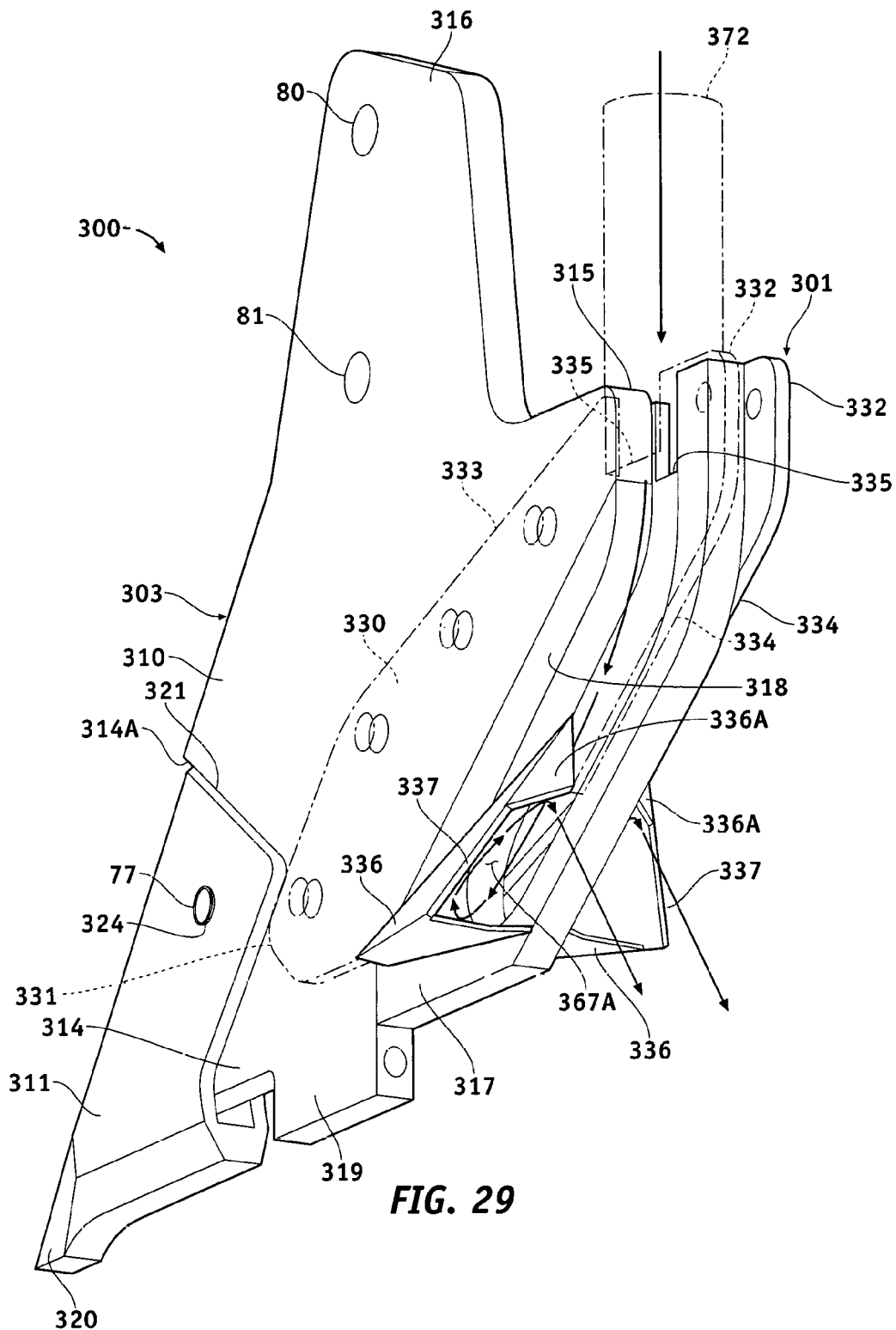
FIG. 29 is a rear perspective view illustrating a plate of the opener and the seed boot connected to the plate all of the agricultural seeder implement of FIG. 27, with portions of the seed boot depicted in dashed outline to better illustrate the components thereof.
Figure 31:
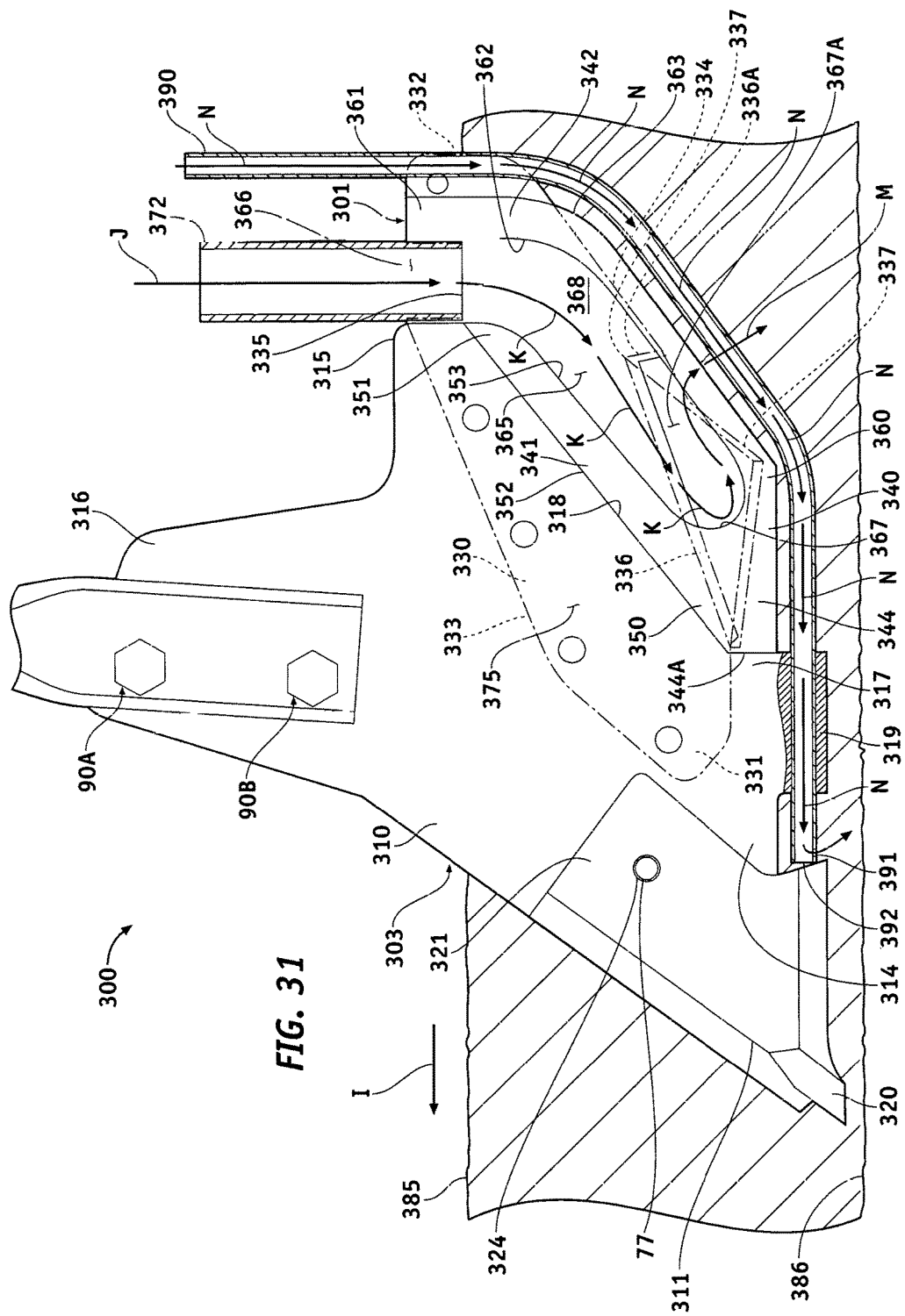
FIG. 31 is a left side elevation view of the opener and the seed boot connected to the plate all of the agricultural seeder implement of FIG. 27, with portions thereof broken away and shown in dashed outline for illustrative purposes.

Cutting head 311 is stout, strong, robust, and of substantial construction like that of plate 310, being formed of cast iron in this example or other selected metal material having inherently strong and resilient material characteristics, and is structured to be attached to, and carried by, leading extremity 314 of plate 310 shown in FIGS. 27, 29, and 31. In FIG. 28, cutting head 311 has leading extremity 320, which is a wedge-like cutting edge to cut into the ground, and trailing extremity 321 that is adapted to be connected to leading extremity 314 of plate 310. Slot 322 in trailing extremity 321 accepts leading extremity 314 of plate 310 so as to align holes 314 formed in trailing extremity 321 of cutting head 311 on either side of hole 325 formed in leading extremity 314 of plate 310. An upper portion of trailing extremity 321 of cutting head 311 is received in a cutout pocket 314A formed in the upper sides of leading extremity 314, and this serves to seat cutting head 311 in place on leading extremity 314 of plate 310 in preparation for securing cutting head 311 to leading extremity 314. FIGS. 28, 29, and 31 show an upper portion of trailing extremity 321 of cutting head 311 received up against cutout pocket 314A.

Spring pin 77 secures the position of cutting head 311 to leading extremity 314 of plate 310. Conventionally, spring pin 77 has a body diameter which is larger than the hole diameter of holes 324 formed in trailing extremity 321 of cutting head 311 and the hole diameter of corresponding hole 325 formed in leading extremity 314 of plate 310. Spring pin 77 has the customary chamfer on either one or both ends to facilitate starting spring pin 77 into one of holes 324, and then spring pin 77 is forcibly driven, such as with a hammer or ram, into hole 325 of plate 310 and holes 324 of cutting head 311 on either side of hole 325, and the spring action of spring pin 77 allows it to compress as it assumes the hole diameters of the respective holes 324 and 325. The radial force exerted by spring pin 77 against the hole walls of the respective holes 324 and 325 concurrently retains it in the holes 324 and 325, whereby spring pin 77 acts as a self-retaining fastener releasably or otherwise removably connecting cutting head 61 to leading extremity 64 of plate 60. FIGS. 27, 29, and 31 show cutting head 311 connected to plate 310. The described connection of cutting head 311 to plate 310 is a non-destructive releasable or removable coupling/connection, which allows cutting head 311 to be removed from leading extremity 314 of plate 310, such as for replacement or repair, simply by reversing the installation operation by forcibly removing spring pin 77 from the respective holes 324 and 325, such as with a hammer or ram, and separating cutting head 311 from leading extremity 314 of plate 310, all without the need to destroy cutting head 311 or plate 310 in the detaching process. The assembly of cutting head 311 and plate 310 form opener 303. When so assembled, leading extremity 320 of cutting head 311 defines the leading extremity of opener 303, and trailing extremity 315 of plate 310 defines the trailing extremity of opener 303.

Upper extremity 316 is structured to be connected to shank 304 with nut-and-bolt assemblies 90 as shown in FIG. 27. In common with opener 50, upper extremity 316 shares bolt holes 80 and 81, and opener 303 is connected to shank 304 with upper and lower nut-and-bolt assemblies 90A and 90B. Plate 310 is positioned alongside an inner flattened side of shank 304 so as to align an upper bolt hole of shank 304 with upper bolt hole 80 of plate 310, and to align a lower bolt hole of shank 304 with lower bolt hole 81 of plate 310. The externally threaded end 94 of bolt 91 of upper nut-and-bolt assembly 90A is concurrently inserted through the upper bolt hole of shank 304 and upper bolt hole 80 of plate 310. The internally threaded nut 95 of upper nut-and-bolt assembly 90A is threaded onto externally threaded end 94 of bolt 91 of upper nut-and-bolt assembly 90A, and is tightened via rotation securing plate 310 to shank 304 between bolt head 93 located on the outer side of shank 54 and internally threaded nut 95 located on the outer side of upper extremity 316 of plate 310. Similarly, the externally threaded end 94 of bolt 91 of lower nut-and-bolt assembly 90B is concurrently inserted through the lower bolt hole of shank 304 and lower bolt hole 81 of plate 310. The internally threaded nut 95 of lower nut-and-bolt assembly 90B is threaded onto externally threaded end 94 of bolt 91 of lower nut-and-bolt assembly 90B, and is tightened via rotation securing plate 310 to shank 304 between bolt head 93 located on the outer side of shank 54 and internally threaded nut 95 located on the outer side of upper extremity 316 of plate 310. This fastening together of upper extremity 316 of plate 310 and shank 304 via nut-and-bolt assemblies 90 releasably or otherwise removably secures implement 300 to shank 304, whereby implement 300 is suspended from shank 304 in FIGS. 27 and 29. To detach implement 300 from shank 304, the described operation of connecting implement 300 to shank 304 need only be reversed.

Figure 30:
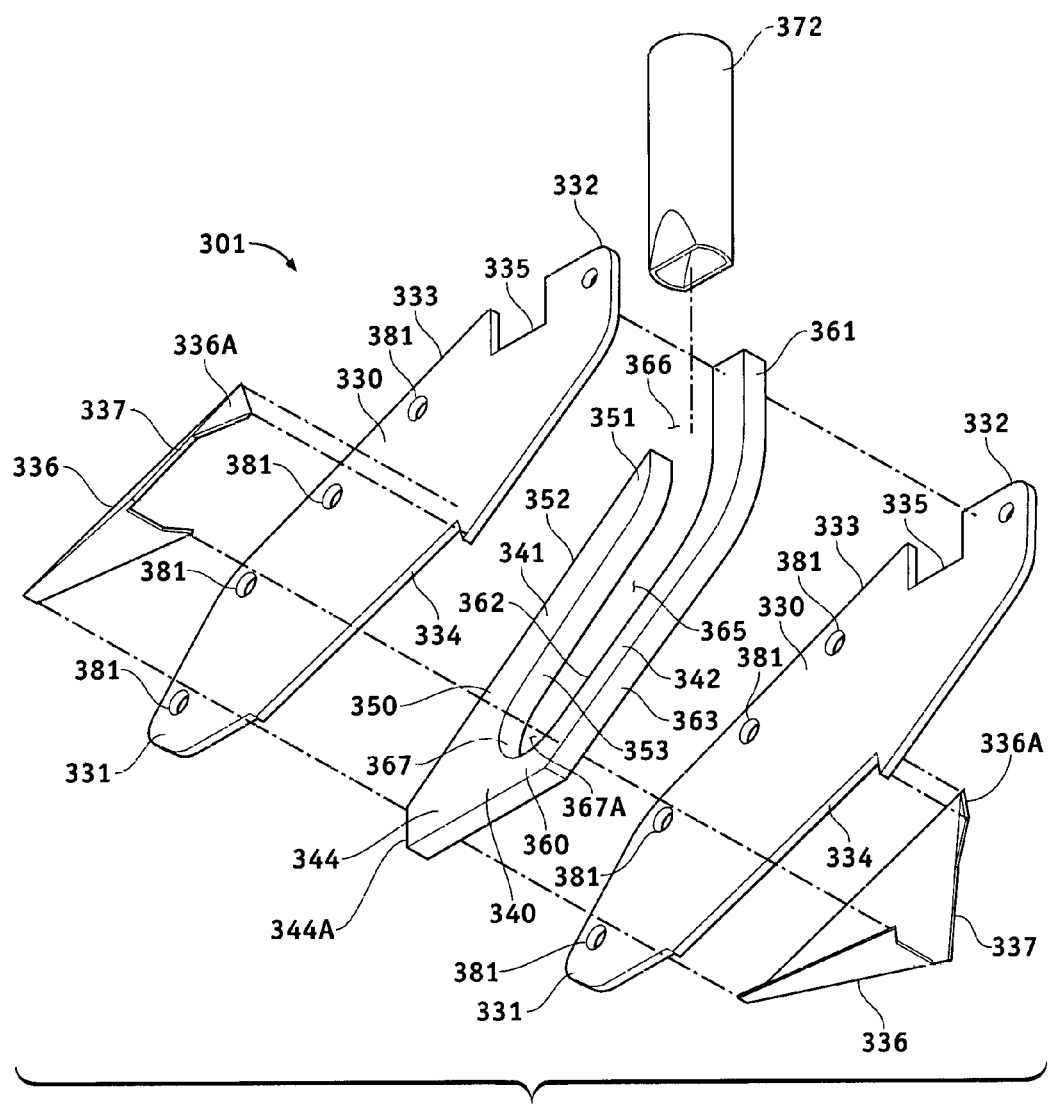
FIG. 30 is an exploded perspective view of the seed boot of the agricultural seeder implement of FIG. 27.

In FIGS. 28 and 30, seed boot 301 is elongate and is stout, strong, robust, and of substantial construction being formed of steel or other metal having inherently strong and resilient material characteristics. Seed boot 301 includes opposed, parallel and identical side sheets 330 rigidly affixed to either side of base 340. In FIG. 30, each side sheet 330 has leading end 331, trailing end 332, upper and lower edges 333 and 334 that extend from leading end 331 to trailing end 332, and cutout 335 in upper edge 333 proximate to trailing end 332. A rearwardly pointing shoot 336 is rigidly affixed to each side sheet 330 via welding near lower edge 334 between leading end 331 and trailing end 332.

In FIG. 30, base 340 is overall flat and straight in a vertical direction and integrally formed and includes joined, opposed, upper and lower elongate members 341 and 342, and head 344. Upper member 341 includes inner end 350, outer end 351, upper surface 352, and lower surface 353. Lower member 341 includes inner end 360, outer end 361, upper surface 362, and lower surface 363. Inner ends 350 and 360 are joined at head 344, and upper and lower elongate members 341 and 342 extend outwardly from head 34 in a spaced-apart relation along a common vertical plane to outer ends 351 and 361. Lower surface 353 of upper elongate member 341 faces upper surface 362 of lower elongate member 242 so as to form a space or gap 365 therebetween that extends forwardly from inlet 366 defined by and between outer ends 351 and 361 to a closed end 367 at head 344 where lower surface 353 and upper surface 352 intersect. Head 344 extends forwardly of inner ends 350 and 360 to outer end 344A.

Side sheets 330 are rigidly affixed to either side of upper and lower elongate members 341 and 342 and head 244 of base 340 via welding. Side sheets 320 are axially aligned, are parallel relative to each other, and extend upright from either side of base 340 from lower edges 234, that extend along either side of head 344 and lower elongate member 342 from outer end 361 to inner end 360, and across gap 365 and across upper elongate member 341 to upper edges 333 that extend upwardly from upper surface 352 and along upper elongate member 341 from outer end 351 to inner end 350 and along head 344 from inner end 350 to outer end 344A of head 344, which encloses gap 365 from inlet 366 to closed end 367 so as to form channel 368 of seed boot 301 that extends forwardly through seed boot 301 from inlet 366, defined by and between outer ends 351 and 361 of upper and lower elongate members 341 and 342 and side sheets 330 extending thereacross, to closed end 367, which defines outlet 367A of channel 368 of seed boot 301 that is open to shoots 336. Shoots 336 are rigidly affixed via welding to either side of side sheets 330 and head 344 from outer end 344A to and just rearwardly of inner end 360 of lower elongate member 342. Shoots 336 extend across either side of the outlet 367A of channel 368 defined at closed end 367 of space 365 and are open to the outlet 367A of the defined channel 368 at closed end 367, are diametrically opposed on either side of channel 368 at closed end 367, and extend angularly outwardly from either side of seed boot 301 and rearwardly in a direction toward outer end 361 of lower elongate member 242 and trailing ends 332 of side sheets 330 to deflectors 336A formed in open rear ends 337 of shoots 336. Deflectors 336A partially occlude the respective open rear ends 337 of shoots 336. In FIGS. 32 and 33, deflectors 336 are connected via welding to the respective side sheets 330 near lower edges 334 and rear ends 337 of the respective shoots 336. Deflectors 336A extend downwardly from side sheets 330 near lower edges 334, and extend downwardly and angularly outward from either side of seed boot 301 along rear ends 337 of each respective shoot 336, and are angled rearwardly away from the respective leading ends 331 of side sheets 330. Outer end 361 of lower elongate member 242 of base 340 is axially aligned with trailing ends 332 of side sheets 330, and base 340 extends forwardly toward leading ends 331 of side sheets 330 to outer end 344A of head 344 that is short of, or otherwise inboard of, leading ends 331 of side sheets 330, such that the leading ends 331 of side sheets 330 form a forked end of seed boot 301. Cutouts 335 are axially aligned and cooperate with outer ends 351 and 361 of upper and lower elongate members 341 and 342 to from inlet 366 of seed boot 301 proximate to trailing ends 332 of side sheets 330 just inside of outer end 361 of base 340. An upright conduit 372 is rigidity affixed to cutouts 335 via welding, and is for guiding a stream of air-driven seed into channel 368 of seed boot from inlet 366. For reference purposes, leading ends 331 of side sheets 330 define the leading end of seed boot 301, and trailing ends 332 of side sheets 330 and outer ends 351 and 361 of upper and lower elongate members 341 and 342 of base 340 define the trailing end of seed boot 301.

Again, side sheets 330 extend upright from either side of base 340 from lower edges 334, that extend along either side of head 344 and lower elongate member 342 from outer end 361 to inner end 360, and across upper elongate member 341 to upper edges 333 extending upwardly from upper surface 352 so as to form a gap or space 375 between side sheets 330 from upper surface 352 of upper elongate member 341 to upper edges 333, and this gap 375 extends from cutouts 335 to the leading end of each said side sheets 330.

In implement 300, seed boot 301 is removably connected directly to opener 303 and, more particularly, directly to plate 310 of opener 303. Seed boot 301 is removably connected to plate 310 so as to be suspended from plate 310. Seed boot 301 extends along lower extremity 317 of plate 310 from leading ends 331 of side sheets 330 just behind cutting head 301 connected to leading extremity 314 to trailing ends 332 of side sheets 330 and outer ends 351 and 361 of upper and lower elongate members 341 and 342 of base 340 behind trailing extremity 315 of plate 310 of opener 303 in the assembly of implement 300. Specifically, seed boot 301 is aligned under and behind plate 310 so as to align a length of lower extremity 317 of plate 310, from trailing extremity 315 to proximate to leading extremity 314 just behind cutting head 311, with gap 375 between side sheets 330 extending from conduit 372 applied to cutouts 335 to leading ends 331 of side sheets 330. The described length of plate 310 from trailing extremity 315 to proximate to leading extremity 314 just behind cutting head 311 is inserted into gap 375 of seed boot 301 between upper edges 333 of side sheets 330 so as to locate a dimension of side sheets 330 extending downwardly from upper edges 233 of side sheets 330 on either side of plate 310, so as to bring upper surface 352 of base 340 extending from outer end 361 of upper elongate member 341 to outer end 344A of head 344 into direct contact against undersurface 318 of plate 310 from trailing extremity 315 to drop down 319, and so as to bring outer end 344A of head 344 into direct contact against the portion of undersurface 318 that extends downwardly partially along drop down 319, which aligns lower extremity 317 of plate 310 from leading extremity 314 to drop down 319 with the lower side of base 340 that extends rearwardly from drop down 319, and which aligns each hole 380 of a row such holes 380 formed in plate 310 with a corresponding pair of axially-aligned holes 381 of a row of such axially-aligned pairs of holes 381 formed in side sheets 330 near upper edges 333. The row of holes 380 in plate 310 extend between trailing extremity 315 and over drop down 319 just behind cutting head 311 attached to leading extremity 314 of plate 310. The row of axially-aligned pairs of holes 381 in side sheets 330 near upper edges 333 extend between cutouts 235 at inlet 366 and leading ends 331 of side sheets 330.

Spring pins 77 are installed in each set of three aligned holes, including one hole 380 of plate 310 that is between and aligned with a corresponding pair of axially-aligned holes 381 of seed boot 301. Spring pins 77 are forcibly driven in place into each said set of three aligned holes, such as with a hammer or ram, and the spring action of spring pins 77 allows them to compress as it assumes the hole diameter of each one of holes 380 and 381 of each said set of three aligned holes. The radial force exerted by spring pins 77 against the hole wall of each one of said holes 380 and 381 of each said set of three aligned holes concurrently retains it in the holes 380 and 381, whereby spring pins 77 acts as a self-retaining fasteners releasably or otherwise removably connecting seed boot 301 to plate 310. The described connection of seed boot 301 to plate 310 is a non-destructive releasable or removably coupling, which allows seed boot 301 to be removed from plate 310 for replacement or repair by reversing the installation operation, such as by forcibly removing spring pins 77 from each said set of three aligned holes, such as with a hammer or ram, and separating seed boot 301 from plate 310, without the need to destroy seed boot 301 or plate 310 in the detaching process.

With seed boot 301 so installed on plate 310 of opener 303, seed boot 301 is suspended from plate 310 under undersurface 318 of plate 310 as shown in FIG. 31. Seed boot 301 extends from inlet 366 located at the trailing end of seed boot 301 behind trailing extremity 315 of plate 310 to the leading end of seed boot 301 at leading ends 331 of side sheets 330 extending over drop down 319 just behind cutting head 311 connected to leading extremity 314 of plate 310. In FIG. 25, conduit 372 extends into inlet 366 and extends upright therefrom between trailing extremity 315 of plate 310 of opener 153 and outer end 361 of lower elongate member 242 of base 340. Base 340, in turn, extends forwardly under undersurface 318 of plate 310 from outer end 361 behind trailing extremity 315 of plate 310 to outer end 344A of head 344 in direct contact against the portion of undersurface 318 that extends partially downwardly along drop down 319. Channel 368 extends forwardly through seed boot 301 from inlet 366 to the outlet 367A defined at closed end 367 that leads to shoots 336 on either side of seed boot 301.

And so implement 300 includes seed boot 301 connected directly to opener 303 having a leading extremity, consisting of leading extremity 320 of cutting head 311, and a trailing extremity, consisting of trailing extremity 315 of plate 310. Seed boot 301 has inlet 366, and outlet 367A at closed end 367. Outlet 367A is open to each said shoot 336 on either side of seed boot 301, and channel 368 extends forwardly through seed boot 301 from inlet 366 of seed boot 301 proximate to the trailing extremity of opener 303 defined as trailing extremity 315 of plate 310 to outlet 367A open to shoots 336 behind cutting head 311 and, moreover, behind leading extremity of opener 303 defined as leading extremity 320 of cutting head 311. In FIG. 27 illustrating implement 300 assembled and suspended from shank 304, upper extremity 316 of opener 303 is connected to shank 304, and opener 303 depends downwardly from shank 304 to seed boot 301 located behind cutting head 311 of opener 303.

In use, implement 300 is suspended from shank 304, and shank 304, in turn, is conventionally connected to a plow frame that is pulled by a tractor for pulling opener 303 at a preselected depth through surface 385 of the ground in a direction of arrowed line I in FIG. 31 from the leading extremity of opener 303 to the trailing extremity of opener 303 for cutting furrow 386 in the ground beneath surface 385 by leading extremity 320 of cutting head 311 that, in turn, defines the leading extremity of opener 303. Seeds are conventionally conveyed by an air stream from a seed hopper to conduit 372 in the direction of arrowed line J, which conveys such stream of air-driven seeds into channel 368 through inlet 366. Channel 368 is for guiding the stream of air-driven seed forwardly through channel 368 from inlet 366 to outlet 367A at closed end 367 in the direction of arrowed lines K to outlet 267A. The stream of air-driven seed strikes closed end 367, which deflects and divides the stream of air-driven seed outwardly through either side of outlet 367A to each said shoot 336 on either side of seed boot 301. Each said shoot 336 on either side of outlet 367A is for receiving its part of the air-driven stream of seed from outlet 267A at either side of seed boot 301 and guiding its said part of the stream of air-driven seed rearwardly and angularly outwardly therethrough to into either side of furrow 386 on either side of seed boot 301 through open rear end 337 as in implement 150, and also for guiding some of its said part of the stream of air-driven seed rearwardly and angularly outwardly to deflector 336A partially occluding open rear end 337, which deflects said some of its said part of the stream of air-driven seed downwardly into either side of furrow 386 on either side of seed boot 301 in the direction of arrowed line M in FIG. 31. The deflection of part of the stream of air-driven seed downwardly into either side of furrow 381 by deflector 336A beneficially consolidates part of the stream of air-driven seed downwardly into furrow and inhibits the deflected seed from scattering to inhibit seed loss and to provide a controlled deposition of the deflected seed downwardly into furrow 381.

As implement 300 is pulled through the ground, the seed is continually deposited angularly outwardly into either side of furrow 386 on either side of implement 300 through shoots 336 and downwardly into either side of the furrow from deflectors 336A of shoots 336. In FIGS. 27, 28, and 31, a fertilizer tube 390 is connected via welding to lower surface 363 along the back side of outer end 361 of base 340 of seed boot 301, and extends along lower surface 363 along the underside of head 344 and through drop down 319. Fertilizer tube 390 is contoured to lower surface 363 and the underside of head 344, and extends forwardly through drop down 319 to an outlet 391 through an outer end 392 of fertilizer tube 390 that is situated against trailing extremity 321 of cutting head 311 that extends downward from leading extremity 314 of plate 310 that protects outlet 391 from the ground passing underneath it to prevent outlet 391 from clogging and becoming damaged. Outlet 391 and outer end 392 of fertilizer tube 390 are located ahead of outlet 367A and shoots 336. A preselected fertilizer material is continuously conveyed from a fertilizer hopper to fertilizer tube 390, and fertilizer tube 290 is for conveying the fertilizer material therethrough in the direction of arrowed lines N in FIG. 31 to outlet 391 of fertilizer tube 390 for application therethrough into furrow 386 ahead of the applied seeds.

The above discussion is limited to the operation of one implement 300. Those having regard for the art will readily appreciate that a plow frame can incorporate ten, twenty, thirty, forty, or perhaps fifty or more such concurrently operating implements 300 to provide the concurrent seeding and fertilizing of numerous furrows.

IV.

Figure 34:
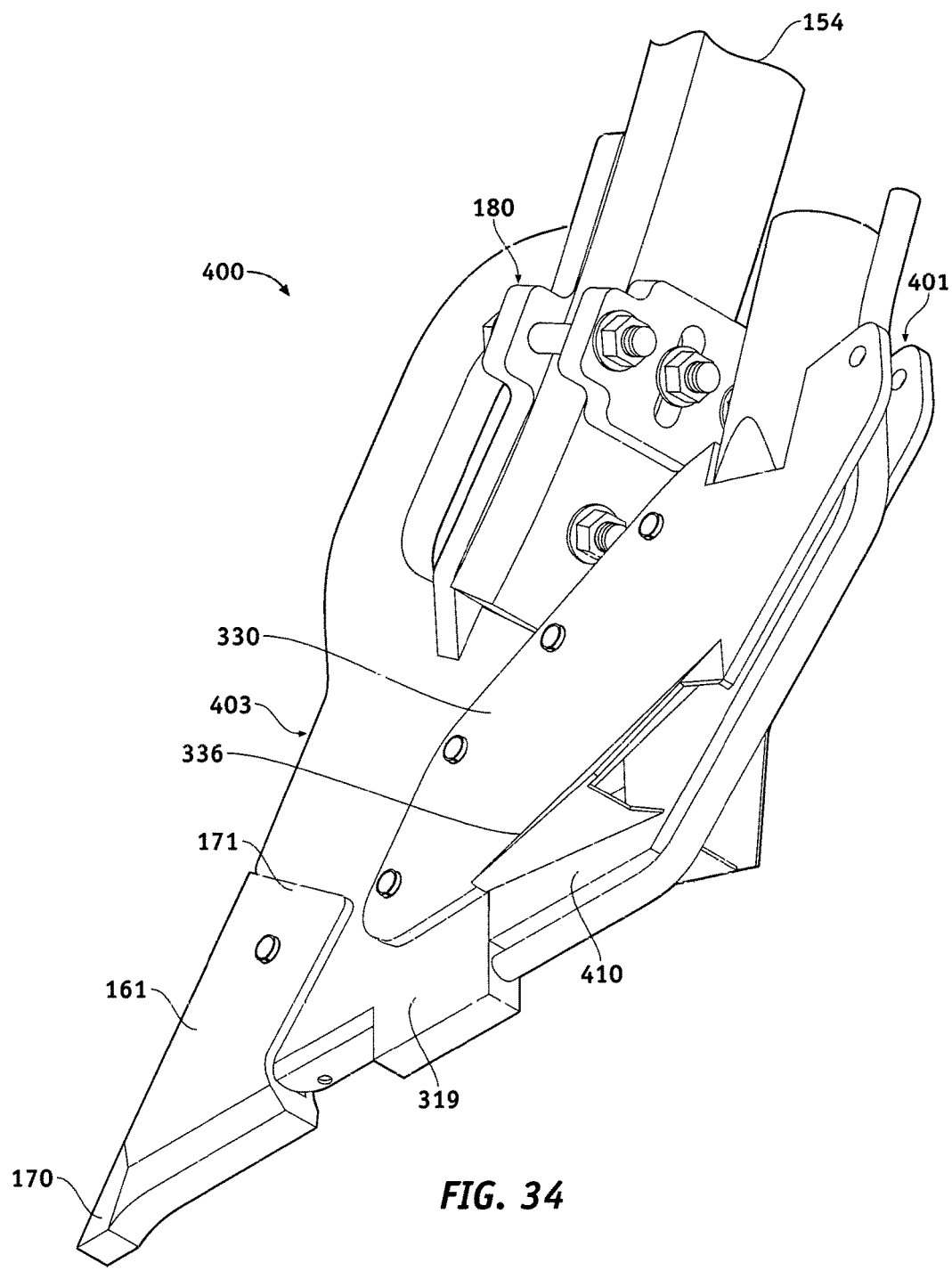
FIG. 34 is a rear perspective view of yet still another embodiment of an agricultural seeder implement constructed and arranged in accordance with the principle of the invention, the agricultural seeder implement includes a seed boot connected to an opener mounted to a shank with a buckle assembly in preparation for use of the agricultural seeder implement for sowing a crop.

Attention is now directed to FIG. 34, in which there is seen yet another embodiment of an agricultural seeder implement 400 constructed and arranged in accordance with the principle of the invention. Implement 400 includes seed boot 401 connected to opener 403, and is shown as it would appear assembled and suspended from shank 154 discussed in connection with implement 150 in preparation for use of implement 400 for sowing a crop. Like the previously-described openers, opener 403 is a chisel, which is a form of a non-moving and non-rotating opener for being pulled by a tractor for cutting a furrow in the ground at a preselected depth from the surface of the ground, and seed boot 401 connected to opener 403 is for receiving a stream of air-driven seed and depositing said stream of air-driven seed into the furrow formed by opener 403.

Figure 35:
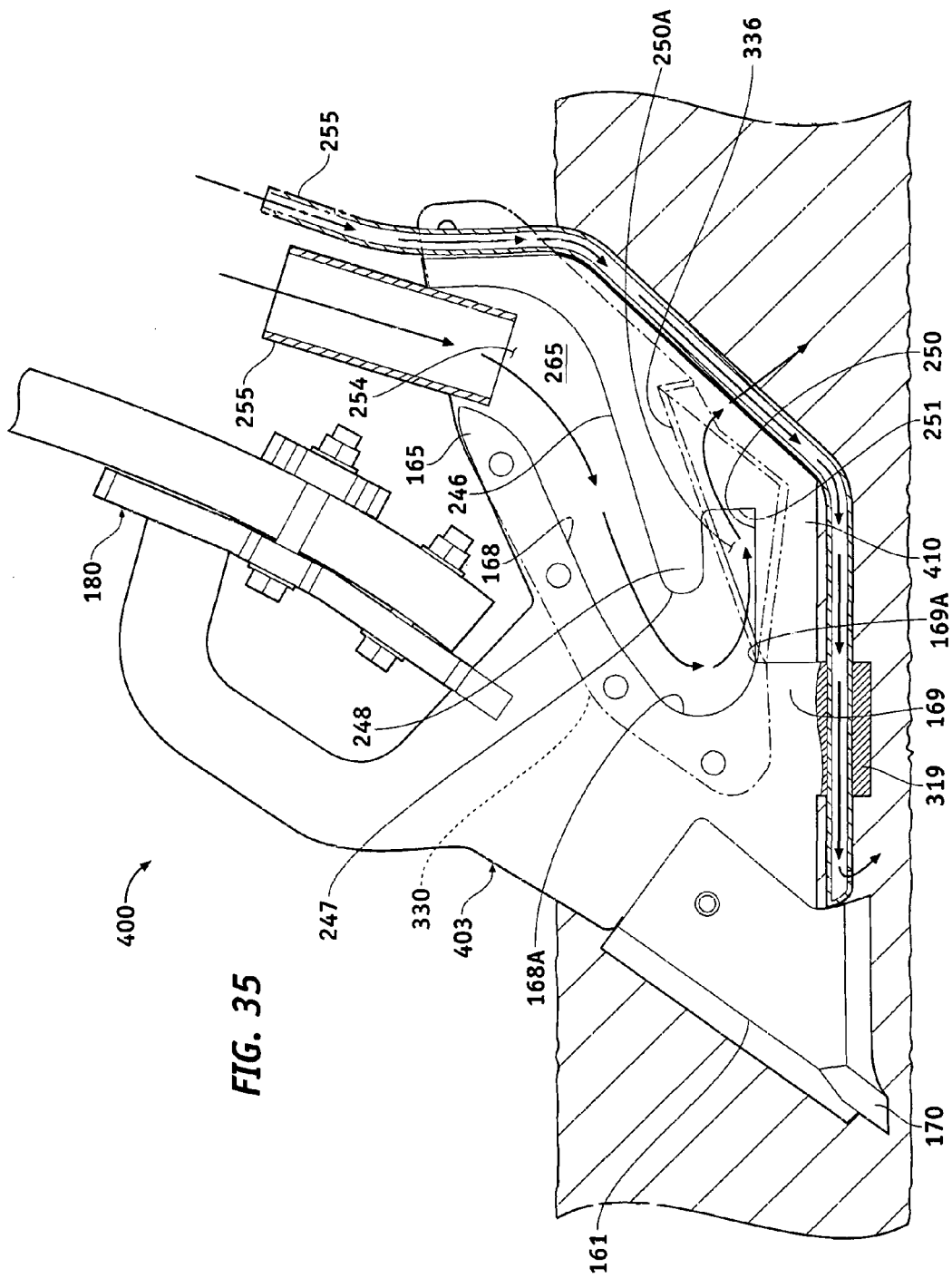
FIG. 35 is a left side elevation view of the opener and the seed boot connected to the opener of the agricultural seeder implement of FIG. 34, with portions thereof broken away and shown in dashed outline for illustrative purposes.

In common with implement 150, opener 402 shares blade or plate 160 and cutting head 161 having leading extremity 170 and trailing extremity 171 and buckle assembly 180 that connect implement 400 to shank 154 and, as referenced in FIG. 35, trailing extremity 165 and undersurface 168 including in-turned portion 168 that inturns rearwardly in a direction toward trailing extremity 165 to edge 169A of prominence 169. In common with implement 300, opener 403 shares drop down 319 that depends downwardly in this embodiment from prominence 169.

Seed boot 401 includes side sheets 330 of seed boot 301 connected to either side of a base 410 as discussed above and that in common with base 240 of seed boot 151 of implement 150 shares upper surface 246, extremity 248, free end 247 of extremity 248, notch 250, outlet 250A at endwall 251, inlet 254, including conduit 255 to inlet 254. In common with seed boot 151, seed boot 401 also shares channel 265 that extends forwardly from inlet 254 of seed boot 401 proximate to trailing extremity 165 of opener 403 past in-turned portion 168A of undersurface 168 located forwardly of free end 247 of extremity 248 of base 240 to edge 169A of prominence 169 and to outlet 250A through notch 250, which is enclosed in seed boot 151 and is pointed rearwardly toward endwall 251. As in implement 150, shoots 336 are each open to notch 250 and outlet 250A.

In use, implement 400 is suspended from shank 154, and shank 154, in turn, is conventionally connected to a plow frame that is pulled by a tractor for pulling opener 403 at a preselected depth through the surface of the ground in a direction from the leading extremity of opener 403, which is defined by leading extremity 170 of cutting head 161, to the trailing extremity 165 of opener 403 for cutting a furrow in the ground by leading extremity 170 of cutting head 311. A stream of air-driven seed is applied to channel 265 through inlet 254 from conduit 255, which guides the stream of air-driven seed to outlet 250A. The stream of air-driven seed is applied to each said shoot 336 from outlet 250A, and each said shoot 336 functions to apply the stream of air-drive seed into either side of a furrow in the use of implement 400 as described in implement 300. Implement 400 demonstrates the use of shoots 336 of implement 300 used in connection with channel 265 of implement 150, in which channel 265 and inlet 254 are defined by and between plate 160 of opener 403 and seed boot 401 and outlet 250A is defined by and enclosed in seed boot 401.

In common with implement 300, implement 400 also shares fertilizer tube 390 that is connected along the back side of base 410 through drop down 319. As in implement 300, during the use of implement 400 during sowing a preselected fertilizer material is continuously conveyed from a fertilizer hopper to fertilizer tube 390, which applies the fertilizer into furrow ahead outlet 250A and shoots 336 and thus ahead of the applied seeds.

The above discussion is limited to the operation of one implement 400. Those having regard for the art will readily appreciate that a plow frame can incorporate ten, twenty, thirty, forty, fifty or more such concurrently operating implements 400 to provide the concurrent seeding and fertilizing of numerous furrows.

V.

Figure 36:
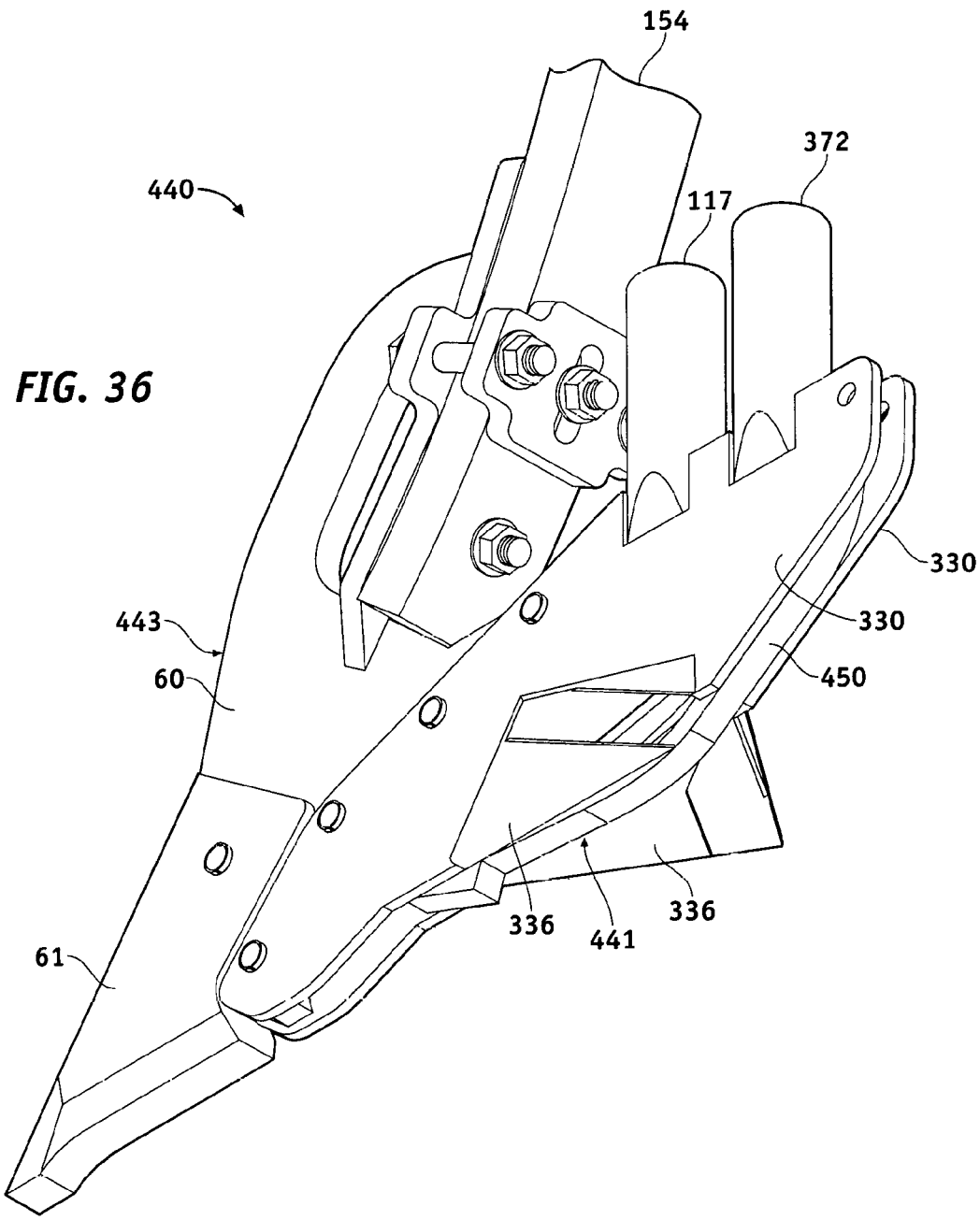
FIG. 36 is a rear perspective view of yet a further embodiment of an agricultural seeder implement constructed and arranged in accordance with the principle of the invention, the agricultural seeder implement includes a seed boot connected to an opener mounted to a shank with a buckle assembly in preparation for use of the agricultural seeder implement for sowing a crop.

Attention is now directed to FIG. 36, in which there is seen yet a further embodiment of an agricultural seeder implement 440 constructed and arranged in accordance with the principle of the invention. Implement 440 includes seed boot 441 connected to opener 443, and is shown as it would appear assembled and suspended from shank 154 discussed in connection with implement 150 in preparation for use of implement 440 for sowing a crop. Like the previously-described openers, opener 443 is a chisel, which is a form of a non-moving and non-rotating opener for being pulled by a tractor for cutting a furrow in the ground at a preselected depth from the surface of the ground, and seed boot 441 connected to opener 443 is for receiving a stream of air-driven seed and depositing said stream of air-driven seed into the furrow formed by opener 443.

Figure 37:
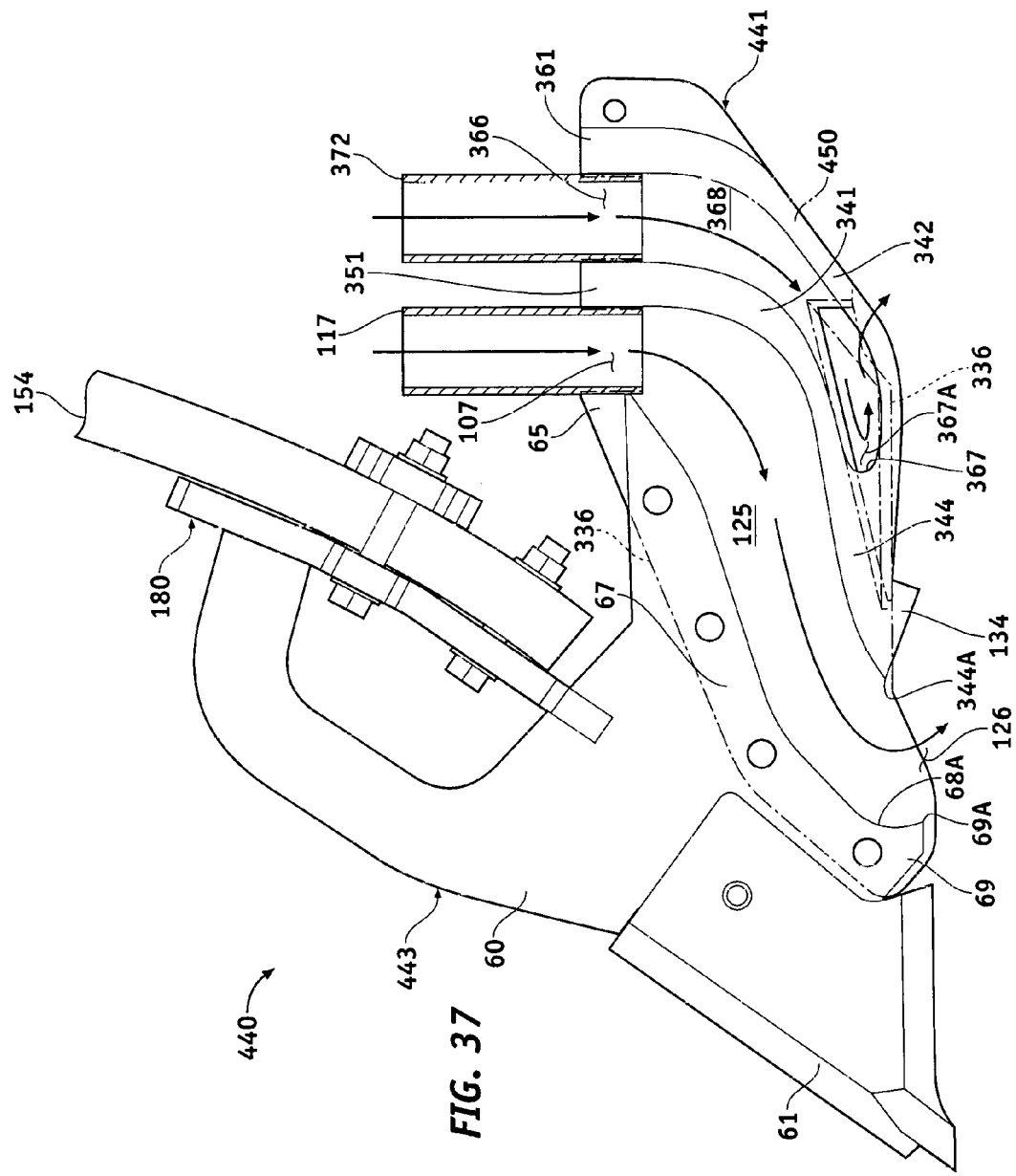
FIG. 37 is a left side elevation view of the opener and the seed boot connected to the opener of the agricultural seeder implement of FIG. 36, with portions thereof broken away and shown in dashed outline for illustrative purposes.

In common with implements 50 and 150, opener 443 shares blade or plate 60 and cutting head 61 of implement 50 and buckle assembly 180 of implement 150 that connects implement 440 to shank 154. Further in common with implement 50, in FIG. 37 plate 60 of opener 443 further shares trailing extremity 65, undersurface 68 that extends forwardly from trailing extremity 65 toward cutting head 61 and along downturned portion 68A of undersurface 68 to edge 69A of downturned prominence 69 of lower extremity 67.

Seed boot 441 includes side sheets 330 of seed boot 301 connected to either side of a base 450 as discussed above in implement 300. In common with base 340 of seed boot 301 of implement 300, base 450 shares opposed, upper and lower elongate members 341 and 342 joined at head 344 and channel 368 that extends forwardly through seed boot 401 from inlet 366 to closed end 367, which defines outlet 367A of channel 368 to shoots 336. Inlet 366 is defined between outer ends 351 and 361 of upper and lower elongate members 341 and 342, and is connected to conduit 372.

In common with seed boot 51 of implement 50, seed boot 441 shares channel 125, which extends forwardly from inlet 107 of seed boot 401 defined between outer end 351 of upper elongate member 341 of seed boot 401 and trailing extremity 65 of plate 60 of opener 403 to outlet 126 behind cutting head 61. Inlet 107 is connected to conduit 117. Outlet 126 is defined by and between edge 69A of downturned prominence 69 of plate 60 and outer end 344A of head 344 of base 110 of seed boot 51, and is pointed downwardly from seed boot 51. Like seed boot 51, seed boot 401 has deflector 134. Deflector 134 is a deflecting surface of base 450 that is formed in outer end 344A of head 344 behind outlet 126.

In use in one embodiment, implement 440 is suspended from shank 154, and shank 154, in turn, is conventionally connected to a plow frame that is pulled by a tractor for pulling opener 443 at a preselected depth through the surface of the ground in a direction from the leading extremity of opener 443, which is leading extremity 70 of cutting head 61, to the trailing extremity 65 of opener 443 for cutting a furrow in the ground by leading extremity 70 of cutting head 61. A stream of air-driven seed is applied to channel 368 through inlet 366 from conduit 372, which guides the stream of air-driven seed to outlet 367A. The stream of air-driven seed is applied to each said shoot 336 from outlet 367A, and each said shoot 336 functions to apply the stream of air-drive seed into either side of a furrow in the use of implement 440 as described in implement 300. A fertilizer material is applied to channel 125 through inlet 107 from conduit 117 according to the description of channel 125 in connection with implement 50, in which channel 125 guides the fertilizer material to outlet 126 for application of the fertilizer material downwardly into the furrow ahead of outlet 367A and shoots 336 for applying the fertilizer material into furrow ahead of the applied seeds. If desired, fertilizer material can be applied to channel 368, and a stream of air-driven seeds can be applied to channel 125.

Implement 440 demonstrates the use of shoots 336 of implement 300 used in connection with channel 265 of implement 150, in which channel 265 and inlet 254 are defined by and between plate 160 of opener 403 and seed boot 401 and outlet 250A is defined by and enclosed in seed boot 401.

The above discussion is limited to the operation of one implement 440. Those having regard for the art will readily appreciate that a plow frame can incorporate ten, twenty, thirty, forty, fifty or more such concurrently operating implements 440 to provide the concurrent seeding and fertilizing of numerous furrows.

VI.

Figure 38:
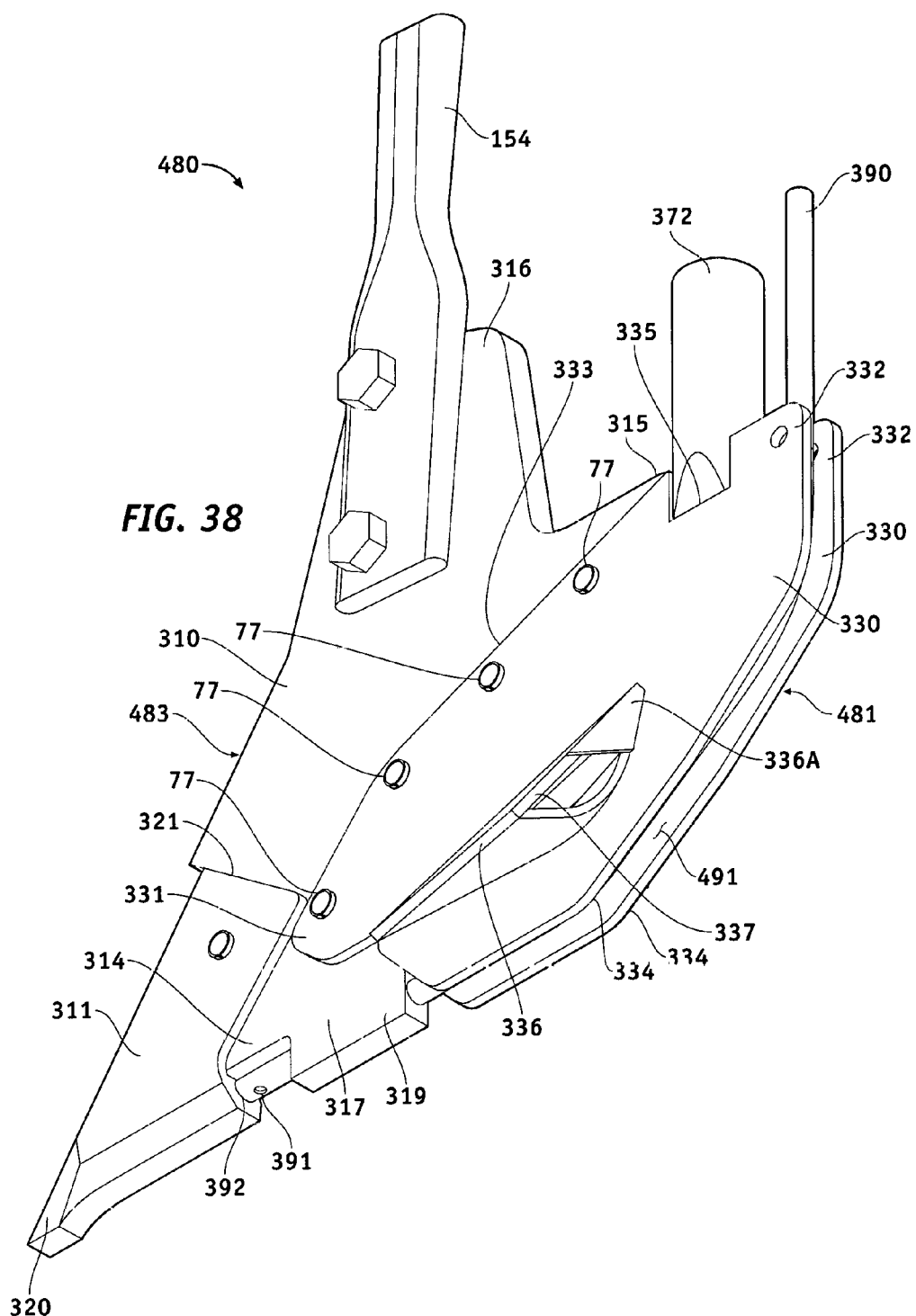
FIG. 38 is a rear perspective view of still yet another embodiment of an agricultural seeder implement constructed and arranged in accordance with the principle of the invention, the agricultural seeder implement includes a seed boot connected to an opener mounted to a shank in preparation for use of the agricultural seeder implement for sowing a crop.
Figure 39:
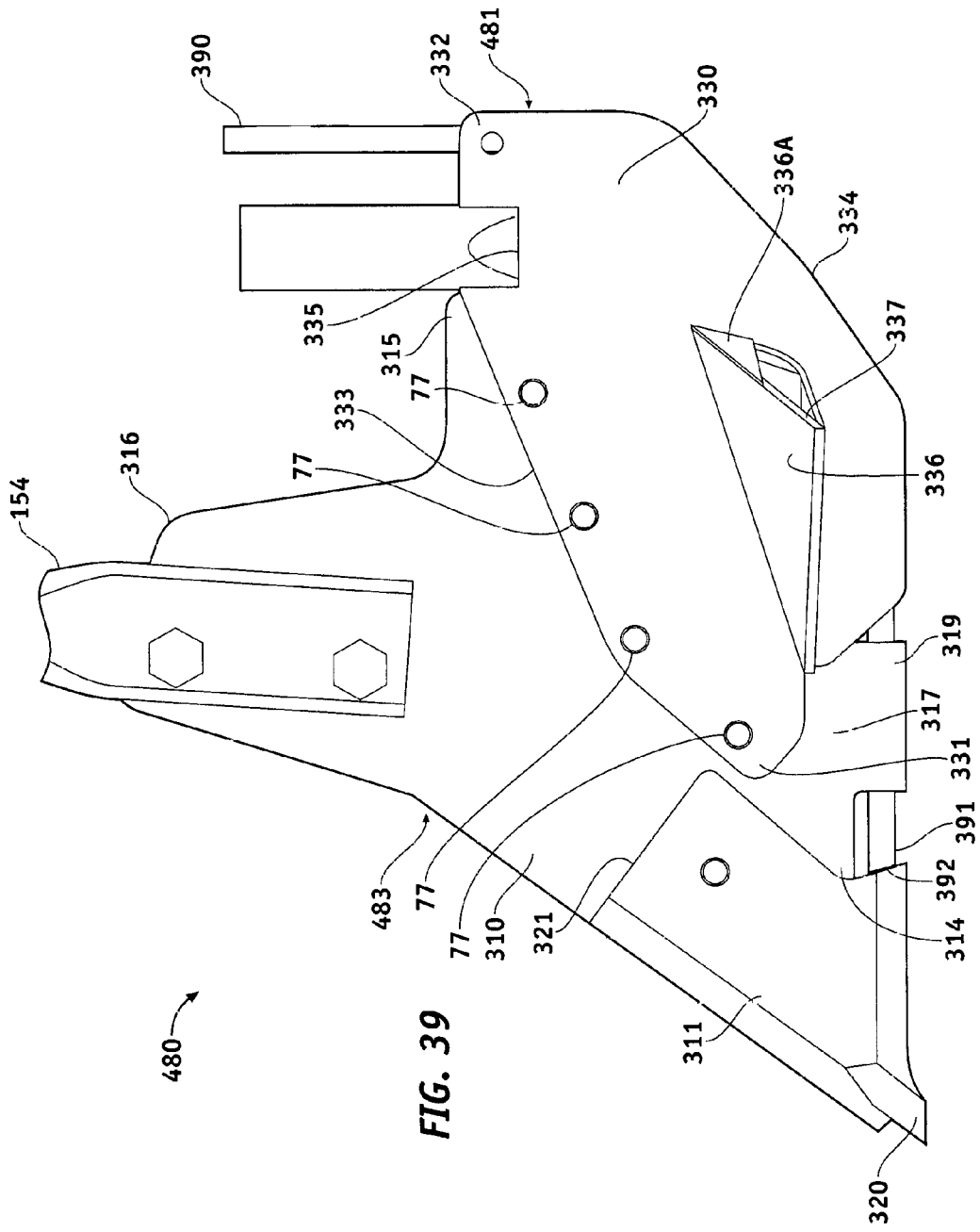
FIG. 39 is a side elevation view of the embodiment of FIG. 38.
Figure 40:
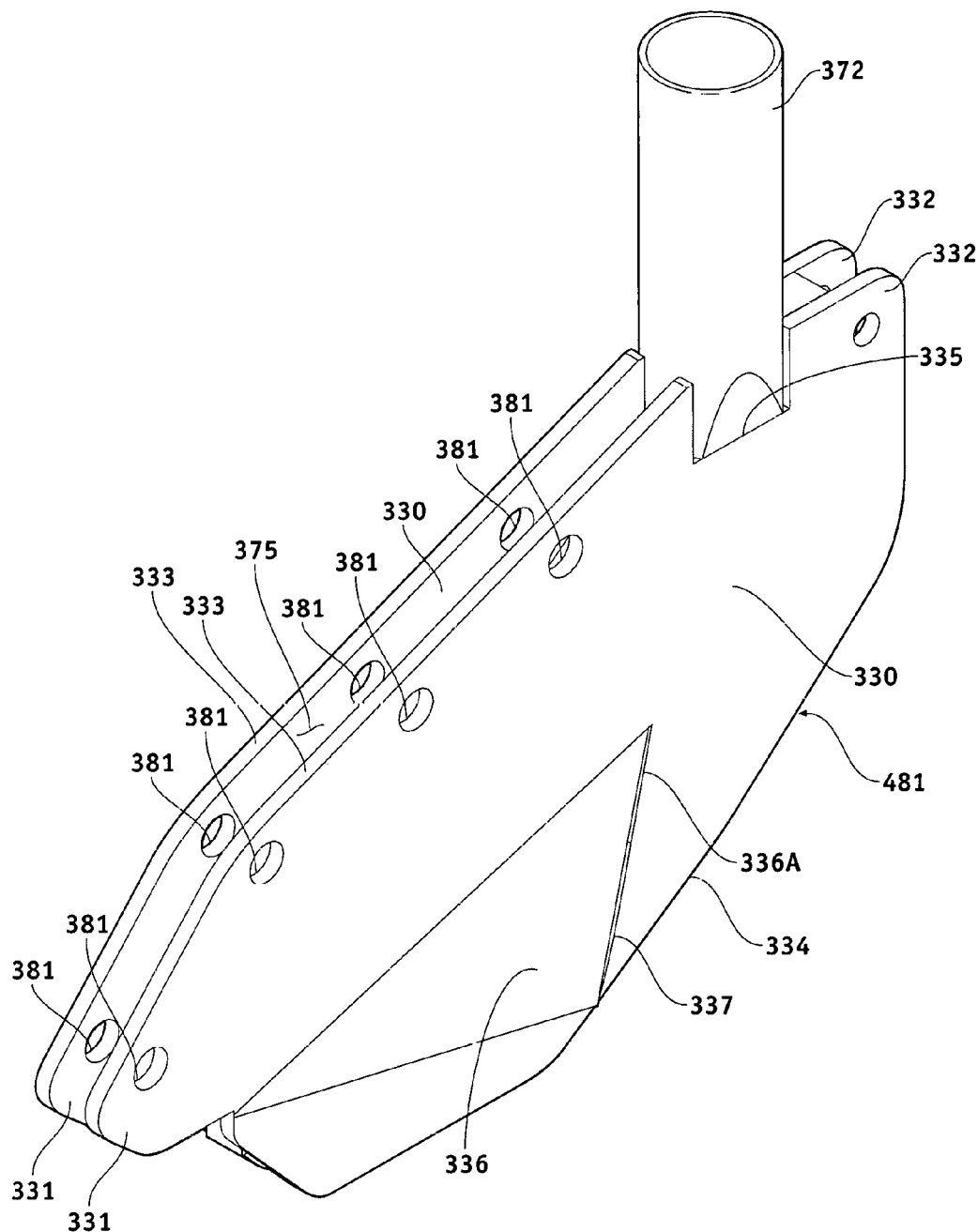
FIG. 40 is an enlarged perspective view of the seed boot of FIG. 38.

Attention is now directed to FIGS. 38 and 39, in which there is seen still another embodiment of an agricultural seeder implement 480 constructed and arranged in accordance with the principle of the invention. Implement 480 includes seed boot 481 connected to opener 483, and is shown as it would appear assembled and suspended from shank 154 discussed in connection with implement 150 in preparation for use of implement 480 for sowing a crop. Like the previously-described openers, opener 483 is a chisel, which is a form of a non-moving and non-rotating opener for being pulled by a tractor for cutting a furrow in the ground at a preselected depth from the surface of the ground, and seed boot 481 connected to opener 483 is for receiving a stream of air-driven seed and depositing said stream of air-driven seed into the furrow formed by opener 483.

Figure 42:
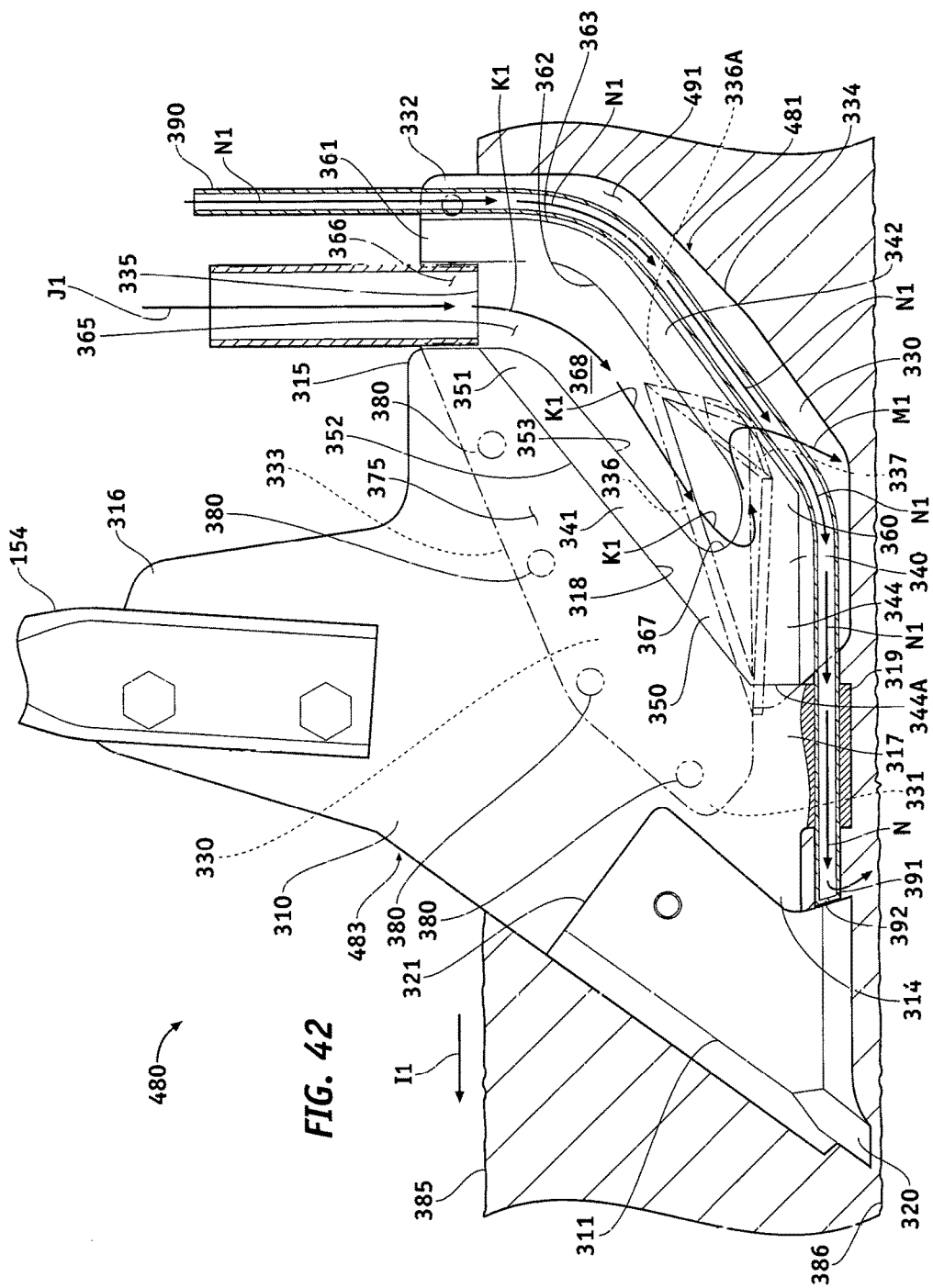
FIG. 42 is a left side elevation view of the embodiment of FIG. 38, with portions thereof broken away and shown in dashed outline for illustrative purposes.

In common with implement 300, in FIGS. 39, 39, and 42 opener 483 shares blade or plate 310, and cutting head 311. Please 310 includes leading extremity 314, trailing extremity 315 (FIG. 42), upper extremity 316, lower extremity 317, undersurface 318 in FIG. 42, and drop-down 319. Cutting head 311 is attached to, and is carried by, leading extremity 314 of plate 310. The assembly of cutting head 311 and plate 310 form opener 483. When so assembled, leading extremity 320 of cutting head 311 defines the leading extremity of opener 483, and trailing extremity 315 of plate 310 defines the trailing extremity of opener 483.

Figure 41:
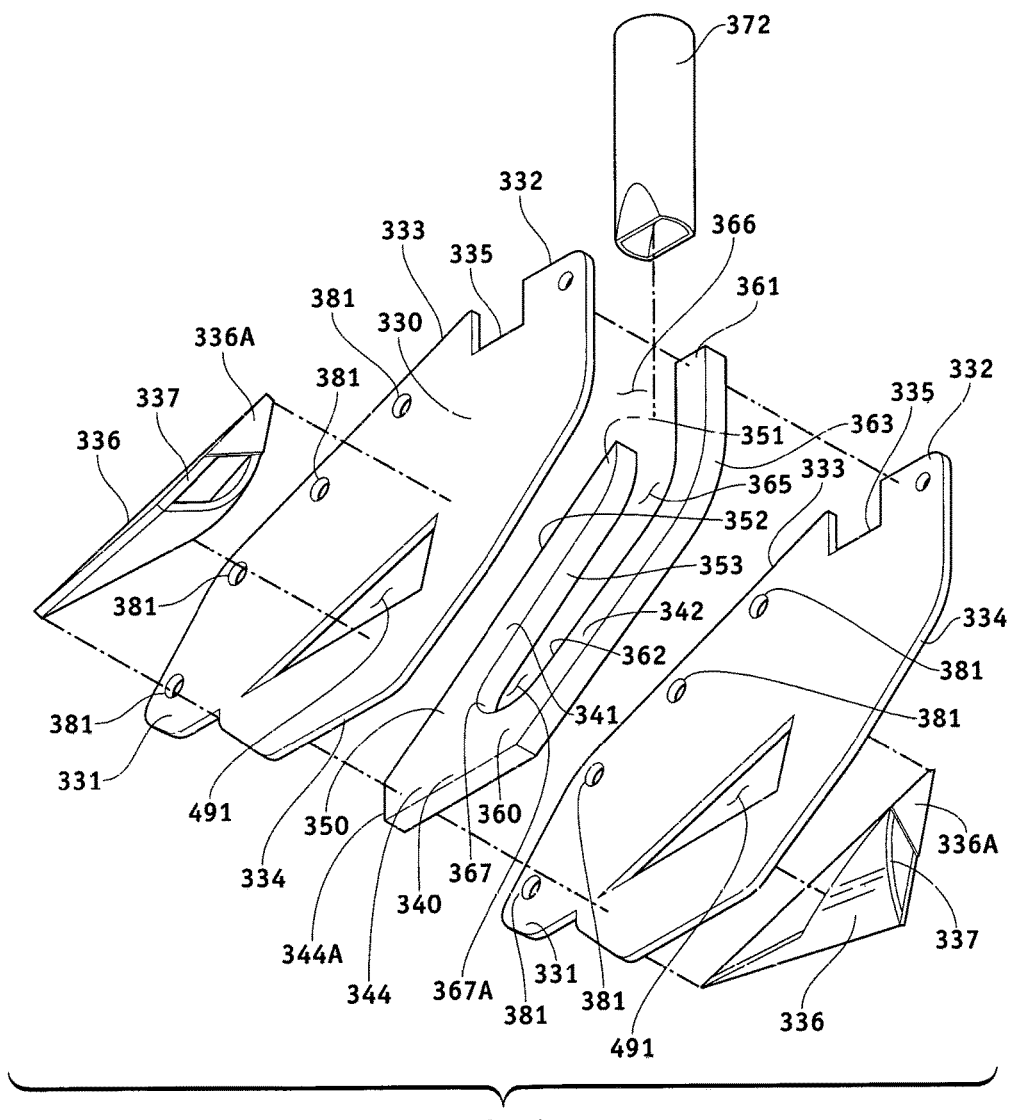
FIG. 41 is an exploded perspective view of the embodiment of FIG. 40.

In common with seed boot 481 of implement 300, in reference in relevant part to FIGS. 38-42 seed boot 481 shares side sheets 330 rigidly affixed to either side of base 340, each side sheet 330 has leading end 331, trailing end 332, upper and lower edges 333 and 334 that extend from leading end 331 to trailing end 332, cutout 335, and shoots 336, each including deflector 336A, rigidly affixed to each side sheet 330 near lower edge 334 between leading end 331 and trailing end 332. In FIG. 41, base 340 includes upper and lower elongate members 341 and 342, head 344, inner end 350, outer end 351, upper surface 352, lower surface 353, inner end 360, outer end 361, upper surface 362, lower surface 363, space or gap 365 that extends forwardly from inlet 366 defined by and between outer ends 351 and 361 to closed end 367 at head 344 where lower surface 353 and upper surface 352 intersect.

Side sheets 330 are rigidly affixed to either side of upper and lower elongate members 341 and 342 and head 244 of base 340 via welding. Side sheets 320 are axially aligned, are parallel relative to each other, and extend upright from either side of base 340 from lower edges 234, that extend along either side of head 344 and lower elongate member 342 from outer end 361 to inner end 360, and across gap 365 and across upper elongate member 341 to upper edges 333 that extend upwardly from upper surface 352 and along upper elongate member 341 from outer end 351 to inner end 350 and along head 344 from inner end 350 to outer end 344A of head 344, which encloses gap 365 from inlet 366 to closed end 367 so as to form channel 368 (FIG. 42) of seed boot 481 that extends forwardly through seed boot 481 from inlet 366, defined by and between outer ends 351 and 361 of upper and lower elongate members 341 and 342 and side sheets 330 extending thereacross, to closed end 367, which defines outlet 367A of channel 368 of seed boot 481 that is open windows 490 (FIG. 41) formed in the respective side sheets 330 that, in turn, are open to the respective shoots 336.

Shoots 336 are rigidly affixed via welding to either side of side sheets 330 in this embodiment. Side sheets 330 extend downwardly from shoots 336 and base 340 and rearwardly from base 340 to lower edges 334 that define a channel 491 through which fertilizer tube 390 extends. Shoots 336 extend across either side of the outlet 367A of channel 368 defined at closed end 367 of space 365 and are open to the outlet 367A of the defined channel 368 at closed end 367, are diametrically opposed on either side of channel 368 at closed end 367, and extend angularly outwardly from either side of seed boot 481 and rearwardly in a direction toward outer end 361 of lower elongate member 242 and trailing ends 332 of side sheets 330 to deflectors 336A formed in the open rear ends 337 of shoots 336. Deflectors 336A partially occlude the respective open rear ends 337 of shoots 336. In this embodiment, deflectors 336A extend downwardly from side sheets 330 in the direction of lower edges 334, and extend downwardly and angularly outward from either side of seed boot 481 along rear ends 337 of each respective shoot 336, and are angled forwardly toward the respective leading ends 331 of side sheets 330. Outer end 361 of lower elongate member 242 of base 340 is axially aligned with trailing ends 332 of side sheets 330, and base 340 extends forwardly toward leading ends 331 of side sheets 330 to outer end 344A of head 344 that is short of, or otherwise inboard of, leading ends 331 of side sheets 330, such that the leading ends 331 of side sheets 330 form a forked end of seed boot 481. Cutouts 335 are axially aligned and cooperate with outer ends 351 and 361 of upper and lower elongate members 341 and 342 to from inlet 366 of seed boot 481 proximate to trailing ends 332 of side sheets 330 just inside of outer end 361 of base 340. Upright conduit 372 is rigidity affixed to cutouts 335 via welding, and is for guiding a stream of air-driven seed into channel 368 of seed boot from inlet 366. For reference purposes, leading ends 331 of side sheets 330 define the leading end of seed boot 481, and trailing ends 332 of side sheets 330 and outer ends 351 and 361 of upper and lower elongate members 341 and 342 of base 340 define the trailing end of seed boot 481.

Again, side sheets 330 extend upright from either side of base 340 from lower edges 234, that extend along either side of head 344 and lower elongate member 342 from outer end 361 to inner end 360, and across upper elongate member 341 to upper edges 333 extending upwardly from upper surface 352 so as to form a gap or space 375 between side sheets 330 from upper surface 352 of upper elongate member 341 to upper edges 333, and this gap 375 extends from cutouts 335 to the leading end of each said side sheets 330.

In implement 480, seed boot 481 is removably connected directly to opener 483 and, more particularly, directly to plate 310 of opener 483. Seed boot 481 is removably connected to plate 310 so as to be suspended from plate 310. Seed boot 481 extends along lower extremity 317 of plate 310 from leading ends 331 of side sheets 330 just behind cutting head 481 connected to leading extremity 314 to trailing ends 332 of side sheets 330 and outer ends 351 and 361 of upper and lower elongate members 341 and 342 of base 340 behind trailing extremity 315 of plate 310 of opener 483 in the assembly of implement 480. Specifically, seed boot 481 is aligned under and behind plate 310 so as to align a length of lower extremity 317 of plate 310, from trailing extremity 315 to proximate to leading extremity 314 just behind cutting head 311, with gap 375 between side sheets 330 extending from conduit 372 applied to cutouts 335 to leading ends 331 of side sheets 330. The described length of plate 310 from trailing extremity 315 to proximate to leading extremity 314 just behind cutting head 311 is inserted into gap 375 of seed boot 481 between upper edges 333 of side sheets 330 so as to locate a dimension of side sheets 330 extending downwardly from upper edges 233 of side sheets 330 on either side of plate 310, so as to bring upper surface 352 of base 340 extending from outer end 361 of upper elongate member 341 to outer end 344A of head 344 into direct contact against undersurface 318 of plate 310 from trailing extremity 315 to drop down 319, and so as to bring outer end 344A of head 344 into direct contact against the portion of undersurface 318 that extends downwardly partially along drop down 319, which aligns lower extremity 317 of plate 310 from leading extremity 314 to drop down 319 with the lower side of base 340 that extends rearwardly from drop down 319, and which aligns each hole 380 of a row such holes 380 formed in plate 310 with a corresponding pair of axially-aligned holes 381 of a row of such axially-aligned pairs of holes 381 formed in side sheets 330 near upper edges 333. The row of holes 380 in plate 310 extend between trailing extremity 315 and over drop down 319 just behind cutting head 311 attached to leading extremity 314 of plate 310. The row of axially-aligned pairs of holes 381 in side sheets 330 near upper edges 333 extend between cutouts 235 at inlet 366 and leading ends 331 of side sheets 330. Like implement 300, in implement 480 spring pins 77 are installed in each set of three aligned holes, including one hole 380 of plate 310 that is between and aligned with a corresponding pair of axially-aligned holes 381 of seed boot 481. As in implement 300, in implement 480 the described connection of seed boot 481 to plate 310 is a non-destructive releasable or removably coupling, which allows seed boot 481 to be removed from plate 310 for replacement or repair by reversing the installation operation, such as by forcibly removing spring pins 77 from each said set of three aligned holes, such as with a hammer or ram, and separating seed boot 481 from plate 310, without the need to destroy seed boot 481 or plate 310 in the detaching process.

With seed boot 481 so installed on plate 310 of opener 483, seed boot 481 is suspended from plate 310 under undersurface 318 of plate 310 as shown in FIG. 42. Seed boot 151 extends from inlet 366 located at the trailing end of seed boot 481 behind trailing extremity 315 of plate 310 to the leading end of seed boot 481 at leading ends 331 of side sheets 330 positioned above drop down 319 just behind cutting head 311 connected to leading extremity 314 of plate 310. In FIG. 42, conduit 372 extends into inlet 366 and extends upright therefrom between trailing extremity 315 of plate 310 of opener 153 and outer end 361 of lower elongate member 242 of base 340. Base 340, in turn, extends forwardly under undersurface 318 of plate 310 from outer end 361 behind trailing extremity 315 of plate 310 to outer end 344A of head 344 in direct contact against the portion of undersurface 318 that extends partially downwardly along drop down 319. Channel 368 extends forwardly through seed boot 481 from inlet 366 to the outlet 367A defined at closed end 367 that leads to shoots 336 on either side of seed boot 481.

And so implement 300 includes seed boot 481 connected directly to opener 483 having a leading extremity, consisting of leading extremity 320 of cutting head 311, and a trailing extremity, consisting of trailing extremity 315 of plate 310. Seed boot 481 has inlet 366, and outlet 367A at closed end 367. Outlet 367A is open to each said shoot 336, via the respective windows 491 (FIG. 41), on either side of seed boot 481, and channel 368 extends forwardly through seed boot 481 from inlet 366 of seed boot 481 proximate to the trailing extremity of opener 483 defined as trailing extremity 315 of plate 310 to outlet 367A open to shoots 336 behind cutting head 311 and, moreover, behind leading extremity of opener 483 defined as leading extremity 320 of cutting head 311. In FIGS. 38, 39, and 42 illustrating implement 300 assembled and suspended from shank 304, upper extremity 316 of opener 483 is connected to shank 304, and opener 483 depends downwardly from shank 304 to seed boot 481 located behind cutting head 311 of opener 483.

In use in reference to FIG. 42, implement 480 is suspended from shank 154, and shank 154, in turn, is conventionally connected to a plow frame that is pulled by a tractor for pulling opener 483 at a preselected depth through surface 385 of the ground in a direction of arrowed line I1 from the leading extremity of opener 483 to the trailing extremity of opener 483 for cutting furrow 386 in the ground beneath surface 385 by leading extremity 320 of cutting head 311 that, in turn, defines the leading extremity of opener 483. Seeds are conventionally conveyed by an air stream from a seed hopper to conduit 372 in the direction of arrowed line J1, which conveys such stream of air-driven seeds into channel 368 through inlet 366. Channel 368 is for guiding the stream of air-driven seed forwardly through channel 368 from inlet 366 to outlet 367A at closed end 367 in the direction of arrowed lines K1 to outlet 267A. The stream of air-driven seed strikes closed end 367, which deflects and divides the stream of air-driven seed outwardly through either side of outlet 367A through windows 491 into each said shoot 336 on either side of seed boot 481. Each said shoot 336 on either side of outlet 367A is for receiving its part of the air-driven stream of seed from outlet 267A at either side of seed boot 481 and guiding its said part of the stream of air-driven seed rearwardly and angularly outwardly therethrough to into either side of furrow 386 on either side of seed boot 481 through open rear end 337 as in implement 150, and also for guiding some of its said part of the stream of air-driven seed rearwardly and angularly outwardly to deflector 336A partially occluding open rear end 337, which deflects said some of its said part of the stream of air-driven seed forwardly and downwardly into either side of furrow 386 on either side of seed boot 481 in the direction of arrowed line M1. The deflection of part of the stream of air-driven seed forwardly and downwardly into either side of furrow 381 by deflector 336A beneficially consolidates part of the stream of air-driven seed downwardly and also forwardly into furrow 381, which inhibits the deflected seed from scattering to inhibit seed loss and to provide a controlled deposition of the deflected seed downwardly and forwardly into furrow 381.

As implement 480 is pulled through the ground, the seed is continually deposited angularly outwardly into either side of furrow 386 on either side of implement 480 through shoots 336 and downwardly into either side of the furrow from deflectors 336A of shoots 336. In FIG. 42, fertilizer tube 390 is connected via welding to lower surface 363 along the back side of outer end 361 of base 340 of seed boot 481, and extends through channel 491 along lower surface 363 along the underside of head 344 and through drop down 319. Fertilizer tube 390 is contoured to lower surface 363 and the underside of head 344, and extends forwardly through drop down 319 to outlet 391 through an outer end 392 of fertilizer tube 390 that is situated against trailing extremity 321 of cutting head 311 that extends downward from leading extremity 314 of plate 310 that protects outlet 391 from the ground passing underneath it to prevent outlet 391 from clogging and becoming damaged. Outlet 391 and outer end 392 of fertilizer tube 390 are located ahead of outlet 367A and shoots 336. A preselected fertilizer material is continuously conveyed from a fertilizer hopper to fertilizer tube 390, and fertilizer tube 290 is for conveying the fertilizer material therethrough in the direction of arrowed lines N1 to outlet 391 of fertilizer tube 390 for application therethrough into furrow 386 ahead of the applied seeds.

The above discussion is limited to the operation of one implement 480. Those having regard for the art will readily appreciate that a plow frame can incorporate ten, twenty, thirty, forty, or perhaps fifty or more such concurrently operating implements 480 to provide the concurrent seeding and fertilizing of numerous furrows.

VII.

Figure 43:
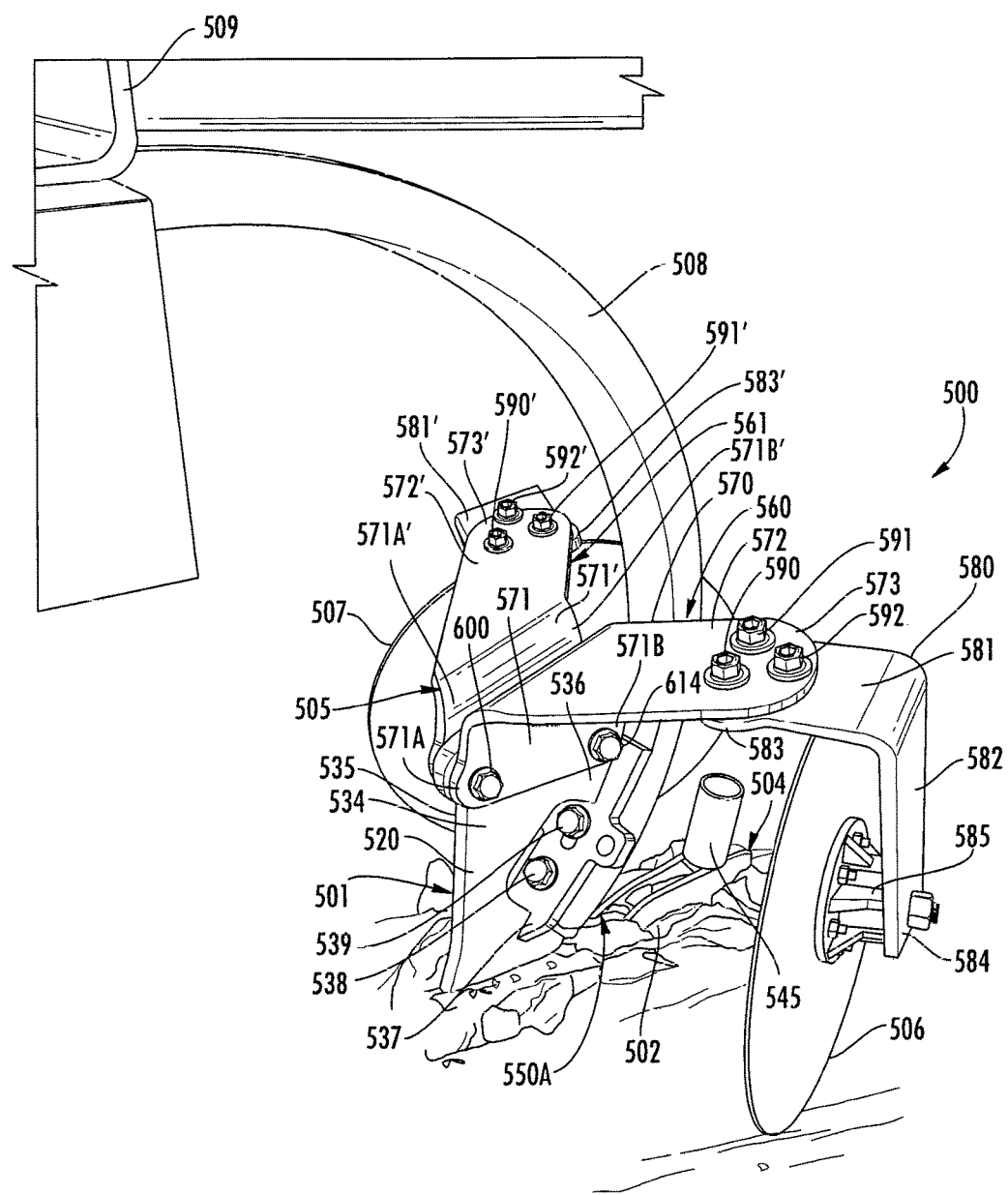
FIG. 43 is a left side perspective view of still a further embodiment of an agricultural seeder implement constructed and arranged in accordance with the principle of the invention, the agricultural seeder implement is shown as it would appear in use and includes an opener for cutting a furrow, a seed boot, mounted to the opener, for depositing seeds in the furrow, a frame mounted to the opener, and a left side disk and a right side disk mounted to the frame and shown as they would appear in closing positions for distributing loosened soil over seeds deposited in the furrow by the seed boot.
Figure 44:
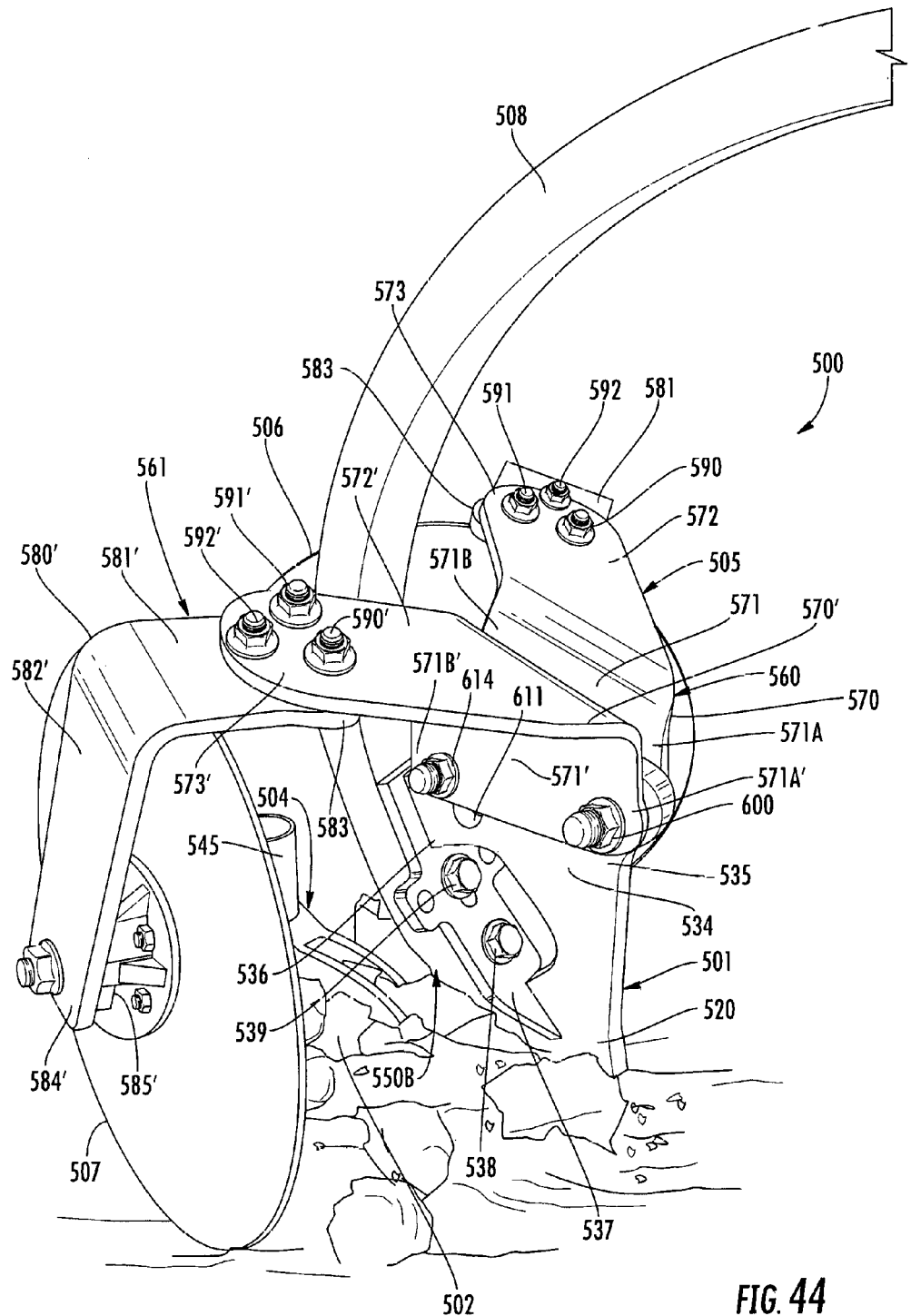
FIG. 44 is a right side perspective view of the embodiment of FIG. 43.
Figure 45:
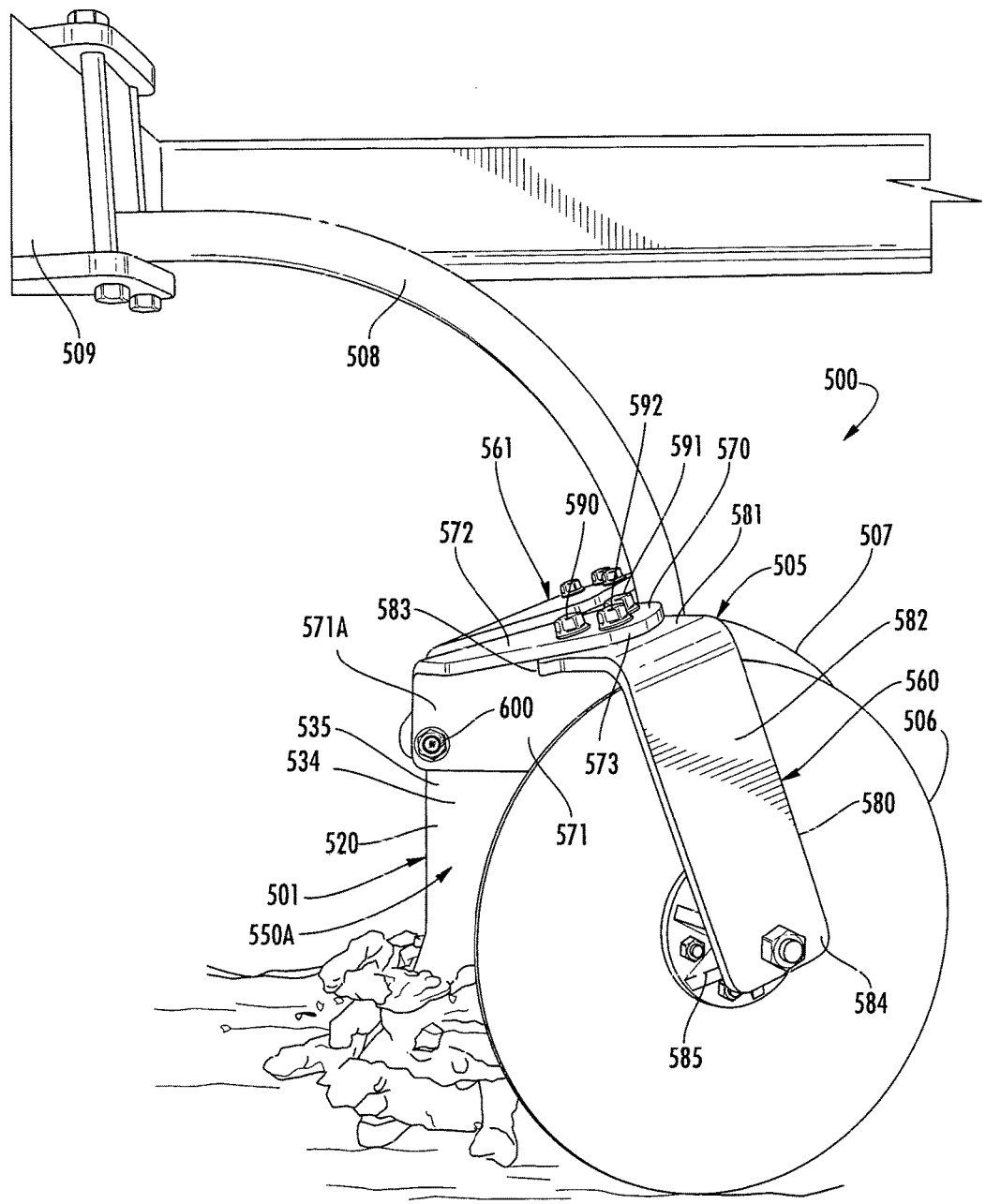
FIG. 45 is a left side elevation view of the embodiment of FIG. 43, the opposite right side elevation view being substantially the same thereof.
Figure 46:
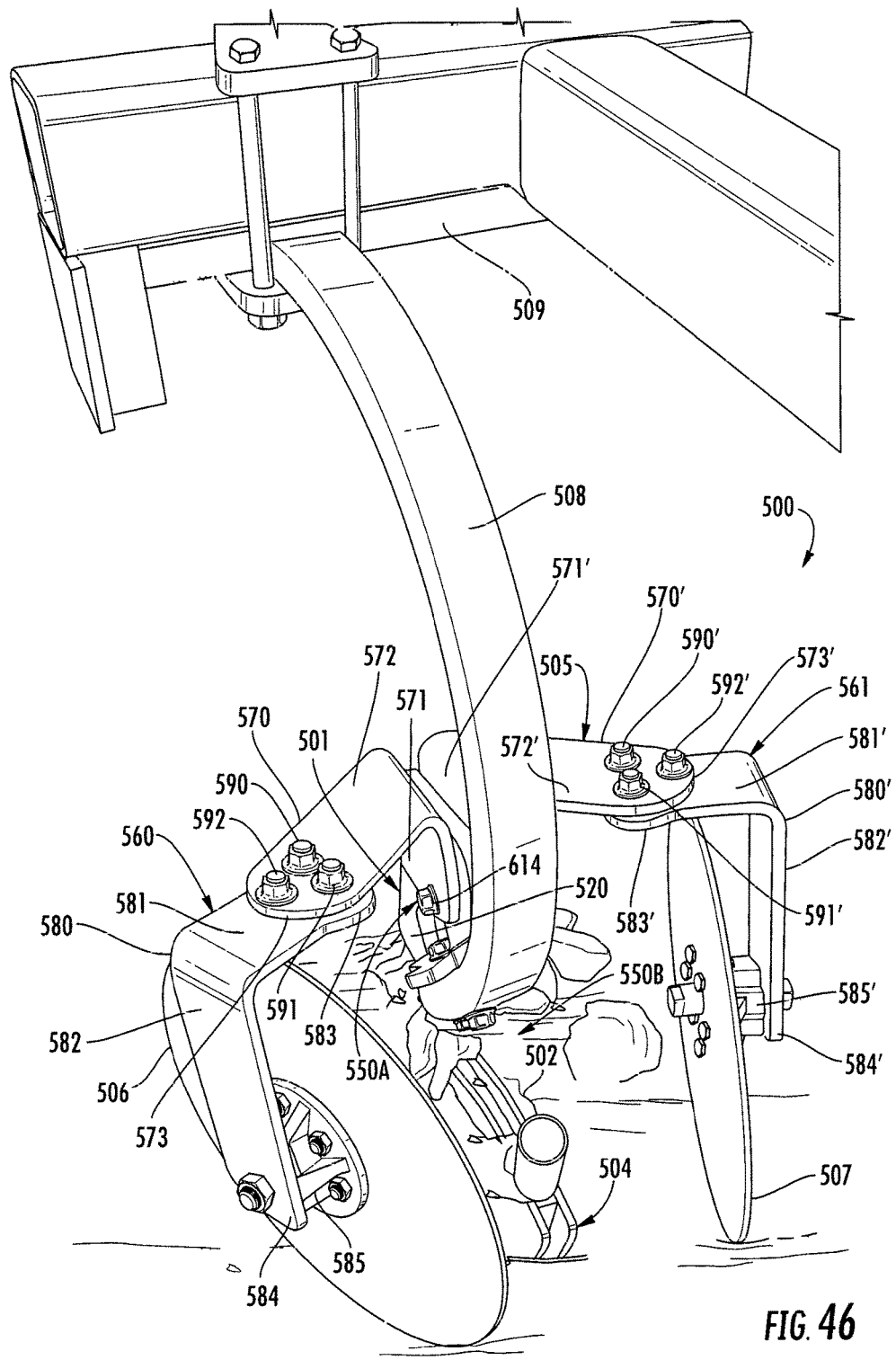
FIG. 46 is a rear perspective view of the embodiment of FIG. 43.
Figure 47:
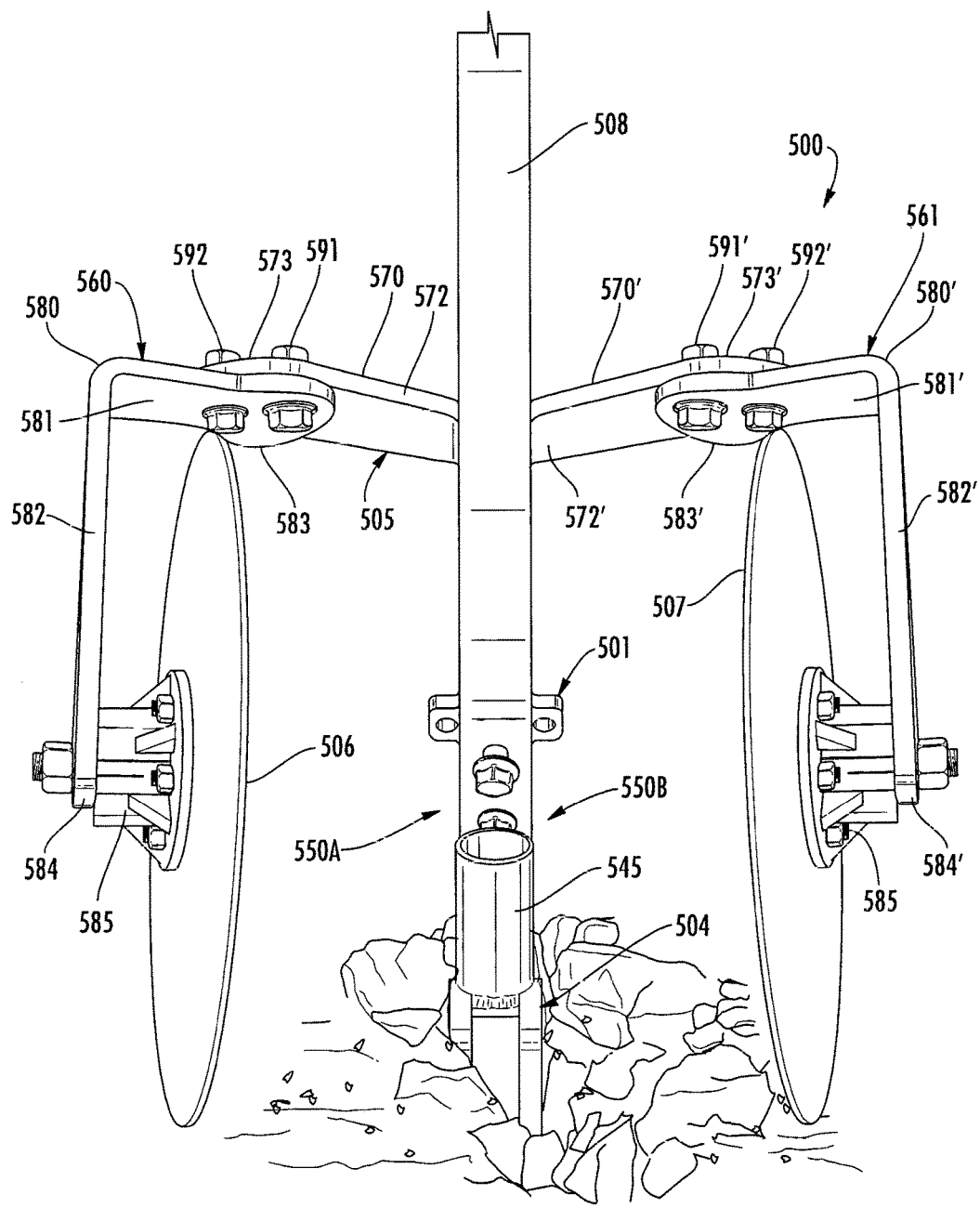
FIG. 47 is a rear elevation view of the embodiment of FIG. 43.

Attention is now directed to FIGS. 43-47, in which there is seen still another embodiment of an agricultural seeder implement 500 constructed and arranged in accordance with the principle of the invention. Implement 500 is shown as it would appear assembled and in use in FIGS. 43-47 for sowing a crop and includes opener 501 for cutting furrow 502 (FIGS. 43, 44, 46, and 47), seed boot 504 (FIGS. 43, 44, 46, and 47), mounted to opener 501, for depositing seeds in furrow 502, frame 505 mounted to opener 501, and a pair of disks, disk 506 and disk 507, mounted to frame 505. Seed boot 504 is mounted directly to opener 501, and frame 505 is mounted directly to opener 501. Accordingly, implement 500 is an integrated system of opener 501, seed boot 504, frame 505, and disks 506 and 507. Disk 506 is on a left side of implement 500 and is considered a left side disk of implement 500. Disk 507 is on a right side of implement and is considered a right side disk of implement 500. Disks 506 and 507 are shown as they would appear engaging the ground in in closing positions in FIGS. 43-47 for distributing loosened soil over seeds deposited in furrow 502 by seed boot 504. As will be discussed subsequently, disks 506 and 507 can be adjusted into opening positions for distributing loosened soil away from furrow 504, such as to enable application of fertilizer adjacent to seeds deposed into furrow 502 by seed boot 504 by a following fertilizer applicator or system. Implement 500 is suspended from shank 508 of plow frame 509, shown in FIGS. 43, 45, and 46, in a ground engaging position for sowing a crop. Opener 501 is a chisel, which is a form of a non-moving and non-rotating opener for being pulled by a tractor for cutting furrow 502 in the ground at a preselected depth from the surface of the ground, and seed boot 504 connected to opener 501 is for receiving a stream of air-driven seed and depositing said stream of air-driven seed in furrow 502 formed by opener 501. FIG. 43 is a left side perspective view of implement 500 shown as it would appear in use, FIG. 44 is a right side perspective view of the embodiment of FIG. 43, FIG. 45 is a left side elevation view of the embodiment of FIG. 43, the opposite right side elevation view being substantially the same thereof, FIG. 46 is a rear perspective view of the embodiment of FIG. 43, and FIG. 47 is a rear elevation view of the embodiment of FIG. 43.

Figure 48:
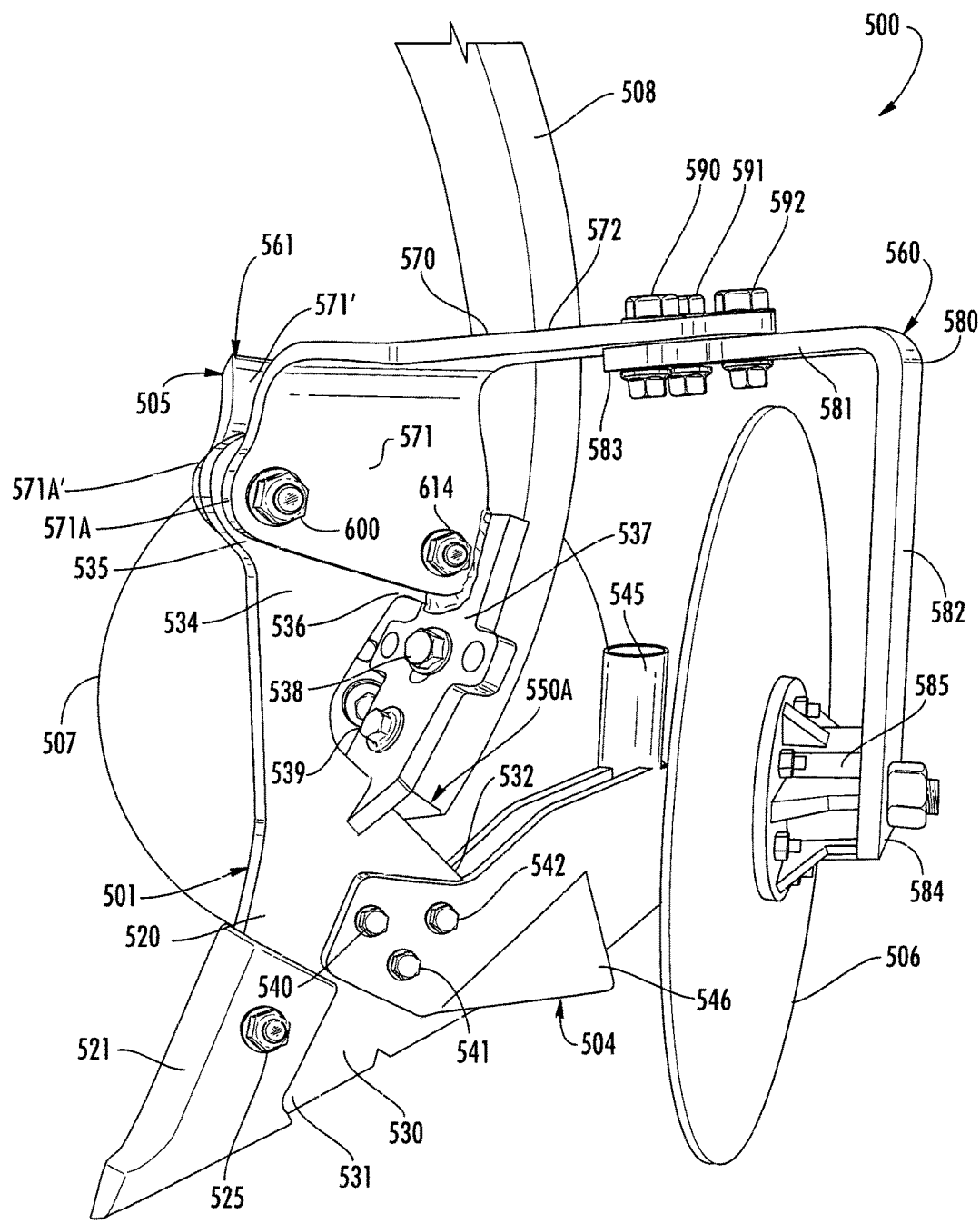
FIG. 48 is a left side perspective view of the agricultural seeder implement of FIG. 43, the first disk and the second disk being shown in lowered positions, respectively, corresponding to a lowered position of the frame.
Figure 49:
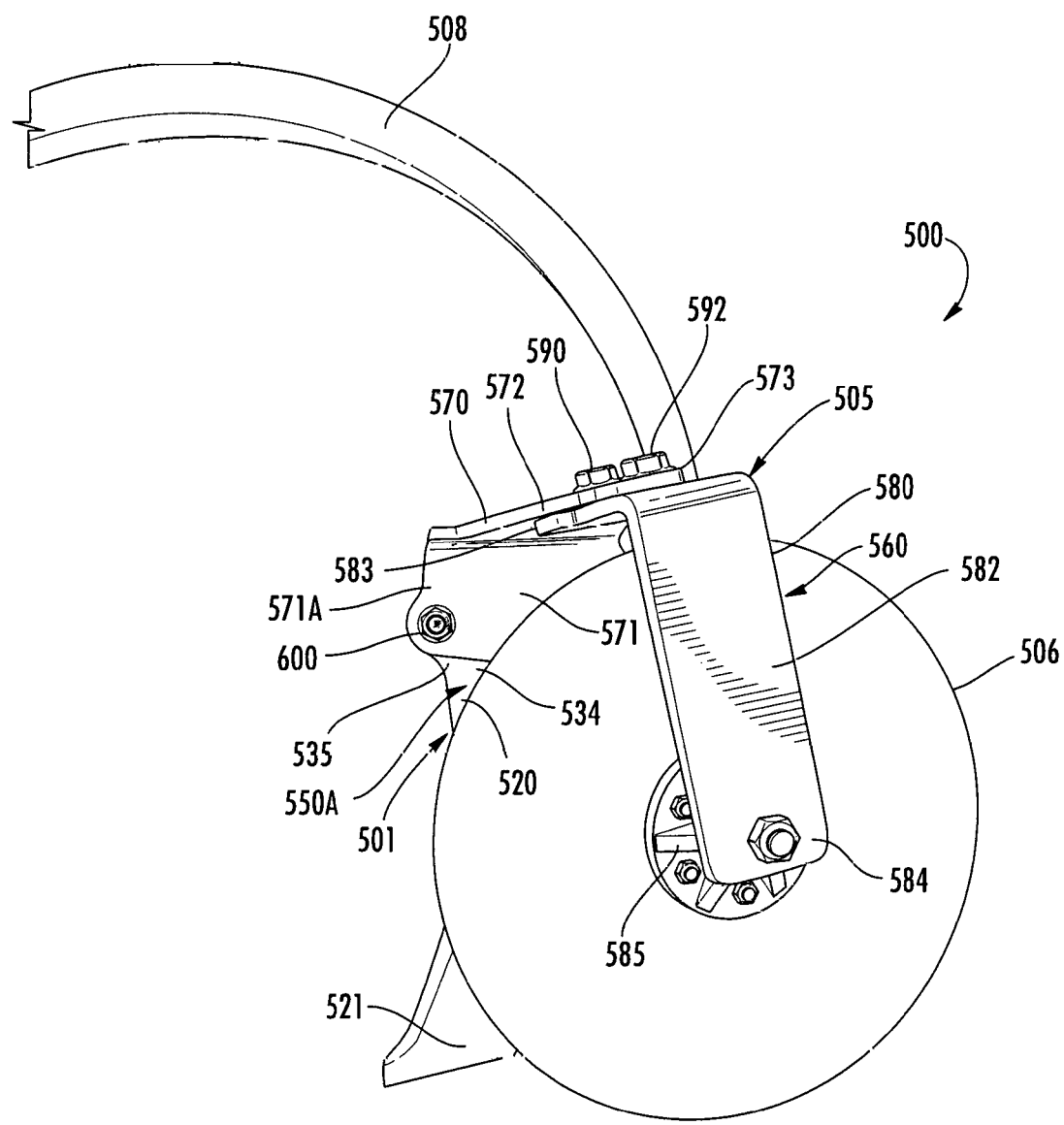
FIG. 49 is a left side elevation view of the embodiment of FIG. 48, the opposite right side elevational view being substantially the same thereof.
Figure 50:
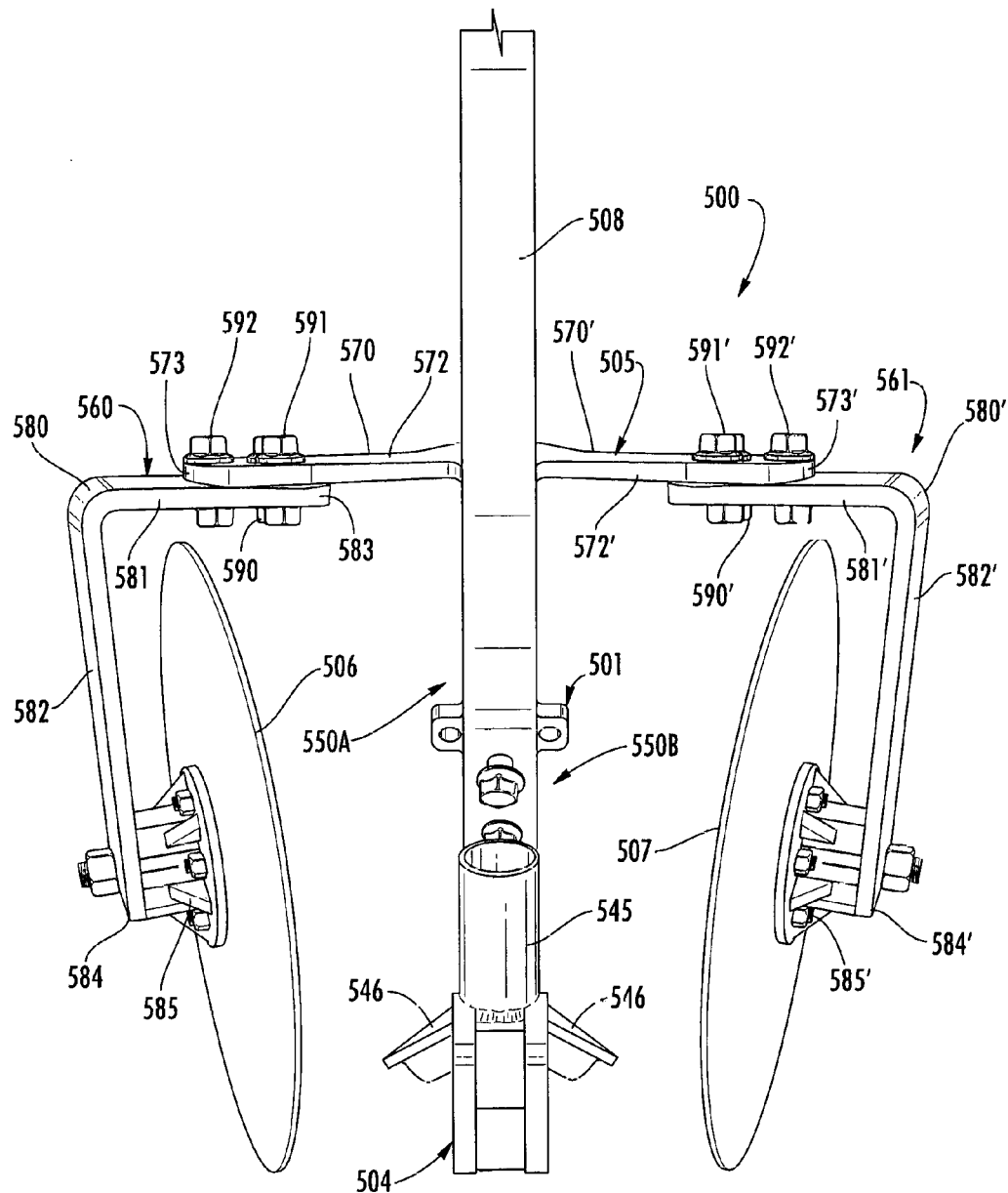
FIG. 50 is a rear elevation view of the embodiment of FIG. 48.
Figure 51:
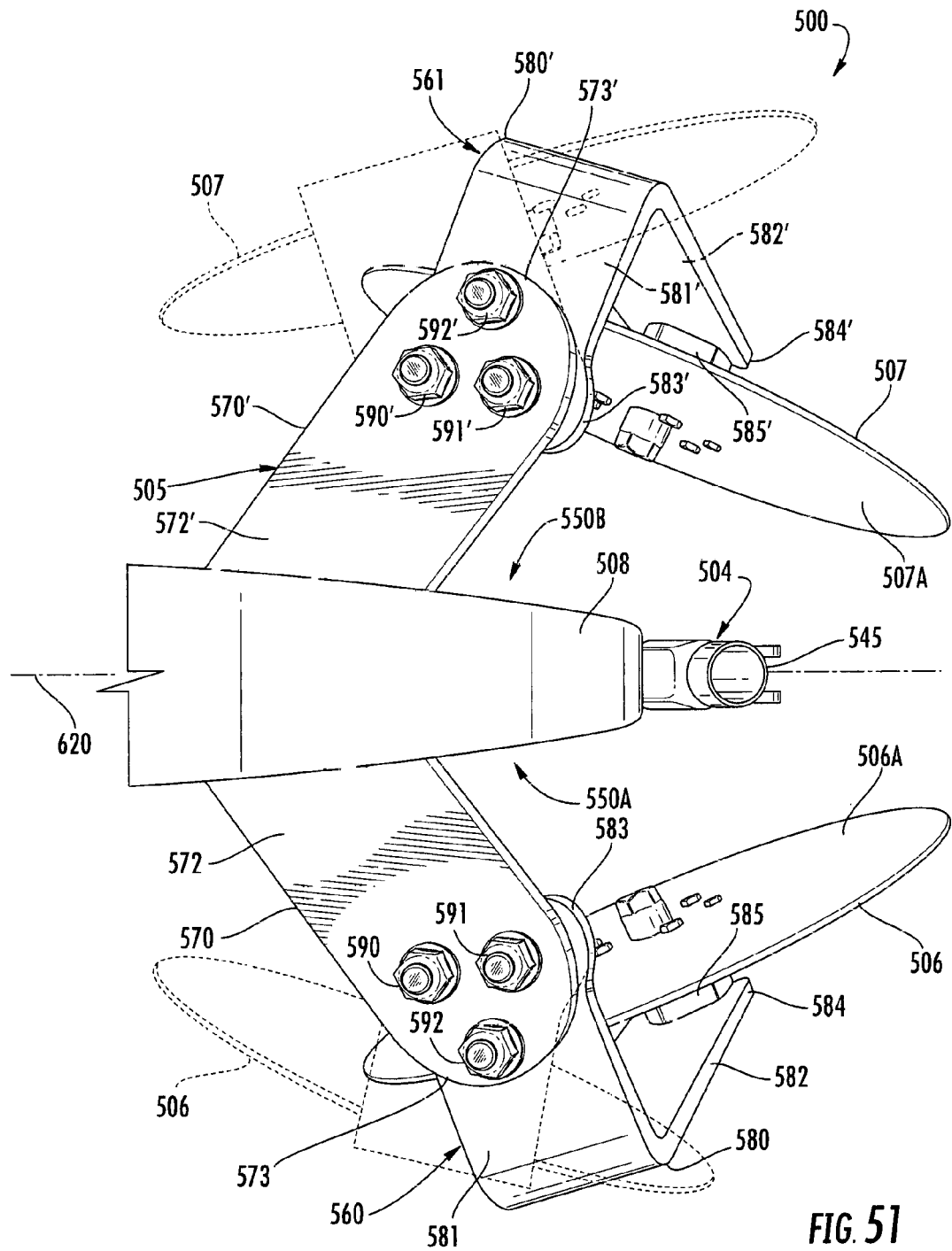
FIG. 51 is a top plan view of the embodiment of FIG. 48, including dashed line positions of the left side disk and the right side disk as they would appear in opening positions for distributing loosened soil away from a furrow.
Figure 52:
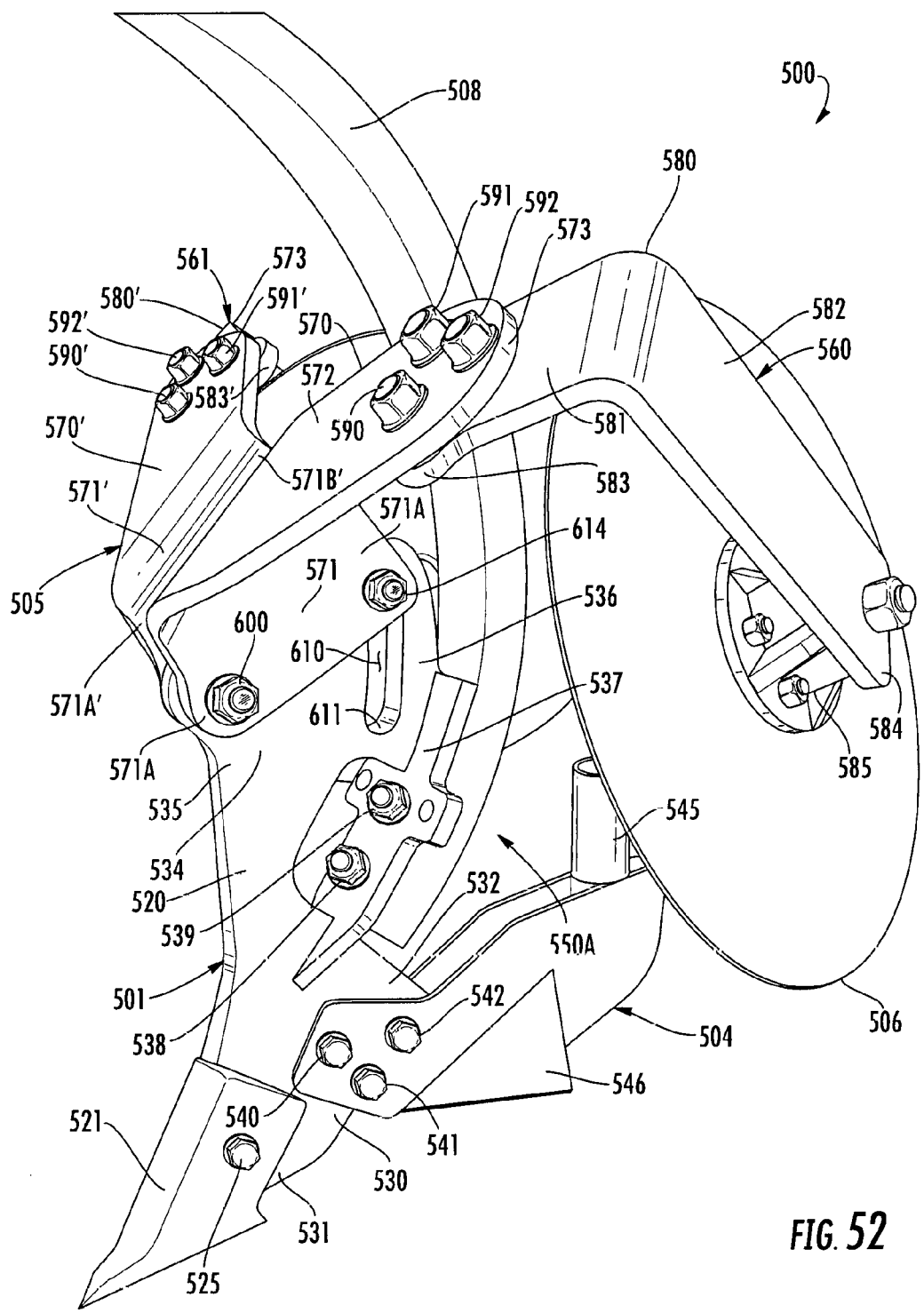
FIG. 52 is a left side perspective view of the agricultural seeder implement corresponding to FIG. 48, the first disk and the second disk being shown in raised positions, respectively, corresponding to a raised position of the frame.
Figure 53:
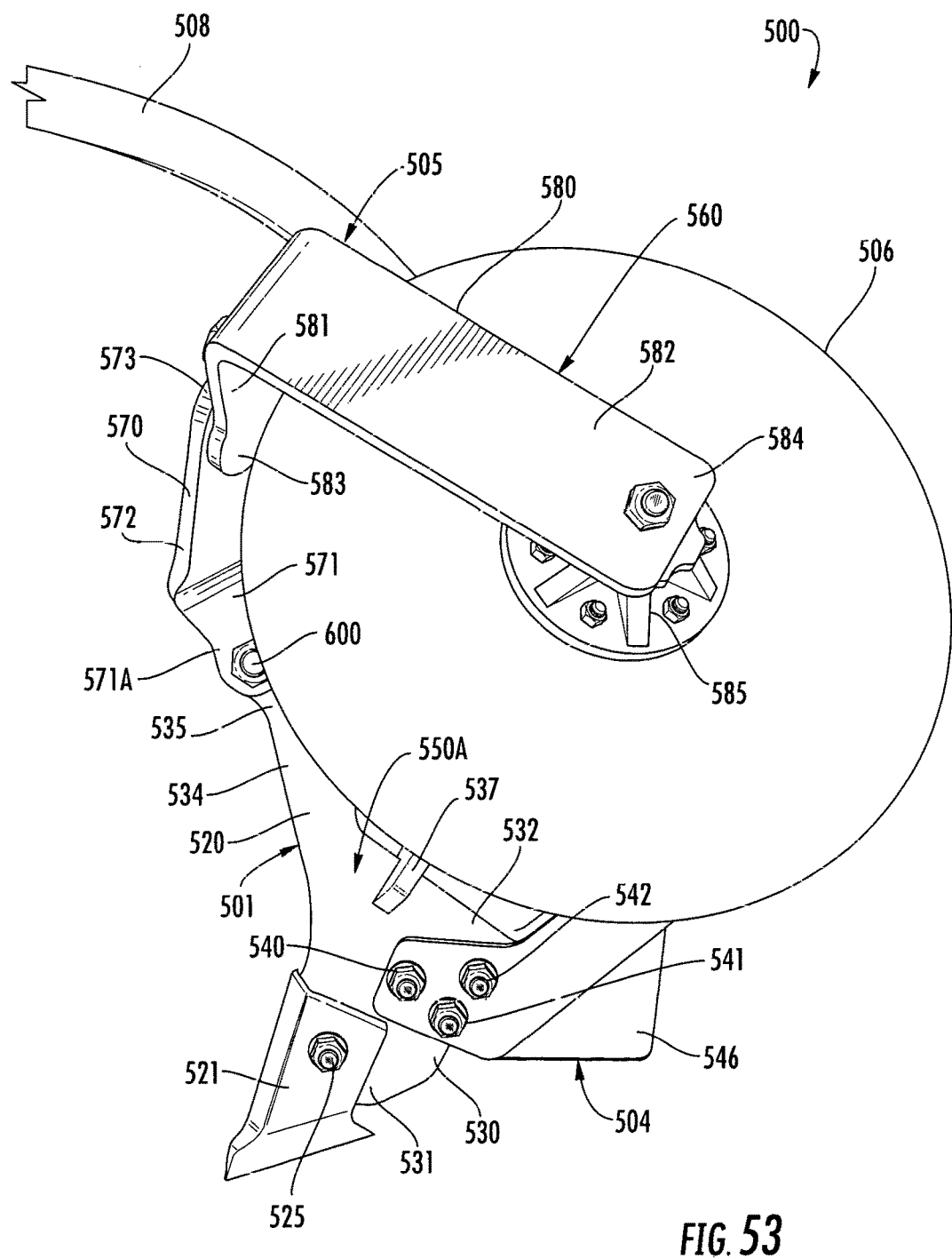
FIG. 53 is a left side elevation view of the embodiment of FIG. 52, the opposite right side elevational view being substantially the same thereof.
Figure 54:
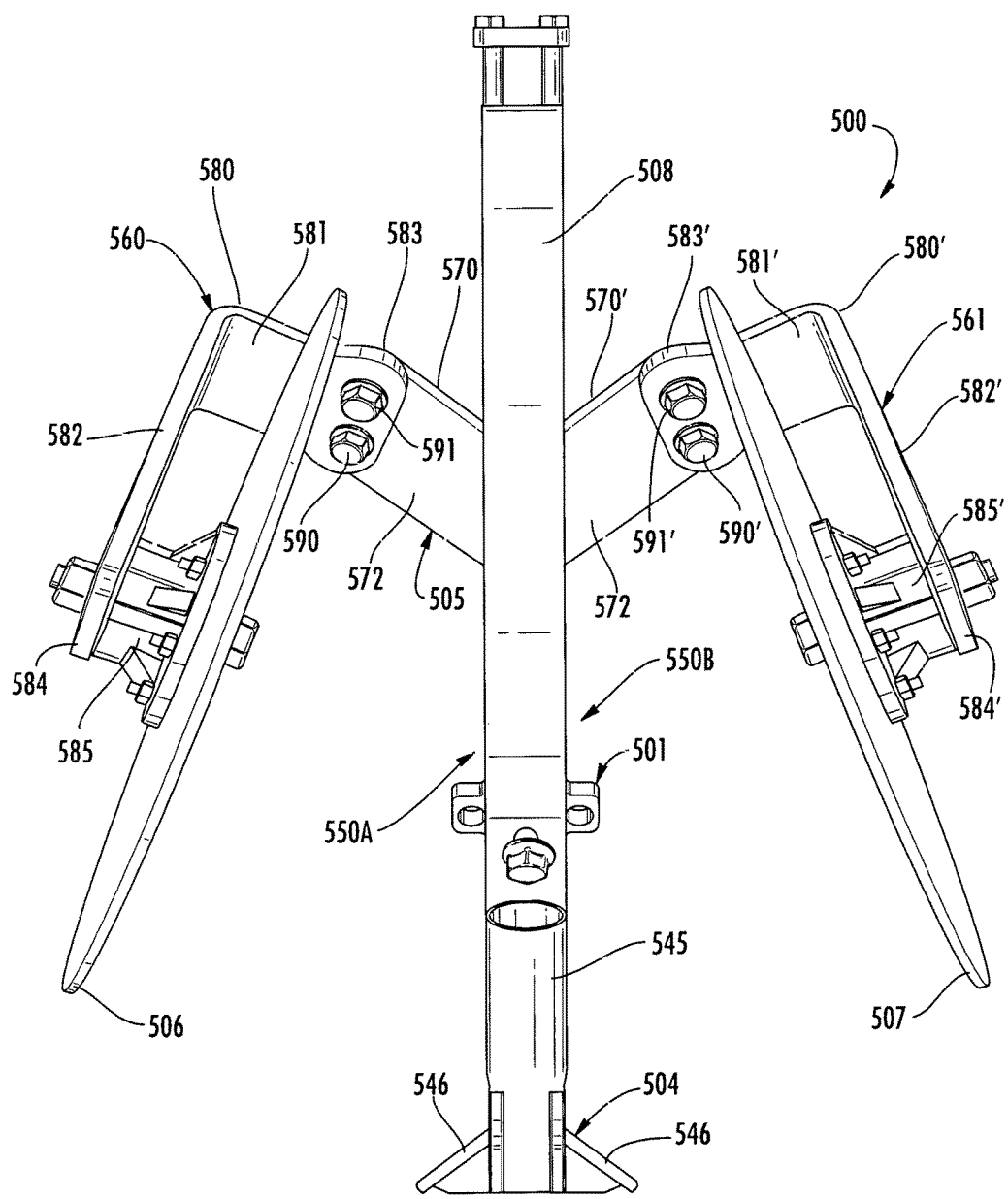
FIG. 54 is a rear elevation view of the embodiment of FIG. 52.

Frame 505 is mounted to opener 501 for movement between a first or lowered position in FIG. 48, and a second or raised position in FIG. 52. In FIG. 48, disks 506 and 507 are in lowered positions when frame 505 in its first or lowered position. In FIG. 52, disks 506 and 507 are in raised positions when frame 505 in its second or raised position. FIG. 49 is a left side elevation view of the embodiment of FIG. 48, the opposite right side elevational view being substantially the same thereof, FIG. 50 is a rear elevation view of the embodiment of FIG. 48, and FIG. 51 is a top plan view of the embodiment of FIG. 48. FIG. 53 is a left side elevation view of the embodiment of FIG. 52, the opposite right side elevational view being substantially the same thereof, and FIG. 54 is a rear elevation view of the embodiment of FIG. 52. In this example, frame 505 is mounted pivotally to opener 501 for movement between its first or lowered position and it second or raised position.

Referring to FIG. 48, opener 501 includes blade or plate 520, and cutting head 521. Blade or plate 520, a fixture that carries cutting head 521, is flat and straight in a vertical direction, and is stout, strong, robust, and of substantial construction being formed of steel or other metal having inherently strong and resilient material characteristics. Plate 520 includes lower extremity 530 having leading end 531 and trailing end 532. Plate 520 extends upright from lower extremity 530 to upper extremity 534 having leading end 535 and trailing end 536. The back or trailing side of plate 520 is formed with bracket 537. Bracket 537 extends between trailing end 536 of upper extremity 534 and a middle of plate 520 between lower extremity 530 and upper extremity 534, and is coupled to shank 508 with bolt assemblies 538 and 539. Leading extremity 531 carries cutting head 521, which is stout, strong, robust, and of substantial construction like that of plate 520, being formed of cast iron in this example or other selected metal material having inherently strong and resilient material characteristics. In this example, cutting head 521 is attached to leading extremity 531 of plate 520 with a bolt assembly 525.

Seed boot 504 is elongate and is stout, strong, robust, and of substantial construction being formed of steel or other metal having inherently strong and resilient material characteristics. Seed boot 504 is connected to trailing end 532 of lower extremity 530 of plate 520 with bolt assemblies 540, 541, and 542, and extends rearwardly behind plate 520 from trailing end 532 to an upright conduit 545. A channel through seed boot communicates with upright conduit 540 and shoots 541 on either side of seed boot 504 in FIG. 50, and conducts air-driven seed through seed boot 504 from upright conduit 545 to shoots 546, which eject the air-driven seed rearwardly in the furrow dug by opener 501.

Referring in relevant part to FIGS. 43-54, for reference purposes reference numeral 550A denotes a first or left side of both opener 501 and seed boot 504, and reference numeral 550B denotes a second or right side of both opener 501 and seed boot 504. Frame 505 includes supports 560 and 561. Support 560 is adjacent to left side 550A of opener 501 and seed boot 504. Support 561 is adjacent to right side 550B of opener 501 and seed boot 504. Support 560 on left side 550A is considered a left side support of frame 505 of implement 500. Support 561 on right side 550B is considered a right side support of frame 505 of implement 500. Disk 506, the left side disk of implement 500, is mounted to support 560 adjacent to left side 550A of opener 501 and seed boot 504. Disk 507, the right side disk of implement 500, is mounted to support 561 adjacent to right side 550B of opener 501 and seed boot 504. Supports 560 and 561 are mounted to opener 501 for movement between a first or lowered position in FIG. 48, and a second or raised position in FIG. 52. In FIG. 48, disks 506 and 507 are in lowered positions, when supports 560 and 561 are in their first or lowered positions. In FIG. 52, disks 506 and 507 are in raised positions, when supports 560 and 561 are in their second or raised positions. Supports 560 and 561 are mounted pivotally to opener 501 for movement between their first or lowered positions and their second or raised positions. Support 560 on left side 550A of opener 501 is axially spaced from support 561 on right side 550B of opener 501, and disk 506 on left side 550A of opener 501 is axially spaced from disk 507 on right side 550B of opener 501. Disks 506 and 507 are equal in size and in shape. Supports 560 and 561 and interconnected and pivot concurrently between their first or lowered positions and their second or raised positions.

Support 560, which can be referred to as a first or left side support of frame 505, is a subassembly of frame 505 and includes inner member 570 and outer member 580. Inner member 570 is fashioned of an elongate steel plate that is bent to form upright part 571 and transverse part 572. Outer member 580 is also fashioned an elongate steel plate that is bent to form transverse part 581 and upright part 582. Upright part 571 has front end 571A and rear end 571B, is juxtaposed with upper extremity 534 along left side 550A of opener 501, and extends upright to transverse part 572 that extends outwardly from left side 550A of opener 501 and sweeps rearwardly to outer end 573 connected to inner end 583 of transverse part 581 with bolt assemblies 590, 591, and 592. Transverse part 581 extends outwardly from inner end 583 connected to outer end 573 of transverse part 572 to upright part 582, which depends downwardly from transverse part 581 to lower end 584. Disk 506 is mounted rotatably to lower end 584 of upright part 582 with hub assembly 585, and is positioned under transverse part 581 between lower end 584 of upright part 582 and left side 550A of opener 501 and the left side of seed boot 504.

Support 561 can be referred to as a second or right side support of frame 505, is another subassembly of frame 505, and is the mirror image of, and is identical in every respect to, support 560. Like support 560, support 561 includes inner member 570' and outer member 580'. Inner member 570' is fashioned an elongate steel plate that is bent to form upright part 571' and transverse part 572'. Outer member 580' is also fashioned of an elongate steel plate that is bent to form transverse part 581' and upright part 582'. Upright part 571' has front end 571A' and rear end 571B, is juxtaposed with upper extremity 534 along right side 550B of opener 501, and extends upright to transverse part 572' that extends outwardly from right side 550B of opener 501 and sweeps rearwardly to outer end 573' connected to inner end 583' of transverse part 581' with bolt assemblies 590', 591', and 592'. Transverse part 581' extends outwardly from inner end 583' connected to outer end 573' of transverse part 572' to upright part 582', which depends downwardly from transverse part 581' to lower end 584'. Disk 507 is mounted rotatably to lower end 584' of upright part 582' with hub assembly 585', and is positioned under transverse part 581' between lower end 584' of upright part 582' and right side 550B of opener 501 and the right side of seed boot 504.

Front ends 571A and 571A' of upright parts 571 and 571' of supports 560 and 561 are mounted pivotally to leading end 535 of plate 520 of opener 501 with pivot bolt assembly 600. The pivotally coupling of front ends 571A and 571A' of supports 560 and 561 to leading end 535 of plate 520 of opener 501 with pivot bolt assembly 600 enables supports 560 and 561 to pivot from their lowered positions in FIG. 48 to their raised positions in FIG. 52. Accordingly, frame 505 is mounted pivotally to leading end 535 of plate 520 of opener 501 with pivot bolt assembly 600. The pivotally coupling of frame 505 to leading end 535 of plate 520 of opener 501 with pivot bolt assembly 600 enables frame 505 to pivot from its lowered position in FIG. 48 to its raised positions in FIG. 52.

Figure 57:
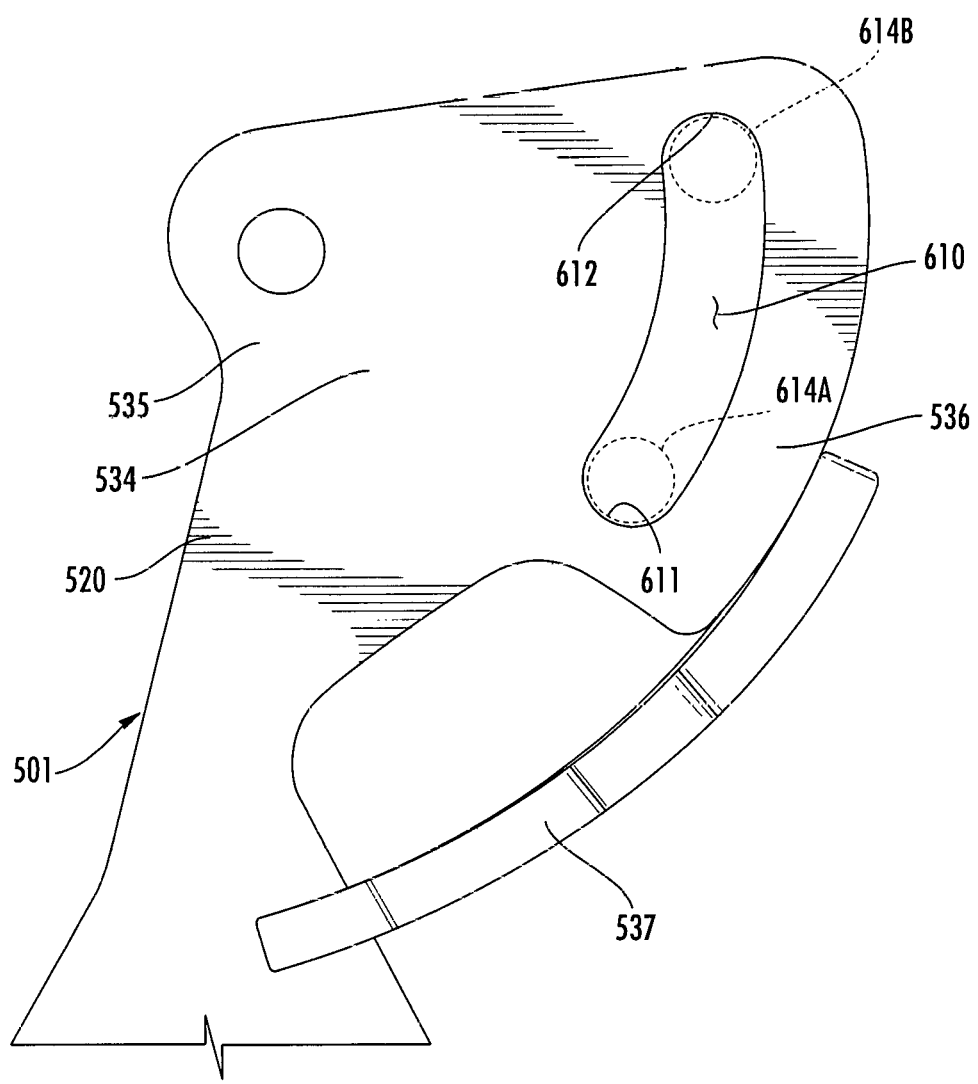
FIG. 57 is an enlarged, fragmentary, side elevation view of the opener corresponding to FIGS. 55 and 56 illustrating dashed line representations of the bolt assembly relative to the elongate, arcuate groove corresponding to the lowered position of the frame in FIG. 55 and the raised position of the frame in FIG. 56.
Figure 58:
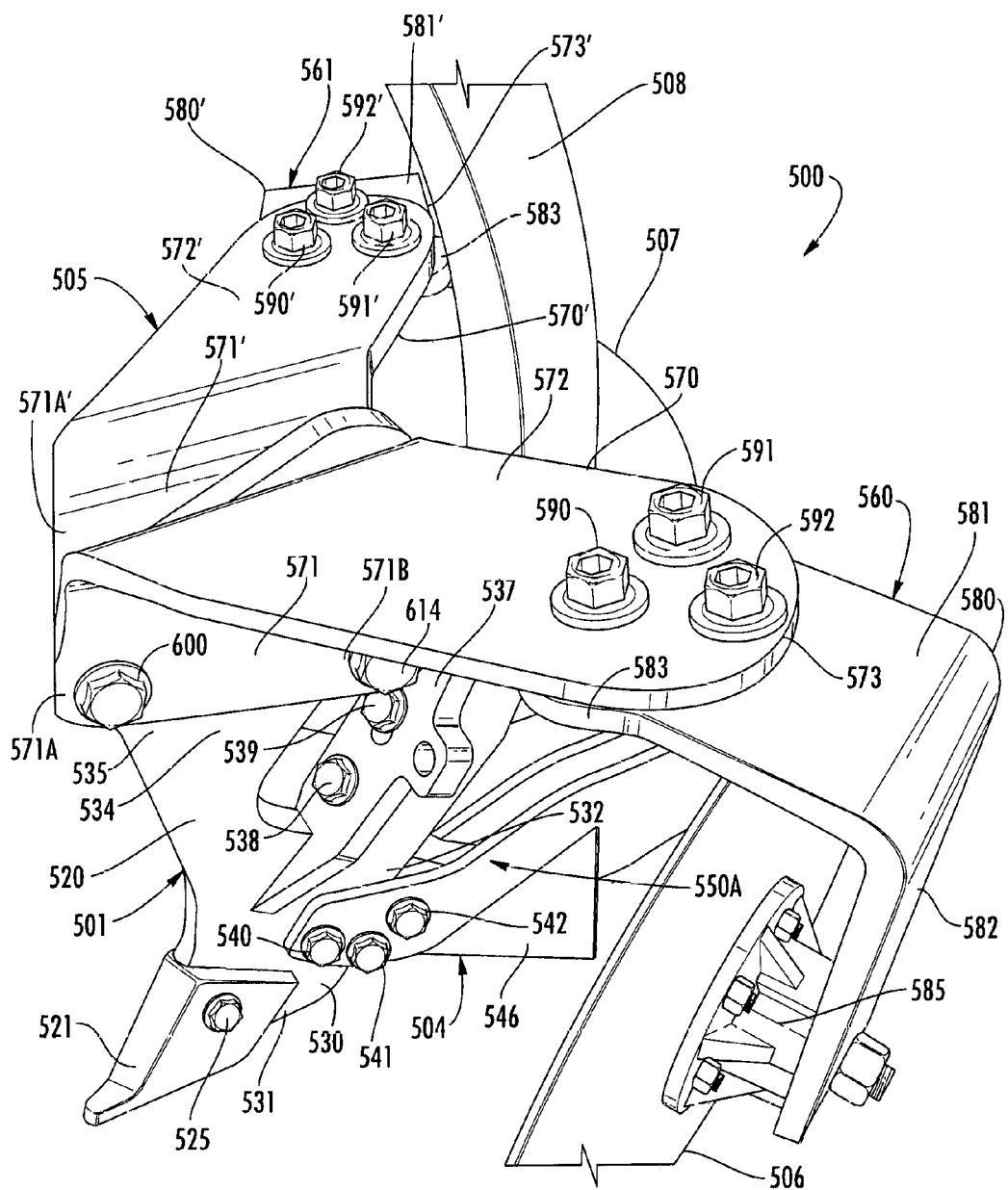
FIG. 58 is an enlarged, fragmentary, top perspective view of the embodiment of FIG. 48 illustrating the left side disk carried by a left side support of the frame, and the right side disk carried by a right side support of the frame.
Figure 59:
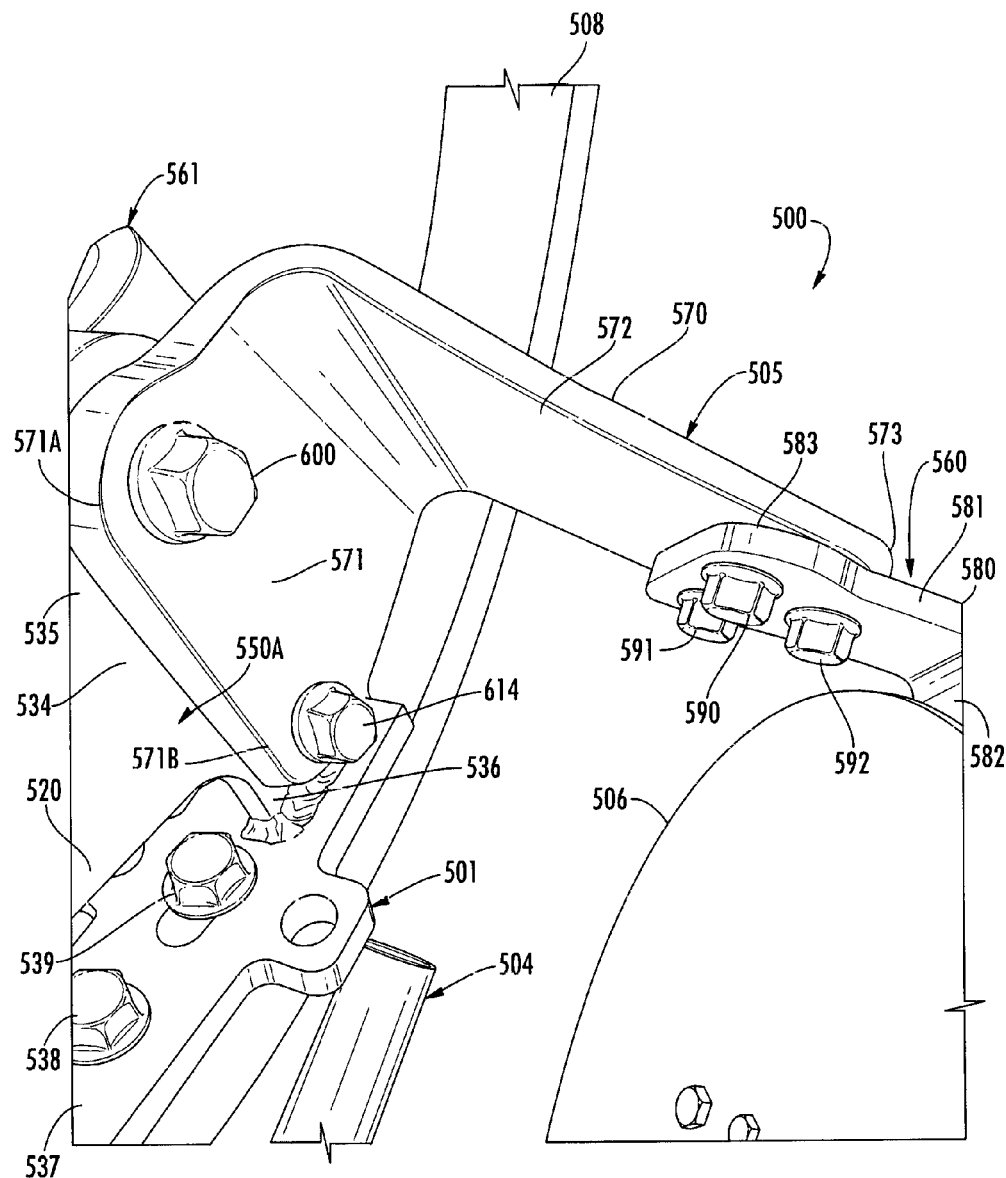
FIG. 59 is an enlarged, fragmentary, bottom perspective view of the left side support corresponding to FIG. 58.
Figure 60:
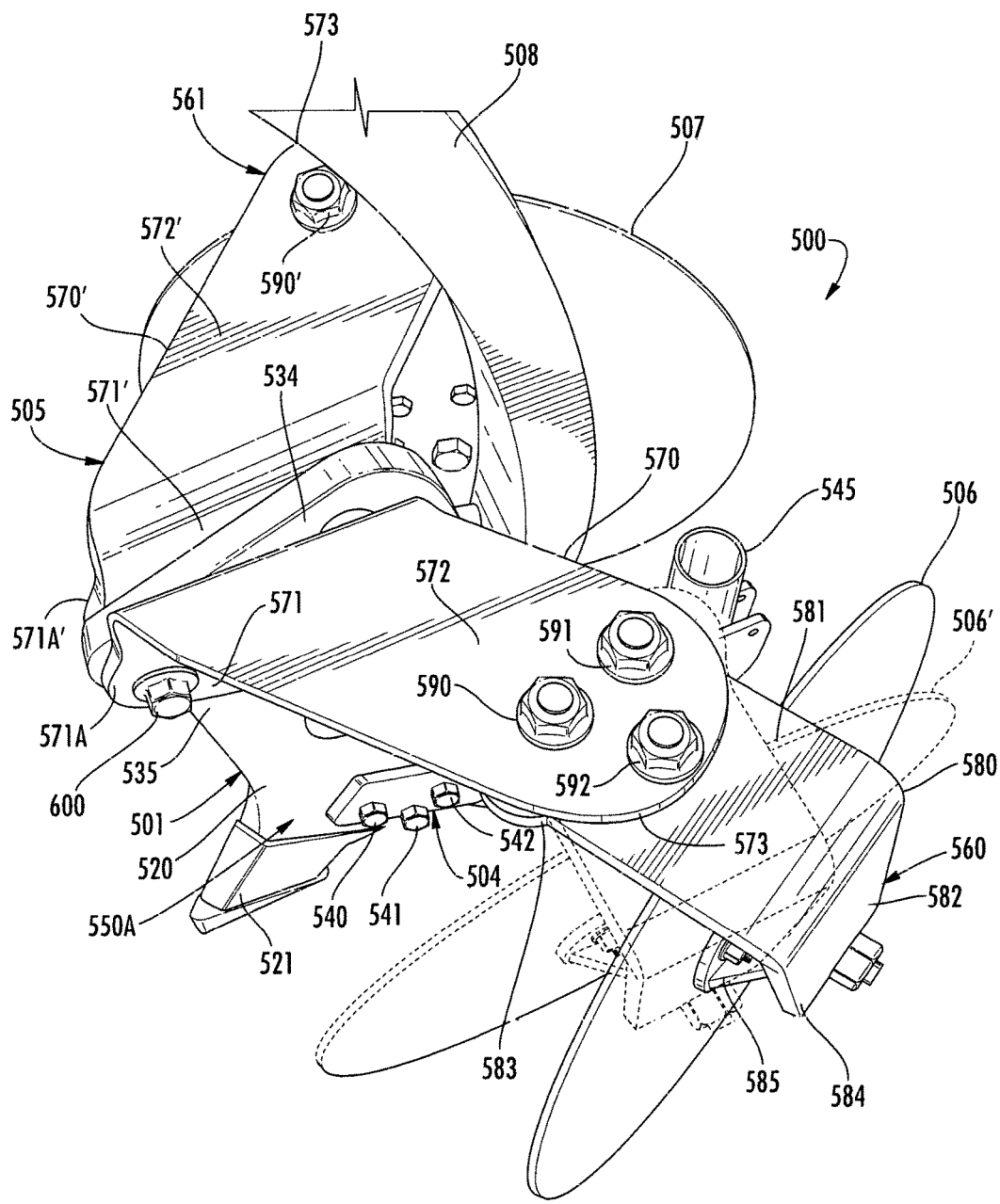
FIG. 60 is a view similar to FIG. 58 illustrating the left and right side disks as they would appear in closing positions, and a dashed line representation of the left side disk as it would appear in an opening position.

In FIG. 57, slot 610 is formed in upper extremity 535 of plate 520 of opener 501 adjacent to trailing end 536 above bracket 537. Slot 610 extends through plate 520 from one side to the other, is elongate and arcuate, and extends from a first or lower end wall 611 upwardly away from bracket 537 to a second or upper end wall 612. Bolt assembly 614 extends through slot 610 and connects rear end 571B of upright part 571 of inner member 570 of support 560 to rear end 571B' of upright part 571' of inner member 570' of support 561 in FIG. 44 opposite to pivot bolt assembly 600. Pivot bolt assembly 600 pivotally connects front ends 571A and 571A' of supports 560 and 561, respectively, to leading end 535 of upper extremity 534 of opener 501, and bolt assembly 614 connects rear ends 571B and 571B' of supports 560 and 561, which enables supports 560 and 561 that form frame 505 to concurrently pivot from their first or lowered positions in FIG. 48 to their second or raised positions in FIG. 52.

Figure 55:
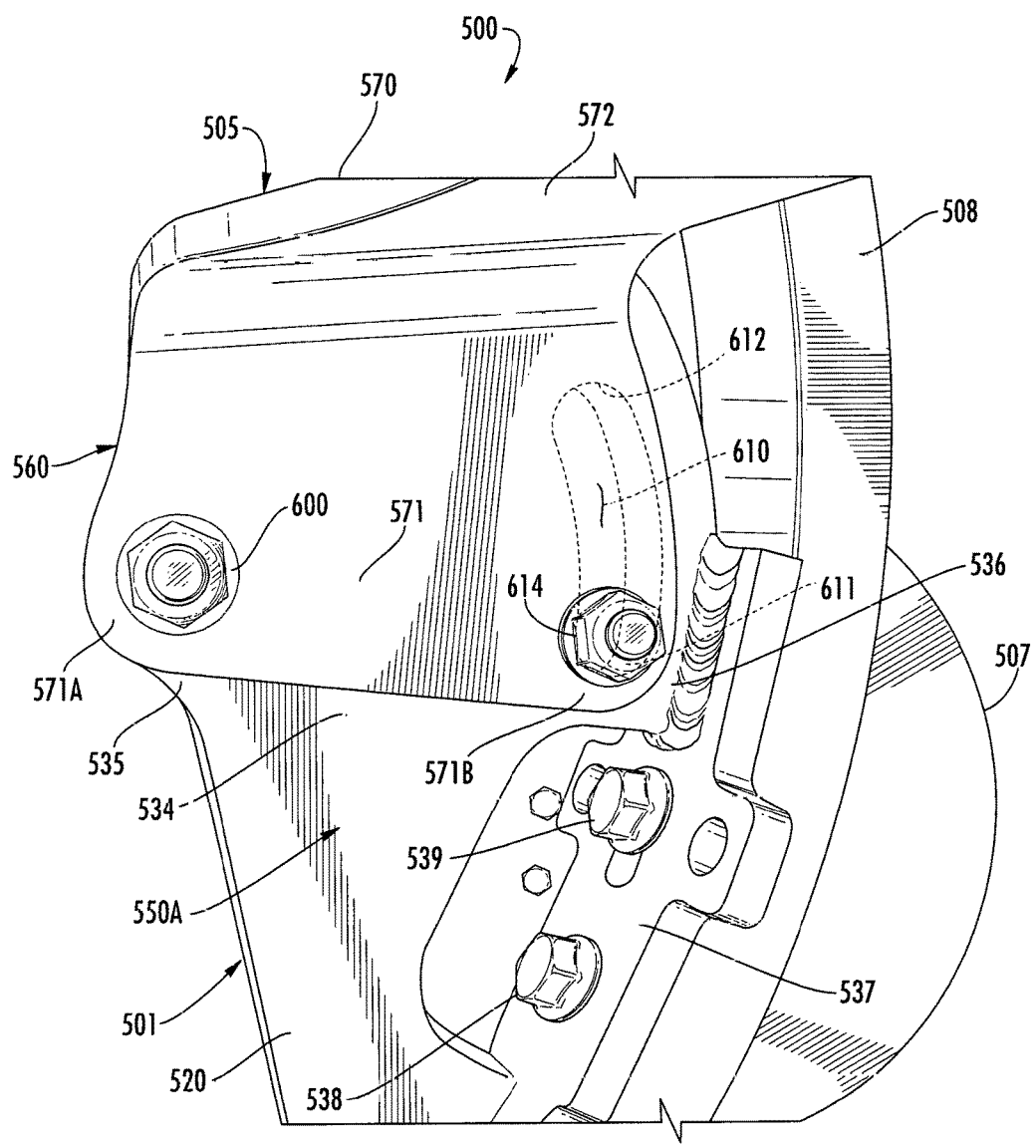
FIG. 55 is an enlarged fragmentary perspective view corresponding to FIG. 48 illustrating a bolt assembly, coupled to the frame, applied to a dashed line illustration of an elongate, arcuate groove, the bolt assembly being shown as it would appear in relation to the elongate, arcuate groove in the lowered position of the frame.
Figure 56:
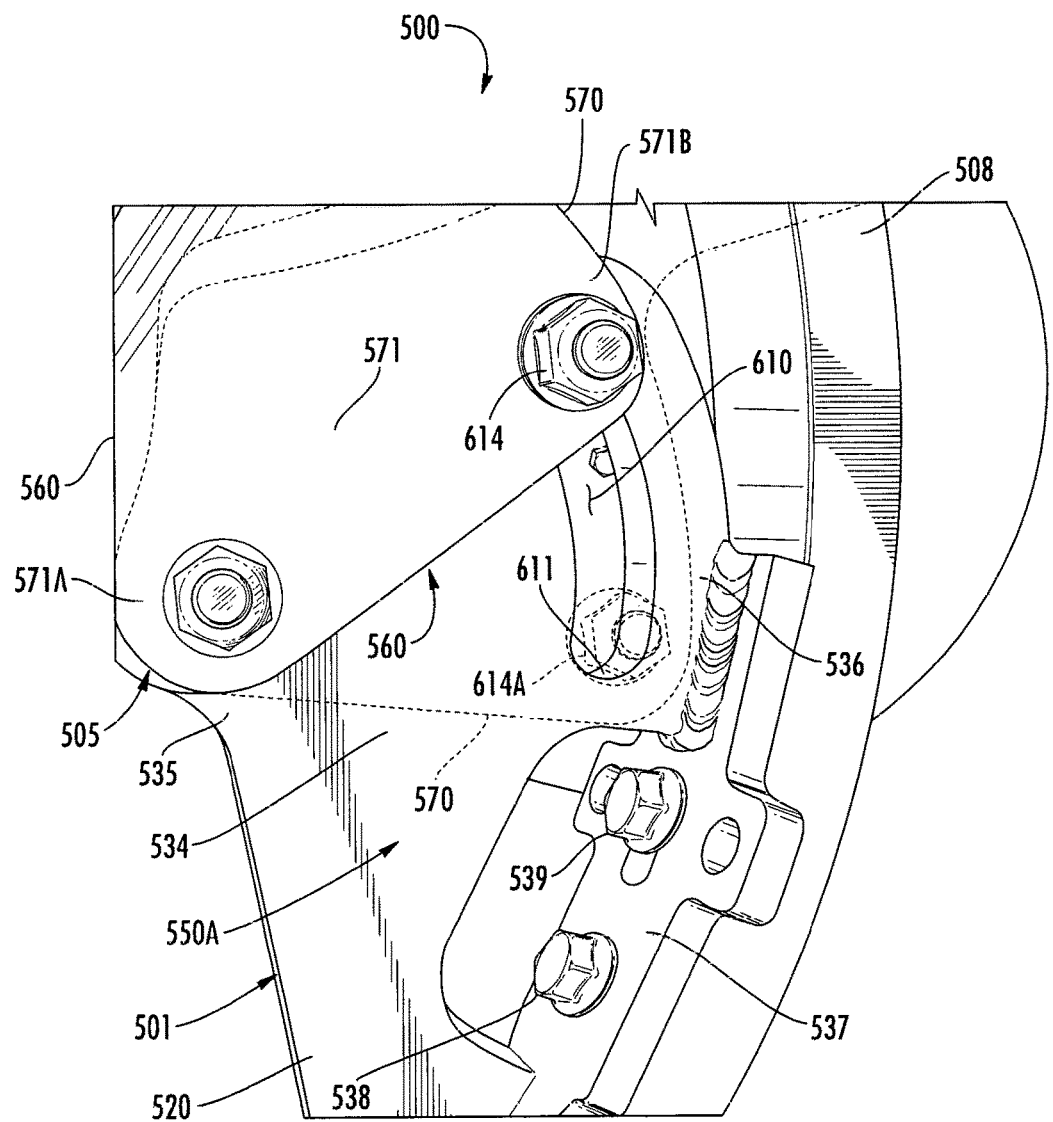
FIG. 56 is a view similar to that of FIG. 55 illustrating the bolt assembly in relation to the dashed line illustration of the elongate, arcuate groove in the raised position of the frame corresponding to FIG. 52.

Bolt assembly 614 travels reciprocally through slot 610 between first and second end walls 611 and 612 when supports 560 and 561, i.e. frame 505, concurrently pivot between their lowered and raised positions. In the lowered position of frame 505, and thus supports 560 and 561, bolt assembly 614 comes into direct contact against first or lower end wall 611 in FIGS. 55 and 57. The dashed line position denoted at 614A in FIG. 57 indicates contact of bolt assembly 614 against first end wall 611. In the raised position of frame 505, and thus supports 560 and 561, bolt assembly 614 comes into direct contact against second or upper end wall 612 as indicated by the dashed line position 614B of bolt assembly 614 in FIG. 57. FIG. 56 illustrates the position of inner member 57 and bolt assembly 614 relative to slot 610 in the second or raised position of support 560, and dashed line positions of inner member 570 and bolt assembly 614 relative to slot 610 in the first or lowered position of support 560.

Supports 560 and 561 are disabled from moving beyond their first or lowered positions disabling disks 506 and 507 from moving beyond their lowered positions when bolt assembly 614 is engaged to first or lower end wall 611 when supports 560 and 561 are in their first or lowered positions. In other words, frame 505 is disabled from moving beyond its first or lowered position disabling disks 506 and 507 from moving beyond their lowered positions when bolt assembly 614 is engaged to first or lower end wall 611 when frame 505 is in its first or lowered position. Supports 560 and 561 are disabled from moving beyond their second or raised positions disabling disks 506 and 507 from moving beyond their raised positions when bolt assembly 614 is engaged to second or upper end wall 612 when supports 560 and 561 are in their second or raised positions. In other words, frame 505 is disabled from moving beyond its second or raised position disabling disks 506 and 507 from moving beyond their raised positions when bolt assembly 614 is engaged to second or upper end wall 612 when frame 505 is in its second or raised position. Accordingly, the interaction of bolt assembly 614 with first and second end walls 611 and 612 of slot 610 limits the pivotal travel of frame 505, and thus supports 560 and 561, thereby limiting travel of disks 506 and 507 between their lowered and raised positions.

Bolt assembly 614 can be considered to be an element carried by supports 560 and 561, first end wall 611 can be considered to be a first complemental element carried by opener 501, and second end wall 612 can be considered to be a second complemental element carried by opener 501. In this respect, element 614 extends from support 560 and through slot 610 in opener 501 to support 561, and element 614 travels through slot 610 between the first engagement element 611 and the second engagement element 612 when supports 560 and 561 pivot between their first or lowered positions and their second or raised positions. In other words, element 614 extends from support 560 and through slot 610 in opener 501 to support 561, and element 614 travels through slot 610 between the first engagement element 611 and the second engagement element 612 when frame 505 pivots between its first or lowered position and its second or raised position. Continuing with this line of discussion, supports 560 and 561 are disabled from moving beyond their first or lowered positions disabling disks 506 and 507 from moving beyond their lowered positions when the element 164 is engaged to the first complemental element 611 when supports 560 and 561 are in their first or lowered positions. In other words, frame 505 is disabled from moving beyond its first or lowered position disabling disks 506 and 507 from moving beyond their lowered positions when the element 614 is engaged to the first complemental engagement 611 element when frame 505 is in its first or lowered position. Supports 560 and 561 are disabled from moving beyond their second or raised positions disabling disks 506 and 507 from moving beyond their raised positions when the element 614 is engaged to the second complemental engagement element 612 when supports 560 and 561 are in their second or raised positions. In other words, frame 505 is disabled from moving beyond its second or raised position disabling disks 506 and 507 from moving beyond their raised positions when the element 614 is engaged to the second complemental engagement element 612 when frame 505 is in its second or raised position. Accordingly, the interaction of the element 614 with first and second complemental engagement elements 611 and 612 limits the pivotal travel of frame 505, and thus supports 560 and 561, thereby limiting travel of disks 506 and 507 between their lowered and raised positions.

Looking back to FIGS. 43-47, implement 500 is shown assembled and in use in a ground-engaging position for sowing a crop. In use, implement 500 is suspended from shank 508 connected to plow frame 509 in FIGS. 43, 45, and 46 in a ground engaging position and is pulled by a tractor for pulling opener 501 forwardly at a preselected depth through the surface of the ground for cutting furrow 502 in the ground. Seeds are conventionally conveyed by an air stream from a seed hopper into seed boot 504 through upright conduit 545, and the seeds are ejected outwardly in furrow 502 from seed boot 504 through shoots 546. As implement 500 is pulled through the ground, opener 501 continually cuts furrow 502 and the seed is continually deposited in furrow 502 from seed boot 504. Opener 501 cuts furrow 501 when implement 500 is pulled by a tractor when implement 500 is in the ground engaging position, and air-driven seeds are applied into seed boot 504 through upright conduit 545 and are ejected into furrow 502 through the shoots 546 (see FIG. 50). Disks 506 and 507 continually engage the ground on left and right sides 550A and 550B of opener 501 and seed boot 504 and in their closing positions distribute loosened soil over seeds deposited in furrow 502 by seed boot 504. Opener 501 is set to a preselected depth in the ground to cut furrow 502 at the preselected depth for application of seeds into the furrow from seed boot 504. The pivotal coupling of frame 505 to opener 501 enables disks 506 and 507 to displace upwardly and downwardly as they run over the ground, which enables disks 506 and 507 to maintain contact with the ground which, in turn, enables disks 506 and 507 to continually distribute loosened soil over the seeds deposited into furrow 502 when disks 506 and 507 are in their closing positions.

In their closing or "toe out" positions as seen in FIG. 51, the front of disks 506 and 507 point outwardly away from the centerline 620 of implement 500 enabling the inner surfaces 506A and 507A of disks 506 and 507 to face the direction of travel of implement 500 and deflect loosened soil inwardly toward furrow 502. Frame 505 and disks 506 and 507 are, and function as, a "closer" mounted to opener 501 for distributing loosened soil over seeds deposited in the furrow 502 by seed boot 504, when disks 506 and 507 are in their closing or "toe out" positions.

According to the principle of the invention, disks 506 and 507 are adjustable from their closing or "toe out" positions as seen in FIG. 51 to opening/spreading or "toe in" positions. In the opening or "toe in" positions, the front of disks 506 and 507 point inwardly toward the centerline 620 of implement 500 enabling the outer surfaces of disks 506 and 507 to face the direction of travel of implement 500 to deflect/distribute loosened soil away from furrow 502, which is useful for assisting in the subsequent application of fertilizers. Disks 506 and 507 are adjustable between their closing and opening positions via adjustment of outer members 580 and 580' relative to inner members 570 and 570', respectively. Frame 505 and disks 506 and 507 are, and function as, a "spreader" mounted to opener 501 for distributing, i.e. spreading, loosened soil away from furrow 502, when disks 506 and 507 are in their opening or "toe in" positions.

Figure 62:
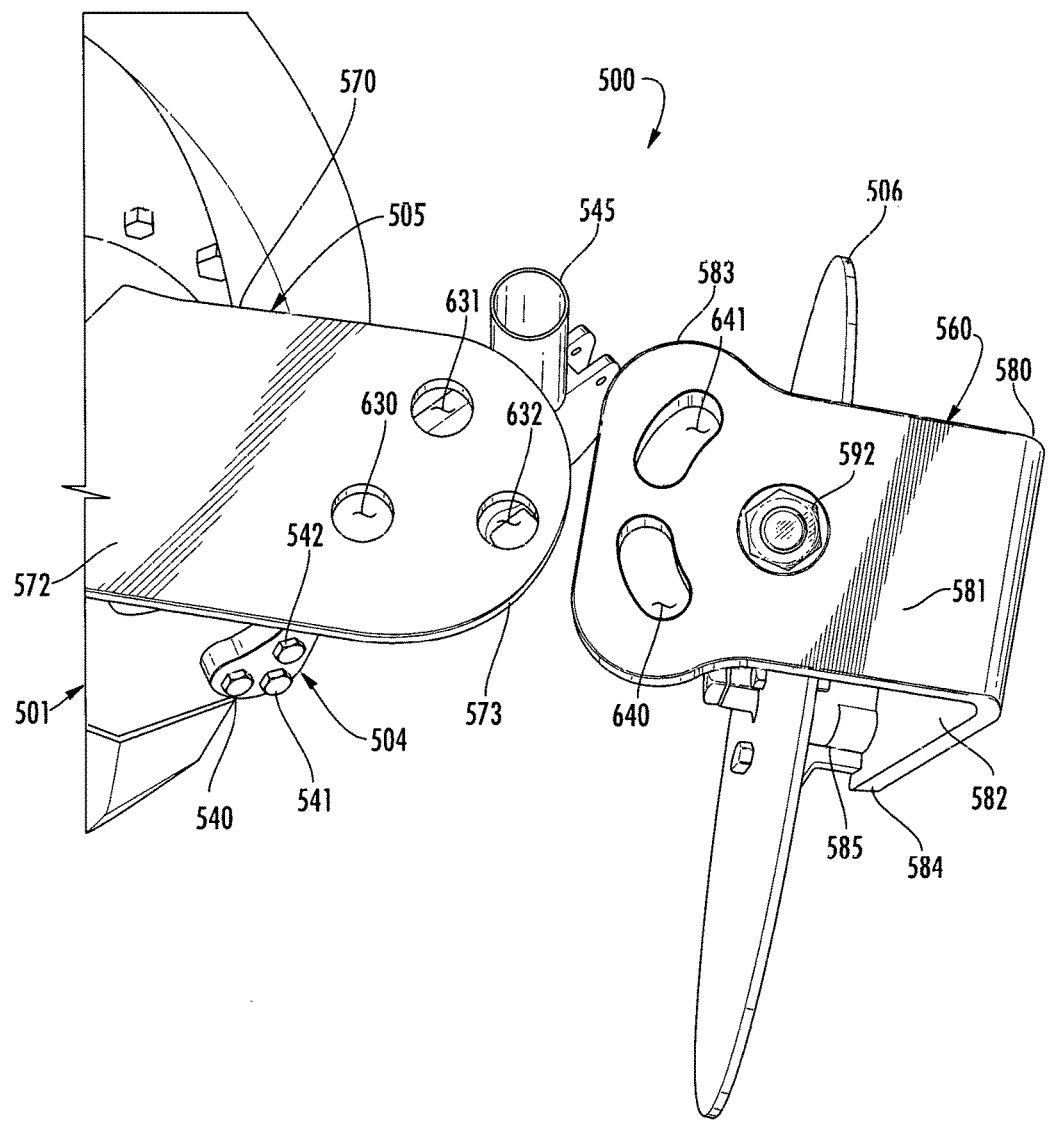
FIG. 62 is an enlarged, fragmentary view corresponding to FIG. 58 illustrating an outer end of an inner member of the left side support detached from an inner end of outer member of the left side sub assembly, and the left side disk carried by the outer member of the left side support.
Figure 63:
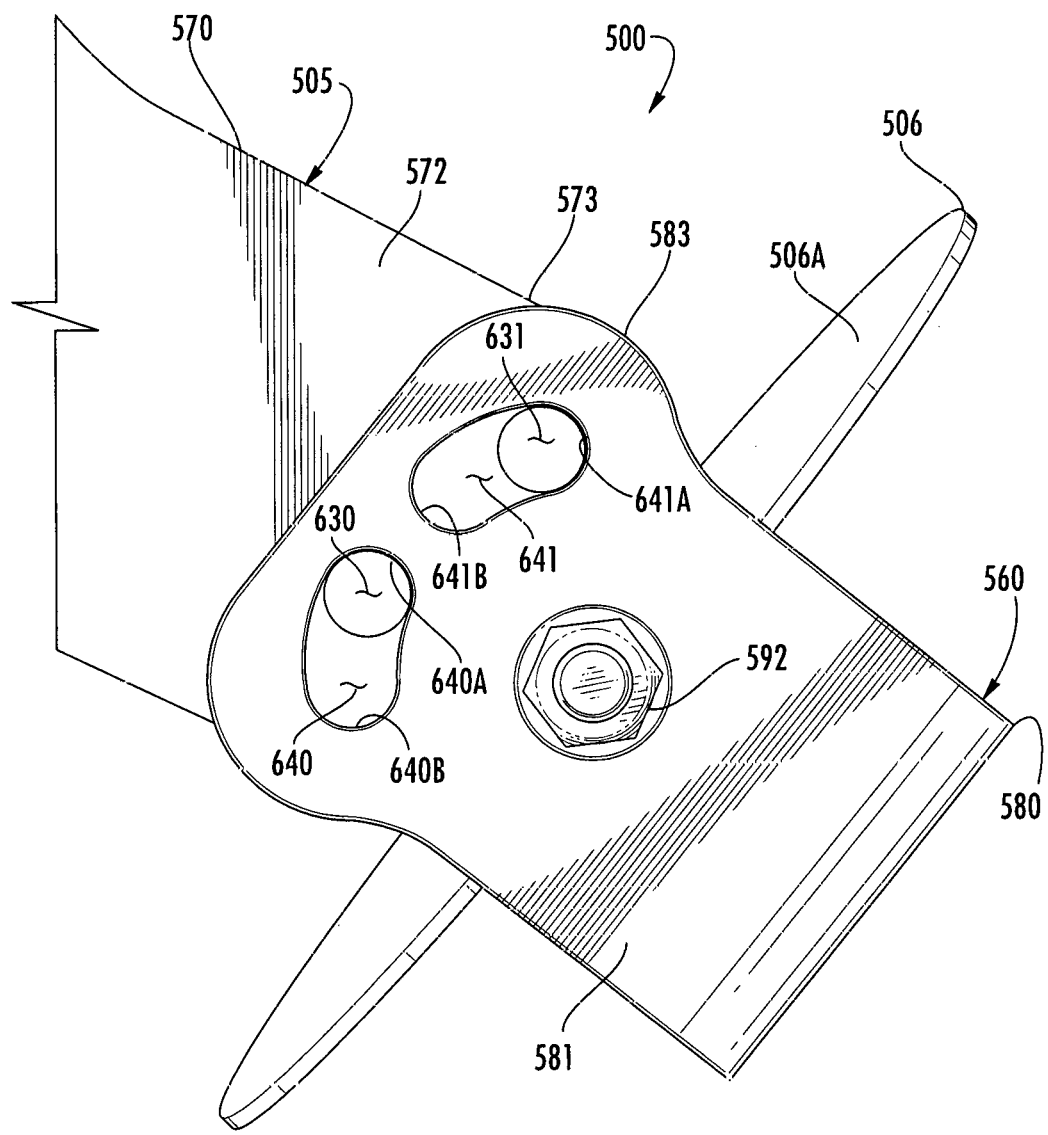
FIG. 63 is a fragmentary, top plan view of the left side support corresponding to FIG. 62 illustrating the relationship between the outer end of the inner member and the inner end of the outer member in the closing position of the left side disk.
Figure 64:
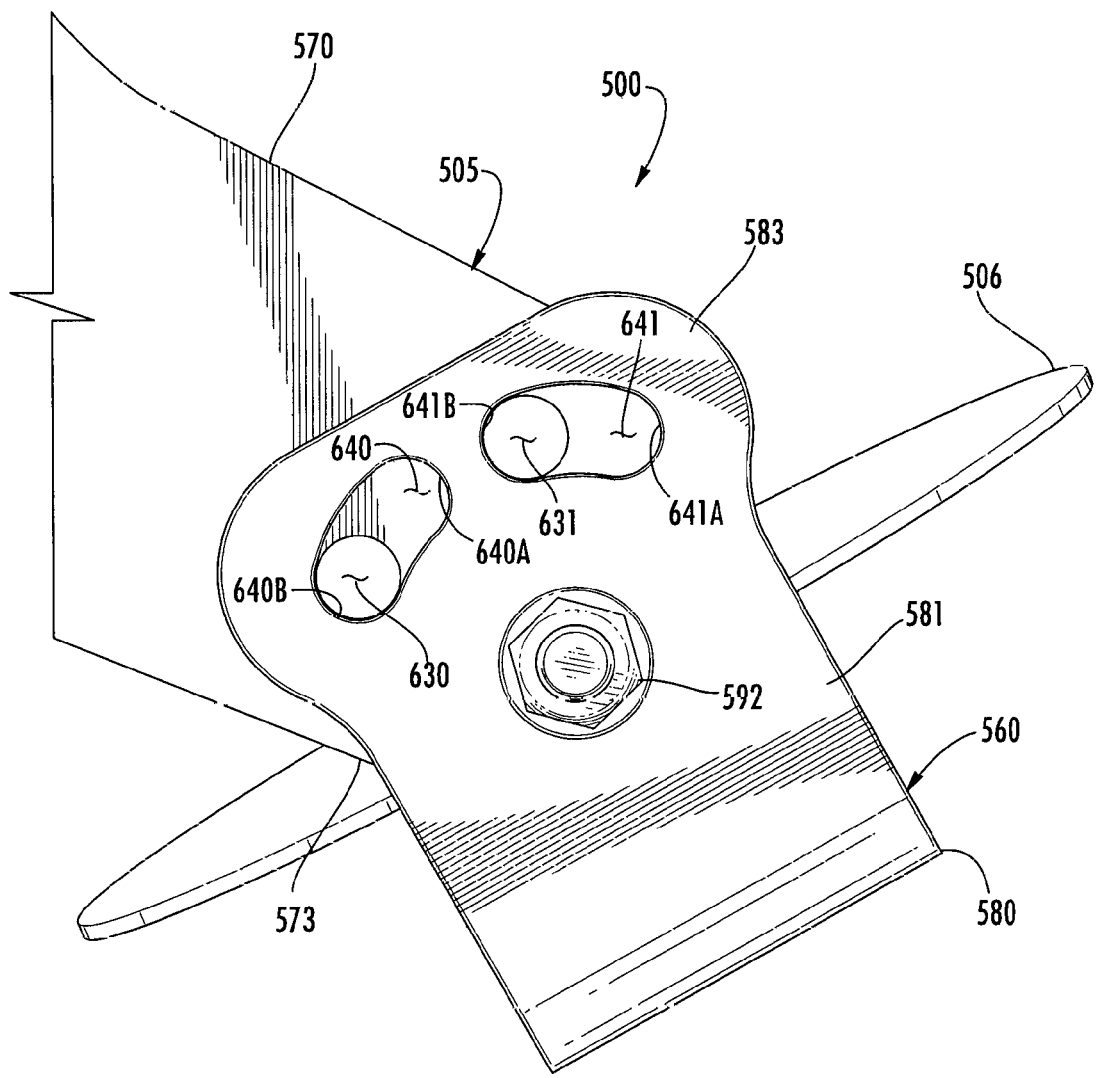
FIG. 64 is a fragmentary, top plan view of the left side support corresponding to FIG. 62 illustrating the relationship between the outer end of the inner member and the inner end of the outer member in an opening position of the left side disk.
Figure 65:
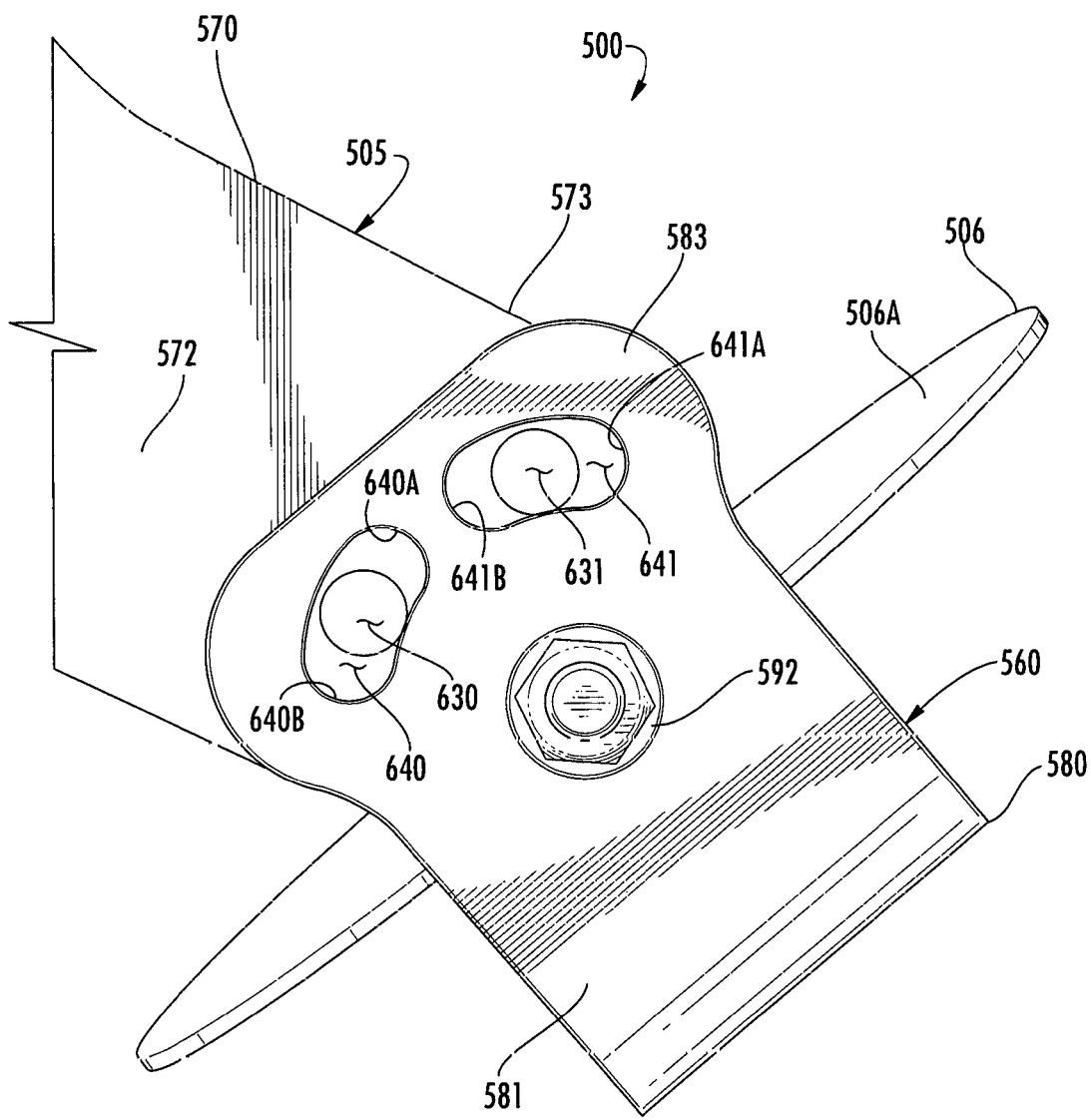
FIG. 65 is a fragmentary, top plan view of the left side support corresponding illustrating the relationship between the outer end of the inner member and the inner end of the outer member at an intermediate position of the left side disk between the closing position of the left side disk in FIG. 63 and the opening position of the left side disk in FIG. 64.

In FIG. 62, three holes 630, 631, and 632 are formed in outer end 573 of transverse part 572 of inner member 570 of support 560. Bolt assembly 592 carried by inner end 583 is applied to hole 632, which aligns holes 630 and 631 with elongated holes 640 and 641 in inner end 583 of transverse part 581 of outer member 580 as seen in FIG. 62. Hole 632 defines the pivot point of outer member 580 to inner member 570, and elongated holes 640 and 641 describe an arc of a circle. Elongate hole 640, which is a forward elongate hole, has rearward end wall 640A and forward end wall 640B, and elongate hole 641, which is a rearward elongate hole, has rearward end wall 641A and forward end wall 641B. Outer member 580 is enabled to pivot about bolt assembly 592 relative to outer end 573 of transverse part 582 of inner member 570 between a first or closing position in FIG. 63, a second or opening position in FIG. 64, and at any position therebetween, such as an intermediate position between the first or closing position in FIG. 63 and the second or opening position in FIG. 64, when bolt assembly 592 is loosened. Holes 630 and 631 are registered with rearward end walls 640A and 641A, respectively, when outer member 580 is in its first or closing position in FIG. 63. Holes 630 and 631 are registered with forward end walls 640A and 641A, respectively, when outer member 580 is in its second or opening position in FIG. 64. Hole 630 is between rearward end wall 640A and forward end wall 640B and hole 631 is between rearward end wall 641A and forward end wall 641B, when outer member 580 is between its first or closing position and it second or opening position in FIG. 65. Disk 506 is in its closing position when holes 630 and 631 are registered with rearward end walls 640A and 641A, respectively, when outer member 580 is in its first or closing position in FIG. 63. Disk 506 is in its opening position when holes 630 and 631 are registered with forward end walls 640A and 641A, respectively, when outer member 580 is in its second or opening position in FIG. 64. Disk 506 is between its closing position and its open position when hole 630 is between rearward end wall 640A and forward end wall 640B and hole 631 is between rearward end wall 641A and forward end wall 641B, when outer member 580 is between its first or closing position and it second or opening position in FIG. 65. After setting outer member 580 to a selected position, bolt assembly 592 can be tightened, bolt assembly 590 can be applied to holes 630 and 640 and tightened, and bolt assembly 591 can be applied to hoes 631 and 641 and tightened.

In order to pivotally adjust outer member 580 to adjust disk 580 to its closing position, its opening position, or to any position therebetween, bolt assemblies 590, 591, and 592 can simply be loosened to enable pivotal adjustment of outer member 580 and then re-tightened to set outer member 580 in place. Outer member 580 is disabled from moving beyond its closing position disabling disk 506 from moving beyond its closing position when bolt assemblies 590 and 591 encounter rearward end walls 640A and 641A, respectively. Outer member 580 is disabled from moving beyond its opening position disabling disk 506 from moving beyond its opening position when bolt assemblies 590 and 591 encounter forward end walls 640B and 641B, respectively.

Disk 507 of support 561 is adjusted between its closing and opening positions identically to that of disk 506 of support 560, and the foregoing discussion of the adjustment of disk 506 of support 560 between its closing and opening positions applies in every respect to disk 507 of support 561. As a matter of illustration and reference, FIG. 51 illustrates dashed outline positions of outer member 580 and disk 506 of support 560 and outer member 580' and disk 507 as they would appear in their opening positions. In the opening or "toe in" positions, the front of disks 506 and 507 point inwardly toward the centerline 620 of implement 500 enabling the outer surfaces 506B and 507B of disks 506 and 507 to distribute loosened soil away furrow 502, which is useful for assisting in the subsequent application of fertilizers.

Figure 61:
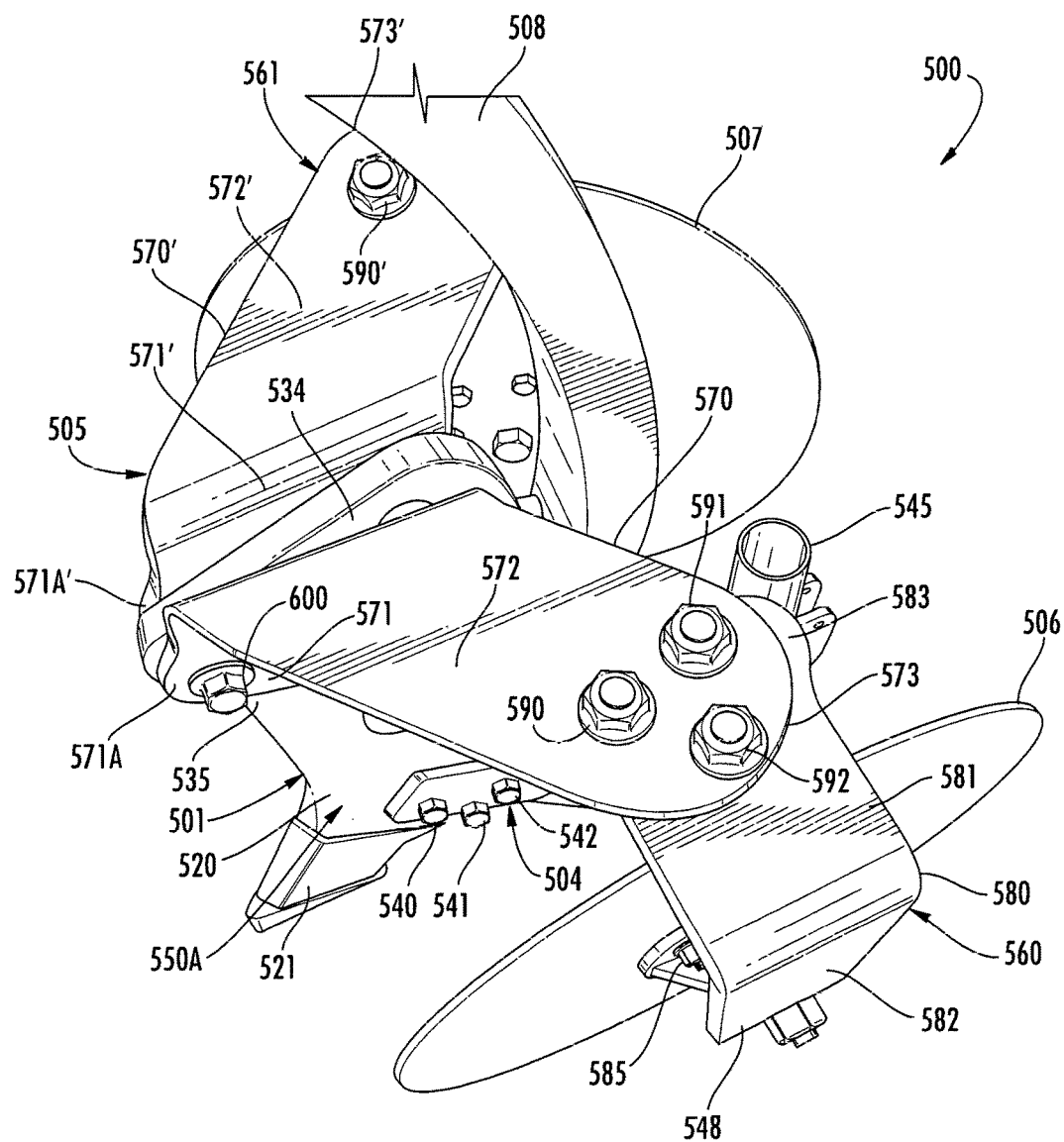
FIG. 61 is a view corresponding to FIG. 60 illustrating the left side disk in the opening position.
Figure 66:
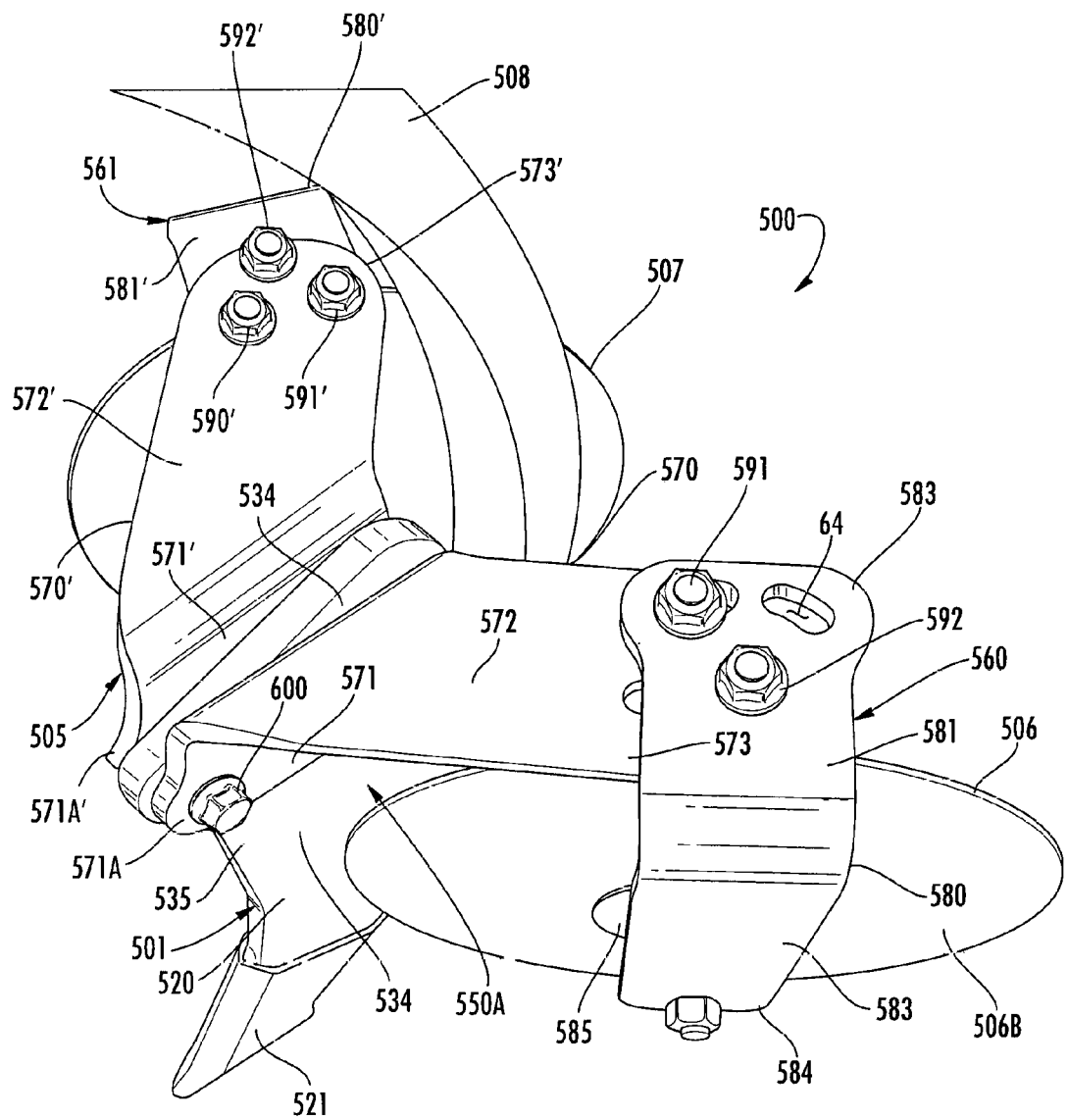
FIG. 66 is a view similar to FIG. 61 illustrating the left side disk in an extreme opening position.

FIG. 66 is a view similar to FIG. 61 illustrating disk 506 in an extreme opening position. In FIG. 66, outer member 580 is pivoted to an extreme opening position to align elongate hole 640 with hole 631 (not shown), and is secured in place with tightened bolt assemblies 591 and 592. In this extreme opening position of outer member 580, disk 506 is in an extreme opening or "toe in" position, whereby the front of disk 506 points inwardly toward the centerline 620 of implement 500 at a steeper angle compared to the dashed outline opening position of disk 506 in FIG. 51, which enables outer surface 506B of disk 506 to aggressively distribute loosened soil away furrow 502, which, again, is useful for assisting in the subsequent application of fertilizers. Outer member 580' and disk 507 of support 561 can be identically adjusted.

In sum, agricultural seeder implement 500 includes opener 501 for cutting furrow 502, seed boot 504, mounted to opener 501, for depositing seeds in furrow 502, and closer 505,506,507, mounted to opener 505, for distributing loosened soil over seeds deposited in furrow 502 by seed boot 504. Closer 505,506,507 includes frame 505 mounted to opener 501, and a pair of closing disks 506,507, mounted to frame 505, for distributing loosened soil over seeds deposited in furrow 502 by seed boot 504. Frame 505 is mounted pivotally to opener 501 for movement between a first or lowered position and a second or raised position. The pair of closing disks 506,507 is in a lowered position, when frame 505 is in the first position. The pair of closing disks 506,507 is in a raised position, when frame 505 is in the second position. An element 614 is carried by frame 505, and a first complemental element 611 and a second complemental element 612 are carried by opener 501. Frame 505 is disabled from moving beyond the first position disabling the pair of closing disks 506,507 from moving beyond the lowered position, when the element 614 is engaged to the first complemental element 611 when the frame is in the first position. Frame 505 is disabled from moving beyond the second position disabling the pair of closing disks 506,507 from moving beyond the raised position, when the element 614 is engaged to the second complemental element 612 when frame 505 is in the second position.

In another aspect, agricultural seeder implement 500 includes opener 501 for cutting furrow 502, seed boot 504, mounted to opener 501, for depositing seeds in furrow 502, frame 505 mounted to opener 501, and first disk 506 and second disk 507 each mounted to frame 505. First disk 506 and second disk 507 are each adjustable between a closing position and an opening position. First disk 506 and second disk 507 are for distributing loosened soil over seeds deposited in furrow 502 by seed boot 504, when first disk 506 and second disk 507 are each in the closing position. First disk 506 and second disk 507 are for distributing loosened soil away from furrow 502, when first disk 506 and second disk 507 are each in the opening position. Frame 505 is mounted pivotally to opener 501 for movement between a first or lowered position and a second or raised position. First disk 506 and second disk 507 are each in a lowered position, when frame 505 is in the first position. First disk 506 and second disk 507 are each in a raised position, when frame 505 is in the second position. Element 614 is carried by frame 505, and first complemental element 611 and second complemental element 612 are carried by opener 501. Frame 505 is disabled from moving beyond the first position disabling the pair of closing disks 506,507 from moving beyond the lowered position, when element 614 is engaged to first complemental element 611 when frame 505 is in the first position. Frame 505 is disabled from moving beyond the second position disabling the pair of closing disks 506,507 from moving beyond the raised position, when element 614 is engaged to second complemental element 612 when frame 505 is in the second position.

In yet another aspect, agricultural seeder implement 500 includes opener 501 for cutting furrow 502, seed boot 504, mounted to opener 501, for depositing seeds in furrow 502, first support 560 and second support 561 mounted to opener 501, first support 560 is adjacent to first side 550A of opener 501, second support 561 is adjacent to second side 550B of opener 501, first closing disk 506 mounted to first support 560 adjacent to first side 550A of opener 501, second closing disk 507 mounted to second support 561 adjacent to second side 550B of opener 501, and first closing disk 506 and second closing disk 507 are for distributing loosened soil over seeds deposited in furrow 502 by seed boot 504. First support 560 and second support 560 are each mounted pivotally to opener 501 for movement between a first or lowered position and a second or raised position. First closing disk 506 and second closing disk 507 are each in a lowered position, when first support 560 and second support 561 are each in the first position. First closing disk 506 and second closing disk 507 are each in a raised position, when first support 560 and second support 561 are each in the second position. Element 614 is carried by first support 560 and second support 561, and first complemental element 611 and second complemental element 612 are carried by opener 501. First support 560 and second support 561 are disabled from moving beyond the first positions thereof disabling first disk 506 and second disk 507 from moving beyond the lowered positions thereof, when element 614 is engaged to first complemental element 611 when first support 560 and second support 561 are in the first positions thereof. First support 560 and second support 561 are disabled from moving beyond the second positions thereof disabling first disk 506 and second disk 507 from moving beyond the raised positions thereof, when element 614 is engaged to second complemental element 612 when first support 560 and second support 561 are in the second positions thereof. Element 614 extends from first support 560 and through slot 610 in opener 501 to second support 561. Slot 610 is elongate and extends from first end wall 611 to second end wall 612. Element 614 travels through slot 610 between first end wall 611 and second end wall 612 when first support 560 and second support 561 pivot between the first and second positions thereof. First end wall 611 is first complemental element 611, and second end wall 612 is second complemental element 612. Element is a bolt assembly 614 connecting first support 560 to second support 561.

In still a further aspect, agricultural seeder implement 500 includes opener 501 for cutting furrow 502, seed boot 5004, mounted to opener 501, for depositing seeds in furrow 502, first support 560 and second support 561 mounted to opener 501, first support 560 is adjacent to first side 550A of opener 501, second support 561 is adjacent to second side 550B of opener 501, first disk 506 mounted to first support 560 adjacent to first side 550A of opener 501, and second disk 507 mounted to second support 561 adjacent to second side 550B of opener 501. First disk 506 and second disk 561 are each adjustable between a closing position and an opening position. First disk 506 and second disk 507 are for distributing loosened soil over seeds deposited in furrow 502 by seed boot 504, when first disk 506 and second disk 507 are each in the closing position. First disk 506 and second disk 507 are for distributing loosened soil away from furrow 502, when first disk 506 and second disk 507 are each in the opening position. First support 560 and second support 561 are each mounted pivotally to opener 501 for movement between a first position and a second position. First disk 560 and second disk 561 are each in a lowered position, when first support 560 and second support 561 are each in the first position. First disk 506 and second disk 507 are each in a raised position, when first support 560 and second support 561 are each in the second position. Element 614 is carried by first support 560 and second support 561, and first complemental element 611 and second complemental element 612 are carried by opener 501. First support 560 and second support 561 are disabled from moving beyond the first positions thereof disabling first disk 506 and second disk 507 from moving beyond the lowered positions thereof, when element 614 is engaged to first complemental element 611 when first support 560 and second support 561 are in the first positions thereof. First support 560 and second support 561 are disabled from moving beyond the second positions thereof disabling first disk 506 and second disk 507 from moving beyond the raised positions thereof, when element 614 is engaged to second complemental element 612 when first support 560 and second support 561 are in the second positions thereof. Element 614 extends from first support 560 and through slot 610 in opener 501 to second support 561. Slot 610 is elongate and extends from first end wall 611 to second end wall 612. Element 614 travels through slot 610 between first end wall 611 and second end wall 612 when first support 560 and second support 561 pivot between the first and second positions thereof. First end wall 611 first complemental element 611, and second end wall 612 is second complemental element 612. Element 614 is bolt assembly 614 connecting first support 560 to second support 561.

The above discussion is limited to the operation of one implement 500. Those having regard for the art will readily appreciate that a plow frame can incorporate ten, twenty, thirty, forty, or perhaps fifty or more such concurrently operating implements 500 in the sowing of a crop. Moreover, any combination of opener and seed boot disclosed herein can be used with frame 505 and disks 506 and 507 in alternate embodiments.

The various embodiments of the present invention are presented herein for illustrative purposes. Those skilled in the art will recognize that changes and modifications can be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:
1. An agricultural seeder implement, comprising:
   an opener for cutting a furrow;
   a seed boot, mounted to the opener, for depositing seeds in the furrow;
   a frame mounted to the opener;
   a first disk and a second disk each mounted to the frame;
   the first disk and the second disk are each adjustable between a closing position and an opening position;
   the first disk and the second disk for distributing loosened soil over seeds deposited in the furrow by the seed boot, when the first disk and the second disk are each in the closing position; and
   the first disk and the second disk for distributing loosened soil away from the furrow, when the first disk and the second disk are each in the opening position.
2. The agricultural seeder implement according to claim 1, wherein:
   the frame is mounted pivotally to the opener for movement between a first position and a second position;
   the first disk and the second disk are each in a lowered position, when the frame is in the first position; and
   the first disk and the second disk are each in a raised position, when the frame is in the second position.
3. The agricultural seeder implement according to claim 2, further comprising:
   an element carried by the frame;
   a first complemental element and a second complemental element carried by the opener;
   the frame is disabled from moving beyond the first position disabling the pair of closing disks from moving beyond the lowered position, when the element is engaged to the first complemental element when the frame is in the first position; and
   the frame is disabled from moving beyond the second position disabling the pair of closing disks from moving beyond the raised position, when the element is engaged to the second complemental element when the frame is in the second position.

4. An agricultural seeder implement, comprising:
an opener for cutting a furrow;
a seed boot, mounted to the opener, for depositing seeds in the furrow;
a first support and a second support mounted to the opener;
the first support is adjacent to a first side of the opener;
the second support is adjacent to a second side of the opener;
a first closing disk mounted to the first support adjacent to the first side of the opener;
a second closing disk mounted to the second support adjacent to the second side of the opener;
the first closing disk and the second closing disk are for distributing loosened soil over seeds deposited in the furrow by the seed boot;
the first support and the second support are each mounted pivotally to the opener for movement between a first position and a second position;
the first closing disk and the second closing disk are each in a lowered position, when the first support and the second support are each in the first position;
the first closing disk and the second closing disk are each in a raised position, when the first support and the second support are each in the second position;
an element carried by the first support and the second support;
a first complemental element and a second complemental element carried by the opener;
the first support and the second support are disabled from moving beyond the first positions thereof disabling the first disk and the second disk from moving beyond the lowered positions thereof, when the element is engaged to the first complemental element when the first support and the second support are in the first positions thereof;
the first support and the second support are disabled from moving beyond the second positions thereof disabling the first disk and the second disk from moving beyond the raised positions thereof, when the element is engaged to the second complemental element when the first support and the second support are in the second positions thereof;
the element extends from the first support and through a slot in the opener to the second support;
the slot is elongate and extends from a first end wall to a second end wall;
the element travels through the slot between the first end wall and the second end wall when the first support and the second support pivot between the first and second positions thereof;
the first end wall comprises the first complemental element; and
the second end wall comprises the second complemental element.

5. The agricultural seeder implement according to claim 4, wherein the element is a bolt assembly connecting the first support to the second support.

6. An agricultural seeder implement, comprising:
an opener for cutting a furrow;
a seed boot, mounted to the opener, for depositing seeds in the furrow;
a first support and a second support mounted to the opener;
the first support is adjacent to a first side of the opener;
the second support is adjacent to a second side of the opener;
a first disk mounted to the first support;
a second disk mounted to the second support;
the first disk and the second disk are each adjustable between a closing position and an opening position;
the first disk and the second disk for distributing loosened soil over seeds deposited in the furrow by the seed boot, when the first disk and the second disk are each in the closing position; and
the first disk and the second disk for distributing loosened soil away from the furrow, when the first disk and the second disk are each in the opening position.

7. The agricultural seeder implement according to claim 6, wherein:
the first support and the second support are each mounted pivotally to the opener for movement between a first position and a second position;
the first disk and the second disk are each in a lowered position, when the first support and the second support are each in the first position; and
the first disk and the second disk are each in a raised position, when the first support and the second support are each in the second position.

8. The agricultural seeder implement according to claim 7, further comprising:
an element carried by the first support and the second support;
a first complemental element and a second complemental element carried by the opener;
the first support and the second support are disabled from moving beyond the first positions thereof disabling the first disk and the second disk from moving beyond the lowered positions thereof, when the element is engaged to the first complemental element when the first support and the second support are in the first positions thereof; and
the first support and the second support are disabled from moving beyond the second positions thereof disabling the first disk and the second disk from moving beyond the raised positions thereof, when the element is engaged to the second complemental element when the first support and the second support are in the second positions thereof.

9. The agricultural seeder implement according to claim 8, further comprising:
the element extends from the first support and through a slot in the opener to the second support;
the slot is elongate and extends from a first end wall to a second end wall;
the element travels through the slot between the first end wall and the second end wall when the first support and the second support pivot between the first and second positions thereof;
the first end wall comprises the first complemental element; and
the second end wall comprises the second complemental element.

10. The agricultural seeder implement according to claim 9, wherein the element is a bolt assembly connecting the first support to the second support.

11. An agricultural implement, comprising:
an opener for cutting a furrow;
a frame mounted to the opener;
a first disk and a second disk each mounted to the frame;
the first disk and the second disk are each adjustable between a closing position and an opening position;

the first disk and the second disk for distributing loosened soil toward the furrow, when the first disk and the second disk are each in the closing position; and the first disk and the second disk for distributing loosened soil away from the furrow, when the first disk and the second disk are each in the opening position.

12. The agricultural implement according to claim 11, wherein:
the frame is mounted pivotally to the opener for movement between a first position and a second position;
the first disk and the second disk are each in a lowered position, when the frame is in the first position; and
the first disk and the second disk are each in a raised position, when the frame is in the second position.

13. The agricultural implement according to claim 12, further comprising:
an element carried by the frame;
a first complemental element and a second complemental element carried by the opener;
the frame is disabled from moving beyond the first position disabling the pair of closing disks from moving beyond the lowered position, when the element is engaged to the first complemental element when the frame is in the first position; and
the frame is disabled from moving beyond the second position disabling the pair of closing disks from moving beyond the raised position, when the element is engaged to the second complemental element when the frame is in the second position.

14. An agricultural implement, comprising:
an opener for cutting a furrow;
a first support and a second support mounted to the opener;
the first support is adjacent to a first side of the opener;
the second support is adjacent to a second side of the opener;
a first disk mounted to the first support;
a second disk mounted to the second support;
the first disk and the second disk are each adjustable between a closing position and an opening position;
the first disk and the second disk for distributing loosened toward the furrow, when the first disk and the second disk are each in the closing position; and
the first disk and the second disk for distributing loosened soil away from the furrow, when the first disk and the second disk are each in the opening position.

15. The agricultural implement according to claim 14, wherein:

the first support and the second support are each mounted pivotally to the opener for movement between a first position and a second position;
the first disk and the second disk are each in a lowered position, when the first support and the second support are each in the first position; and
the first disk and the second disk are each in a raised position, when the first support and the second support are each in the second position.

16. The agricultural implement according to claim 15, further comprising:
an element carried by the first support and the second support;
a first complemental element and a second complemental element carried by the opener;
the first support and the second support are disabled from moving beyond the first positions thereof disabling the first disk and the second disk from moving beyond the lowered positions thereof, when the element is engaged to the first complemental element when the first support and the second support are in the first positions thereof; and
the first support and the second support are disabled from moving beyond the second positions thereof disabling the first disk and the second disk from moving beyond the raised positions thereof, when the element is engaged to the second complemental element when the first support and the second support are in the second positions thereof.

17. The agricultural implement according to claim 16, further comprising:
the element extends from the first support and through a slot in the opener to the second support;
the slot is elongate and extends from a first end wall to a second end wall;
the element travels through the slot between the first end wall and the second end wall when the first support and the second support pivot between the first and second positions thereof;
the first end wall comprises the first complemental element; and
the second end wall comprises the second complemental element.

18. The agricultural implement according to claim 17, wherein the element is a bolt assembly connecting the first support to the second support.

* * * * *